United States Patent
Yamamoto et al.

(10) Patent No.: US 11,038,373 B2
(45) Date of Patent: Jun. 15, 2021

(54) POWER TRANSMISSION SYSTEM INCLUDING POWER TRANSMITTER APPARATUS, POWER RECEIVER APPARATUS, OR POWER TRANSMITTER AND RECEIVER APPARATUS EASILY ATTACHABLE AND DETACHABLE TO/FROM TRANSMISSION PATH

(71) Applicant: PANASONIC INTELLECTUAL PROPERTY MANAGEMENT CO., LTD., Osaka (JP)

(72) Inventors: Atsushi Yamamoto, Kyoto (JP); Motohiko Fujimura, Osaka (JP); Taiki Nishimoto, Osaka (JP); Masahiro Yamaoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 19 days.

(21) Appl. No.: 16/467,760

(22) PCT Filed: Dec. 7, 2017

(86) PCT No.: PCT/JP2017/044023
§ 371 (c)(1),
(2) Date: Jun. 7, 2019

(87) PCT Pub. No.: WO2018/105695
PCT Pub. Date: Jun. 14, 2008

(65) Prior Publication Data
US 2020/0067348 A1 Feb. 27, 2020

(30) Foreign Application Priority Data
Dec. 9, 2016 (JP) .............................. JP2016-239392

(51) Int. Cl.
*H02J 5/00* (2016.01)
*H02J 7/02* (2016.01)
(Continued)

(52) U.S. Cl.
CPC ........ *H02J 13/00009* (2020.01); *H02J 50/05* (2016.02); *H02J 50/10* (2016.02); *G06K 7/1439* (2013.01)

(58) Field of Classification Search
None
See application file for complete search history.

(56) References Cited

U.S. PATENT DOCUMENTS 8,941,353 B2\* 1/2015 Di Guardo .............. H02J 50/80
320/108
9,825,672 B2\* 11/2017 Lee ....................... H04B 5/0031
(Continued)

FOREIGN PATENT DOCUMENTS

JP   H11-008904 A   1/1999
JP   2011-091954 A   5/2011
(Continued)

OTHER PUBLICATIONS

English translation of International Preliminary Report on Patentability and Written Opinion issued in International Patent Application No. PCT/JP2017/044023, dated Jun. 11, 2019.
(Continued)

*Primary Examiner* — Kenneth B Wells
(74) *Attorney, Agent, or Firm* — McDermott Will and Emery LLP

(57) ABSTRACT

A power receiver apparatus receives a code-modulated wave from a power transmitter apparatus via a transmission path, the code-modulated wave including first power modulated by code modulation using a modulation code based on a code sequence. The power receiver apparatus is provided
(Continued)

with a contactless connector and a code demodulator. The contactless connector is coupled to the transmission path without electrical contact with the transmission path, and receives the code-modulated wave from the power transmitter apparatus via the transmission path. The code demodulator demodulates the received code-modulated wave to generate second power by code demodulation using a demodulation code based on a code sequence identical to the code sequence of the modulation code used for the code modulation.

19 Claims, 32 Drawing Sheets

(51) Int. Cl.
*H02J 7/14* (2006.01)
*H02J 50/12* (2016.01)
*H02J 50/80* (2016.01)
*H02J 13/00* (2006.01)
*H02J 50/05* (2016.01)
*H02J 50/10* (2016.01)
*G06K 7/14* (2006.01)

(56) References Cited

U.S. PATENT DOCUMENTS

| | | |
|---|---|---|
| 2012/0173035 A1 | 7/2012 | Abe |
| 2012/0185708 A1 | 7/2012 | Rekimoto et al. |
| 2013/0226484 A1 | 8/2013 | Rouvala et al. |
| 2013/0260676 A1* | 10/2013 | Singh ............... H04B 5/0068 455/41.1 |

FOREIGN PATENT DOCUMENTS

| | | |
|---|---|---|
| JP | 2012-147530 A | 8/2012 |
| JP | 5612718 B2 | 10/2014 |
| JP | 5612920 B2 | 10/2014 |
| JP | 2016-136821 A | 7/2016 |

OTHER PUBLICATIONS

International Search Report issued in International Patent Application No. PCT/JP2017/044023, dated Jan. 16, 2018; with English translation.

\* cited by examiner

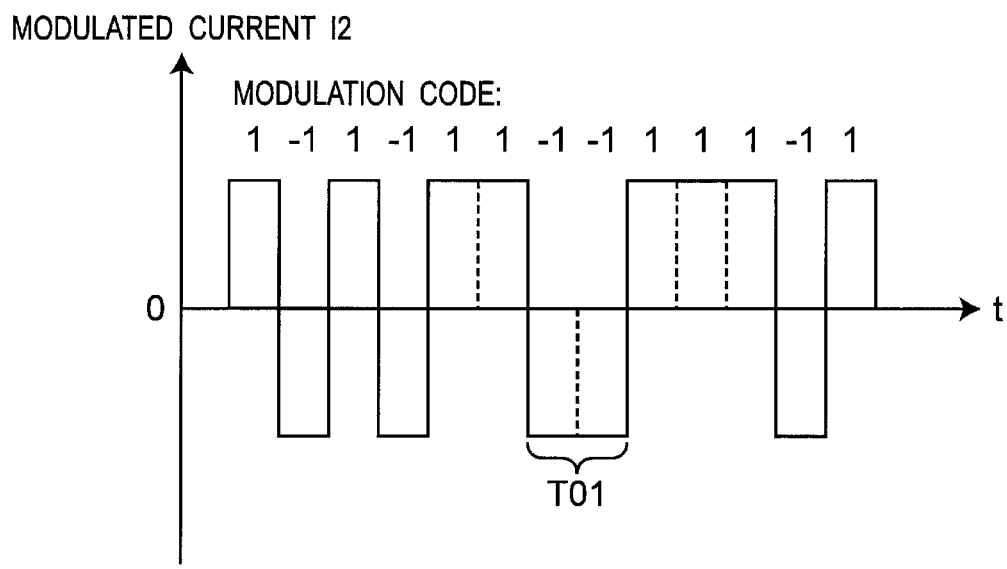
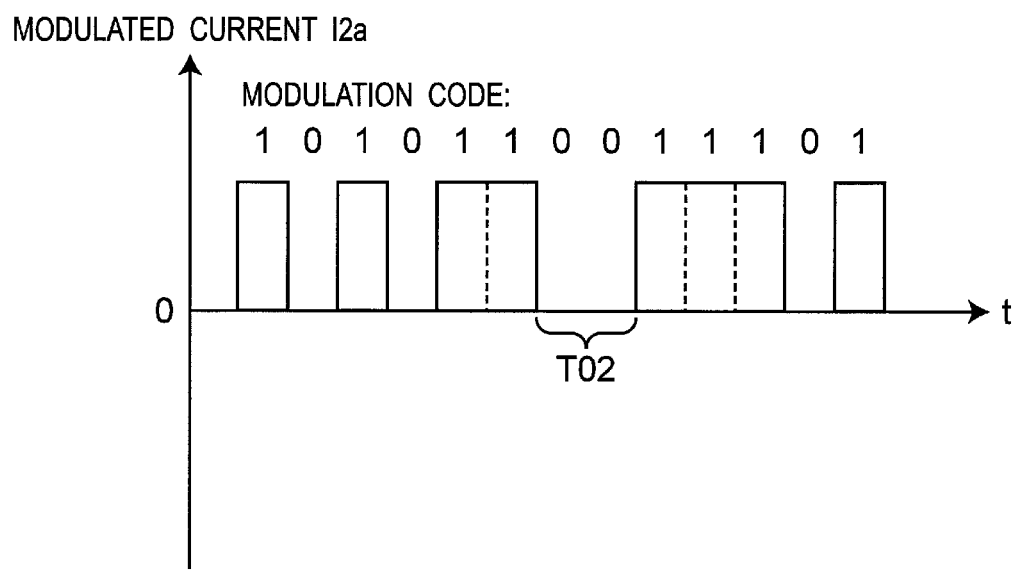

THIRD IMPLEMENTATION EXAMPLE (AC->AC)

FOURTH IMPLEMENTATION EXAMPLE (DC->DC)

POWER TRANSMISSION SYSTEM INCLUDING POWER TRANSMITTER APPARATUS, POWER RECEIVER APPARATUS, OR POWER TRANSMITTER AND RECEIVER APPARATUS EASILY ATTACHABLE AND DETACHABLE TO/FROM TRANSMISSION PATH

CROSS-REFERENCE OF RELATED APPLICATIONS

This application is the U.S. National Phase under 35 U.S.C. § 371 of International Patent Application No. PCT/JP2017/044023, filed on Dec. 7, 2017, which in turn claims the benefit of Japanese Application No. 2016-239392, filed on Dec. 9, 2016, the entire disclosures of which Applications are incorporated by reference herein.

TECHNICAL FIELD

The present disclosure relates to a power receiver apparatus which receives power via a transmission path, a power transmitter apparatus which transmits power via a transmission path, and a power transmitter and receiver apparatus which transmits and receives power via a transmission path. The present disclosure also relates to a power transmission system including at least one of the power receiver apparatus, the power transmitter apparatus, and the power transmitter and receiver apparatus.

BACKGROUND ART

In recent years, power supplies of renewable energy, typically photovoltaic power generation, wind power generation, and biofuel power generation, are increasingly used, as well as conventional power supplies provided by power companies, such as thermal power generation, hydropower generation, and nuclear power generation. In addition, apart from large-scale commercial power networks currently provided, local and small-scale power networks capable of achieving local production and local consumption of power have been being spread worldwide in order to reduce losses of long-distance power transmission.

In a small-scale power network, power can be supplied self-sufficiently by using a natural energy power generator, and electric load equipment capable of efficient power regeneration. This type of power network is highly promising as a power transmission system for supplying electricity to non-electrified areas, such as desert oasis and remote islands.

For example, each of Patent Documents 1 to 3 discloses a power transmission system which transmits power from a power supply to a load via a power line.

CITATION LIST

Patent Documents

PATENT DOCUMENT 1: Japanese Patent Publication No. 5612718 B
PATENT DOCUMENT 2: Japanese Patent Publication No. 5612920 B
PATENT DOCUMENT 3: Japanese Patent laid-open Publication No. 2011-091954 A

SUMMARY OF INVENTION

Technical Problem

A certain type of power transmission system transmits power from a plurality of power supplies to a plurality of loads. In this case, it is required to simplify the configuration of the power transmission system using a common transmission path, rather than using individual transmission paths for respective pairs of a power supply and a load. In addition, when transmitting power from a plurality of power supplies to a plurality of loads via a common transmission path, it is required for transmission efficiency to be less likely to degrade due to multiplexed power transmission.

In addition, the number of power supplies and the number of loads of the power transmission system may increase or decrease in accordance with users' requests, etc. In this case, it is required to be capable of easily attaching and detaching the power transmitter apparatus, the power receiver apparatus, etc., to/from the power transmission system.

An object of the present disclosure is to which solve the aforementioned problems, and to provide a power receiver apparatus with a simple configuration, operable at higher transmission efficiency than that of the prior art, and easily attachable and detachable to/from a power transmission system.

Solution to Problem

According an aspect of the present disclosure, a power receiver apparatus receives a code-modulated wave from a power transmitter apparatus via a transmission path, the code-modulated wave including first power modulated by code modulation using a modulation code based on a code sequence. The power receiver apparatus is provided with: a contactless connector that is coupled to the transmission path without electrical contact with the transmission path, and receives the code-modulated wave from the power transmitter apparatus via the transmission path; and a code demodulator that demodulates the received code-modulated wave to generate second power by code demodulation using a demodulation code based on a code sequence identical to the code sequence of the modulation code used for the code modulation.

These generic and specific aspects may be implemented as a system, as a method, or as any combination of systems and methods.

Advantageous Effects of Invention

According to the present disclosure, it is possible to provide a power receiver apparatus with a simple configuration, operable at higher transmission efficiency than that of the prior art, and easily attachable and detachable to/from a power transmission system.

BRIEF DESCRIPTION OF DRAWINGS

FIG. 2 is a waveform diagram showing an exemplary signal waveform of a modulated current I2 of the power transmission system of FIG. 1.
FIG. 3 is a waveform diagram showing an exemplary signal waveform of a modulated current I2 of a communication system according to a comparison example.

DESCRIPTION OF EMBODIMENTS

Findings Underlying Present Disclosure

Figure 1:
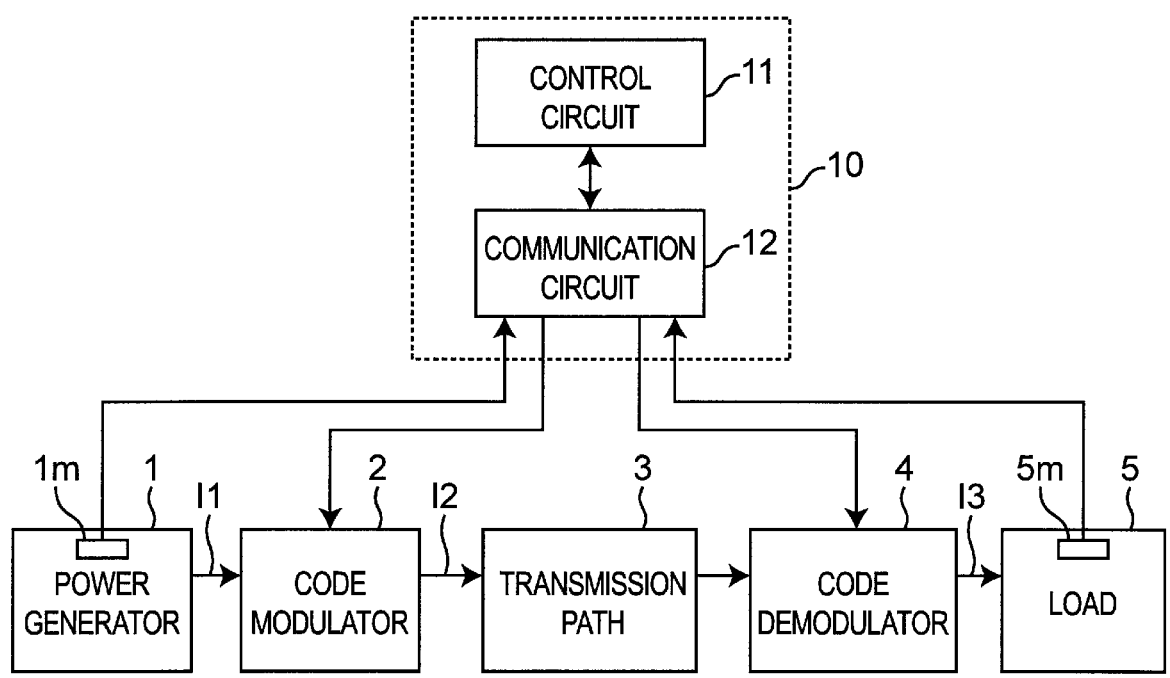
FIG. 1 is a block diagram showing a configuration of a power transmission system according to a first embodiment.

Patent Document 1 discloses an interconnection apparatus for power transmission apparatuses, the interconnection apparatus being capable of transmitting and receiving power among a plurality of power systems.

According to Patent Document 1, the interconnection apparatus is provided with a converter and an inverter. For power transmission, the converter converts transmitting power from alternating current to direct current, and the converted power is transmitted to the interconnection apparatus connected to a receiving power system. At the interconnection apparatus of the receiving power system, the inverter converts the power so as to have a desired frequency, thus providing power having an optimum frequency for the power system to which the interconnection apparatus is connected. Moreover, Patent Document 2 discloses a configuration further provided with a power storage apparatus, in addition to the components of Patent Document 1.

On the other hand, Patent Document 3 discloses a method of transmitting power from a plurality of power transmitter apparatuses to a plurality of power receiver apparatuses. According to Patent Document 3, power is transmitted from the plurality of power transmitter apparatuses to the plurality of power receiver apparatuses in a time division manner. According to Patent Document 3, control signals are wirelessly transmitted among the power transmitter apparatuses and the power receiver apparatuses in order to transmit and receive power.

However, according to Patent Documents 1 and 2, the interconnection apparatus is provided with the inverter and converter, and basically, individual power transmission cables are required for all combinations of the power systems transmitting and receiving power. According to Patent Documents 1 and 2, the interconnection apparatus may be configured so as to reduce the number of power transmission cables, however, in any case, a large number of power transmission cables are required. Thus, installation costs and the cables' material costs increase. In addition, the interconnection apparatus should be provided with the same number of pairs of the inverter and the converter as the number of the power systems to be connected. Accordingly, the cables' costs may increase, and costs may further increase due to the increased size of the interconnection apparatus.

In addition, according to Patent Document 3, it is possible to transmit and receive power among the plurality of power transmitter apparatuses and the plurality of power receiver apparatuses in a time division manner, and advantageously, it is possible to reduce the number of power transmission cables. However, in case of time-division power transmission, it is not possible to transmit and receive power among the plurality of power systems, simultaneously. In other words, it may not be possible to immediately handle a power demand from a load connected to a power receiver. Furthermore, when transmitting and receiving power among a large number of pairs of the power transmitter apparatuses and the power receiver apparatuses, only a short time is allocated for one pair of the power transmitter apparatus and the power receiver apparatus to transmit and receive power, and therefore, large pulse power is transmitted over the power transmission cable. Accordingly, the transmission cable with a high power durability is required, and thus, it may increase costs. In addition, since time intervals in which power can not be received occur, it may be required to provide the power receiver apparatuses with a buffer for large power. Furthermore, in order to transmit and receive power in a time division manner, time-synchronization is required among the plurality of power transmitter apparatuses and the plurality of power receiver apparatuses. In order to achieve such synchronization, very accurate controls among the apparatuses are required, and thus, it may increase the entire system costs.

As described above, according to both Patent Documents 1 and 2, a large number of power transmission cables are used, and therefore, it is not possible to reduce the power transmission cables by multiplexed power transmission. Further, the interconnection apparatus requires a pair of inverter and converter for each of the power transmission cables, and therefore, it is not possible to reduce the size of the interconnection apparatus. Accordingly, it is difficult to transmit and receive power among a large number of power systems. On the other hand, according to Patent Document 3, power is transmitted and received among the plurality of power transmitter apparatuses and the plurality of power receiver apparatuses over the power transmission cables in a time division manner, thus reducing the number of the power transmission cables. However, it is not possible to provide a transmission system capable of transmitting and receiving power among the plurality of power systems, simultaneously. Accordingly, there is a demand for a power transmission system with a reduced number of power transmission cables, and capable of transmitting and receiving power from a plurality of power transmitter apparatuses to a plurality of power receiver apparatuses, simultaneously, and more reliably, while reducing sizes and thicknesses of the power transmitter apparatuses and the power receiver apparatuses.

Further, as described above, the number of power supplies and the number of loads of the power transmission system may increase or decrease in accordance with users a users' requests, etc. In this case, it is required to be capable of easily attaching and detaching the power transmitter apparatus, the power receiver apparatus, etc., to/from the power transmission system.

Based on the above consideration, the inventors provide the following aspects of the invention.

According an aspect of the present disclosure, a power receiver apparatus that receives a code-modulated wave from a power transmitter apparatus via a transmission path, the code-modulated wave including first power modulated by code modulation using a modulation code based on a code sequence. The power receiver apparatus is provided with: a contactless connector that is coupled to the transmission path without electrical contact with the transmission path, and receives the code-modulated wave from the power transmitter apparatus via the transmission path; and a code demodulator that demodulates the received code-modulated wave to generate second power by code demodulation using a demodulation code based on a code sequence identical to the code sequence of the modulation code used for the code modulation.

According an aspect of the present disclosure, a power transmitter apparatus transmits power to a power receiver apparatus via a transmission path. The power transmitter apparatus is provided with: a code modulator that modulates first power to generate a code-modulated wave by code modulation using a modulation code based on a code sequence; and a contactless connector that is coupled to the transmission path without electrical contact with the transmission path, and transmits the code-modulated wave to the power receiver apparatus via the transmission path.

According an aspect of the present disclosure, a power transmitter and receiver apparatus transmits power to a power receiver apparatus via a transmission path and receives power from a power transmitter apparatus via the transmission path. The power transmitter and receiver apparatus is provided with: a code modulator/demodulator that modulates first power to generate a first code-modulated wave by code modulation using a first modulation code based on a first code sequence; and a contactless connector that is coupled to the transmission path without electrical contact with the transmission path, and transmits the first code-modulated wave to the power receiver apparatus via the transmission path. The contactless connector further receives a second code-modulated wave from the power transmitter apparatus via the transmission path, the second code-modulated wave including power modulated by code modulation using a second modulation code based on a second code sequence. The code modulator/demodulator further demodulates the received second code-modulated wave to generate second power by code demodulation using a demodulation code based on the second code sequence.

A power transmission system according to the present disclosure can actively specify combinations of a power supply and a load, and specify amounts of power to be transmitted, and then, simultaneously and independently transmit power among the combinations over one transmission path, as well as easily attach/detach and increase/decrease apparatuses involved in power transmission.

Hereinafter, embodiments according to the present disclosure will be described with reference to the drawings. In the following embodiments, similar constituent elements are denoted by identical reference numerals.

An object of the present disclosure is to provide a power receiver apparatus, a power transmitter apparatus, and a power transmitter and receiver apparatus, each having a simple configuration, operable at higher transmission efficiency than that of the prior art, and easily attachable and detachable to/from a power transmission system. In addition, an object of the present disclosure is to provide a power transmission system including at least one of the power receiver apparatus, the power transmitter apparatus, and the power transmitter and receiver apparatus. In first to third embodiments, we describe preparatory overviews of power transmission systems. Thereafter, in fourth to sixth embodiments, we describe power transmission systems which solves the problems.

First Embodiment

FIG. 1 is a block diagram showing a configuration of a power transmission system according to the first embodiment. Referring to FIG. 1, the power transmission system according to the first embodiment is provide with a power generator 1, a code modulator 2, a transmission path 3, a code demodulator 4, a load 5, and a controller 10. The transmission path 3 is, for example, a wired transmission path.

The controller 10 is provided with a control circuit 11 and a communication circuit 12. The control circuit 11 communicates with the code modulator 2 and the code demodulator 4 via the communication circuit 12, and controls operations of the code modulator 2 and the code demodulator 4.

In the power transmission system of FIG. 1, the code modulator 2 operates as a power transmitter apparatus, and the code demodulator 4 operates as a power receiver apparatus. The code modulator 2 modulates first power to generate a code-modulated wave by code modulation using a modulation code based on a code sequence, and transmits the code-modulated wave to the code demodulator 4 via the transmission path 3. The code demodulator 4 receives the code-modulated wave from the code modulator 2 via the transmission path 3, and demodulates the received code-modulated wave to generate second power by code demodulation using a demodulation code based on a code sequence identical to the code sequence of the modulation code used for the code modulation. The first power is, for example, direct-current power generated by the power generator 1, and is shown as a generated current I1 in FIG. 1. The code-modulated wave is alternating-current power modulated by code modulation, and is shown as a modulated current I2 in FIG. 1. The second power is, for example, direct-current power to be supplied to the load 5, and is shown as a demodulated current I3 in FIG. 1.

The power transmission system of FIG. 1 is further provided with power meters 1m and 5m. The power meter 1m is first power measuring means which measures an amount of the first power. More specifically, the power meter 1m measures an amount of direct-current power generated by the power generator 1 and transmitted from the power generator 1 to the code modulator 2. The power meter 1m may be provided to the power generator 1, or disposed between the power generator 1 and the code modulator 2. The power meter 5m is second power measuring means for measuring an amount of the second power. More specifically, the power meter 5m measures an amount of direct-current power transmitted from the code demodulator 4 to the load 5, and used by the load 5. The power meter 5m may be provided to the load 5, or may be disposed between the code demodulator 4 and the load 5. The amounts of powers measured by the power meters 1m and 5m are transmitted to the controller 10.

The controller 10 controls operations of the code modulator 2 and the code demodulator 4 based on the amounts of powers received from the power meters 1m and 5m. For example, the controller 10 transmits control signals to the code modulator 2 and the code demodulator 4, the control signals including synchronization signals for synchronizing the code modulator 2 and the code demodulator 4 to each other, thus achieving code modulation and code demodulation of power in an accurately synchronized manner.

The controller 10 sets a modulation code to the code modulator 2, and a demodulation code to the code demodulator 4, based on one code sequence. The code sequence of the modulation code used for modulation by the code modulator 2, and the code sequence of the demodulation code used for demodulation by the code demodulator 4 may be set in advance to the code modulator 2 and the code demodulator 4. In addition, for example, the controller 10 may transmit, as the control signals, the code sequence of the modulation code used for modulation by the code modulator 2, and the code sequence of the demodulation code used for demodulation by the code demodulator 4. Further, the controller 10 may transmit, as the control signals, only information specifying the code sequences, without transmitting the code sequences themselves, so that the code modulator 2 and the code demodulator 4 to generates the code sequences, respectively. In this case, it is possible to achieve code modulation and code demodulation between the code modulator 2 and the code demodulator 4 corresponding to each other in an accurately synchronized manner.

FIG. 2 is a waveform diagram showing an exemplary signal waveform of the modulated current I2 of the power transmission system of FIG. 1. In addition, FIG. 3 is a waveform diagram showing an exemplary signal waveform of a modulated current I2 of a communication system according to a comparison example.

The code modulator 2 of FIG. 1 modulates a current of power, which is generated by the power generator 1, by code modulation using a modulation code based on a code sequence. In this case, the code modulator 2 generates an alternating-current code-modulated wave made of currents flowing in directions corresponding to code values of "1" and "−1.", respectively, as shown in FIG. 2. This code-modulated wave can transmit power in both periods of positive current flows, and periods of negative current flows (e.g., period T01 of FIG. 2). While the first embodiment indicates an example in which direct-current power is modulated by code modulation, alternating-current power may be modulated by code modulation as in a second embodiment described below.

In the data transmission system according to the comparison example, e.g., to be used for communication, code values of "1" and "0" are typically used for code modulation, as shown in FIG. 3. However, according to the code-modulated wave as shown in FIG. 3, when the code value of the modulation code is "0" (e.g., period T02 of FIG. 3), a modulated current or voltage becomes zero, that is, a period of no power transmission occurs. Such periods of no power transmission may reduce overall power transmission efficiency. More specifically, for the case of communication, since information such as data should be transmitted in an accurately synchronized manner, it is only required that the code demodulator accurately distinguish between "0" and "1". On the other hand, for the case of power transmission, a power loss due to the period of no power transmission is not permissible from a viewpoint of efficiency in use of energy. Accordingly, by using an alternating-current code-modulated wave flowing in directions corresponding to the code values of "1" and "4", respectively, as shown in FIG. 2, it is possible to transmit power with higher transmission efficiency than that of the comparison example.

Figure 4:
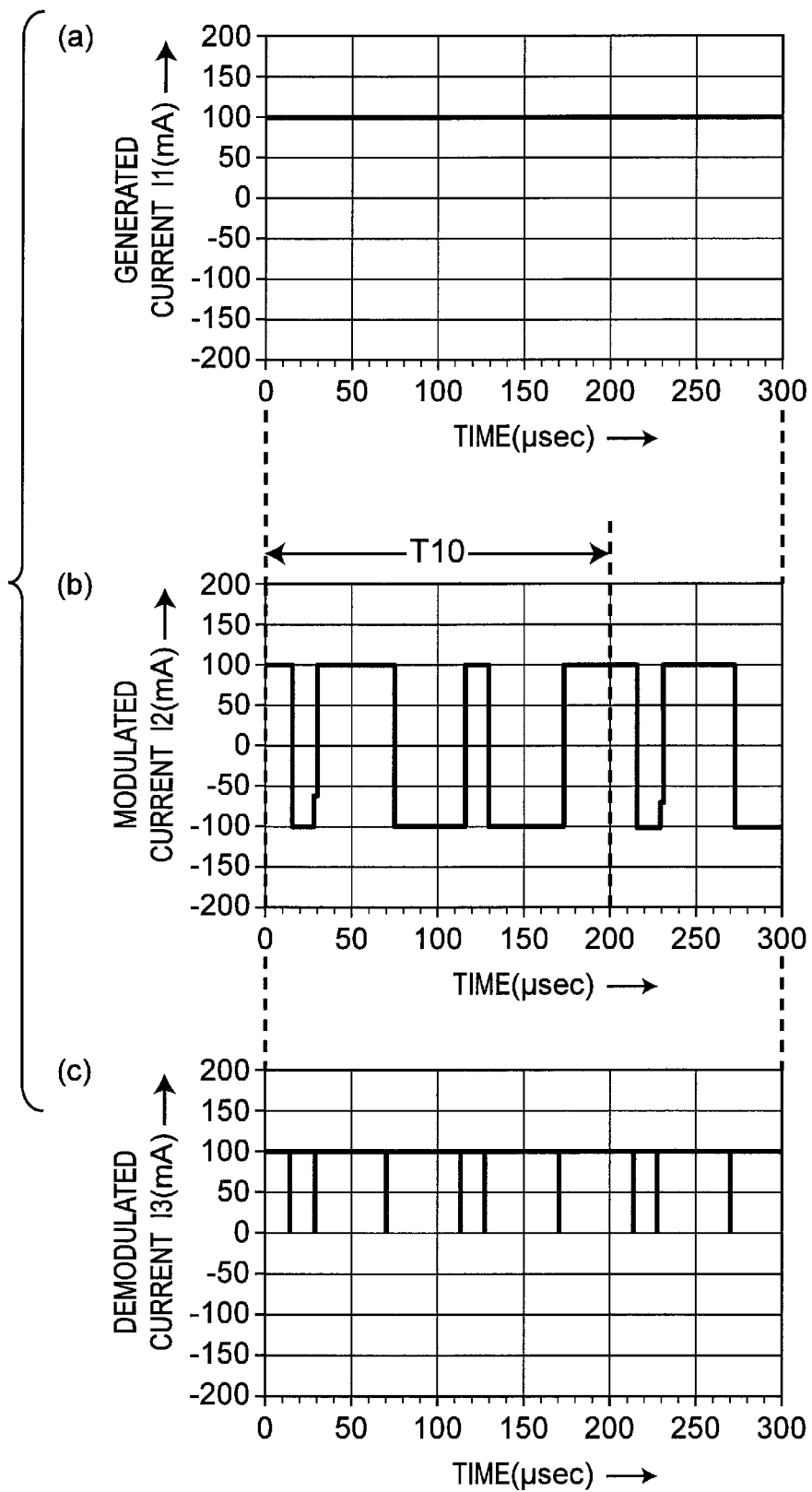
FIG. 4 is a waveform diagram showing exemplary signal waveforms in the power transmission system of FIG. 1, in which: (a) shows a signal waveform of a generated current I1; (b) shows a signal waveform of a modulated current I2; and (c) shows a signal waveform of a demodulated current I3.

FIG. 4 is a waveform diagram, where (a) to (c) show exemplary signal waveforms in the power transmission system of FIG. 1. In FIG. 4, (a) shows a signal waveform of the generated current I1, (b) shows a signal waveform of the modulated current I2, and (c) shows a signal waveform of the demodulated current I3. The power generator 1 generates the direct-current generated current I1. The code modulator 2 multiplies the generated current I1 by a modulation code m0 to generate the alternating-current modulated current I2. The code demodulator 4 multiplies the modulated current I2 by a demodulation code d0 identical to the modulation code m0 to reproduce the direct-current power generated by the power generator 1, and supply the reproduced direct-current power to the load 5.

Referring to FIG. 4, T10 indicates a period of one cycle of the modulation code m0 and the demodulation code d0. The same also applies to subsequent drawings.

According to the exemplary signal waveform of FIG. 4, the direct-current generated current I1 (FIG. 4(*a*)) is multiplied by the modulation code m0 having a frequency of 35 kHz, to generate the modulated current I2 (FIG. 4(*b*)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". The code value "1" of the modulation code m0 indicates that the code modulator 2 outputs a current in the same direction as the direction of an inputted current, and the code value "−1" of the modulation code m0 indicates that the code modulator 2 outputs a current in the direction opposite to the direction of the inputted current. Similarly, the code value "1" of the demodulation code d0 indicates that the code demodulator 4 outputs a current in the same direction as the direction of an inputted current, and the code value "4" of the demodulation code d0 indicates that the code demodulator 4 outputs a current in the direction opposite to the direction of the inputted current.

For example, the modulation code m0 and the demodulation code d0 are given as follows.

$$m0=[1\text{-}1\ 1\ 1\ 1\text{-}1\ \text{-}1\text{-}1\ 1\text{-}1\ \text{-}1\text{-}1\ 1\ 1] \quad (1)$$

$$d0=m0=[1\text{-}1\ 1\ 1\ 1\text{-}1\ \text{-}1\text{-}1\ 1\text{-}1\ \text{-}1\text{-}1\ 1\ 1] \quad (2)$$

Subsequently, the modulated current I2 of the code-modulated wave generated by the modulation code m0 is multiplied by the demodulation code d0. This multiplication is denoted as follows.

$$m0 \times d0=[1\ 1\ 1\ 1\ 1\ 1\ 1\ 1\ 1\ 1\ 1\ 1\ 1] \quad (3)$$

As apparent from Mathematical Expression (3), the demodulated current I3 (FIG. 4(*c*)) is obtained, which is direct current similarly to the original generated current I1.

As described above, it is possible to achieve direct-current power transmission in an accurately synchronized manner, without power loss, by using the code modulator 2 and the code demodulator 4 according to the present embodiment. In addition, it is possible to achieve efficient power transmission for a longer period, for example, by repeatedly using the modulation code m0 and demodulation code d0 as described above.

Further, the modulation code m0 can be divided into its former-half code portion m0*a*, and its latter-half code portion m0*b*, as follows.

$$m0a=[1\ \text{-}1\ 1\ 1\ 1\ \text{-}1\ \text{-}1] \quad (4)$$

$$m0b=[\text{-}1\ 1\text{-}1\ \text{-}1\text{-}1\ 1\ 1] \quad (5)$$

In this case, the code portion m0*b* is generated by inverting the sign of the code value of each bit of the code portion m0*a*. More specifically, when the code value of a certain bit of the code portion m0*a* is "1", the code value of a corresponding bit of the code portion m0*b* is "−1". Similarly, when the code value of a certain bit of the code portion m0*a* is "−1.", the code value of a corresponding bit of the code portion m0*b* is "1".

Figure 5:
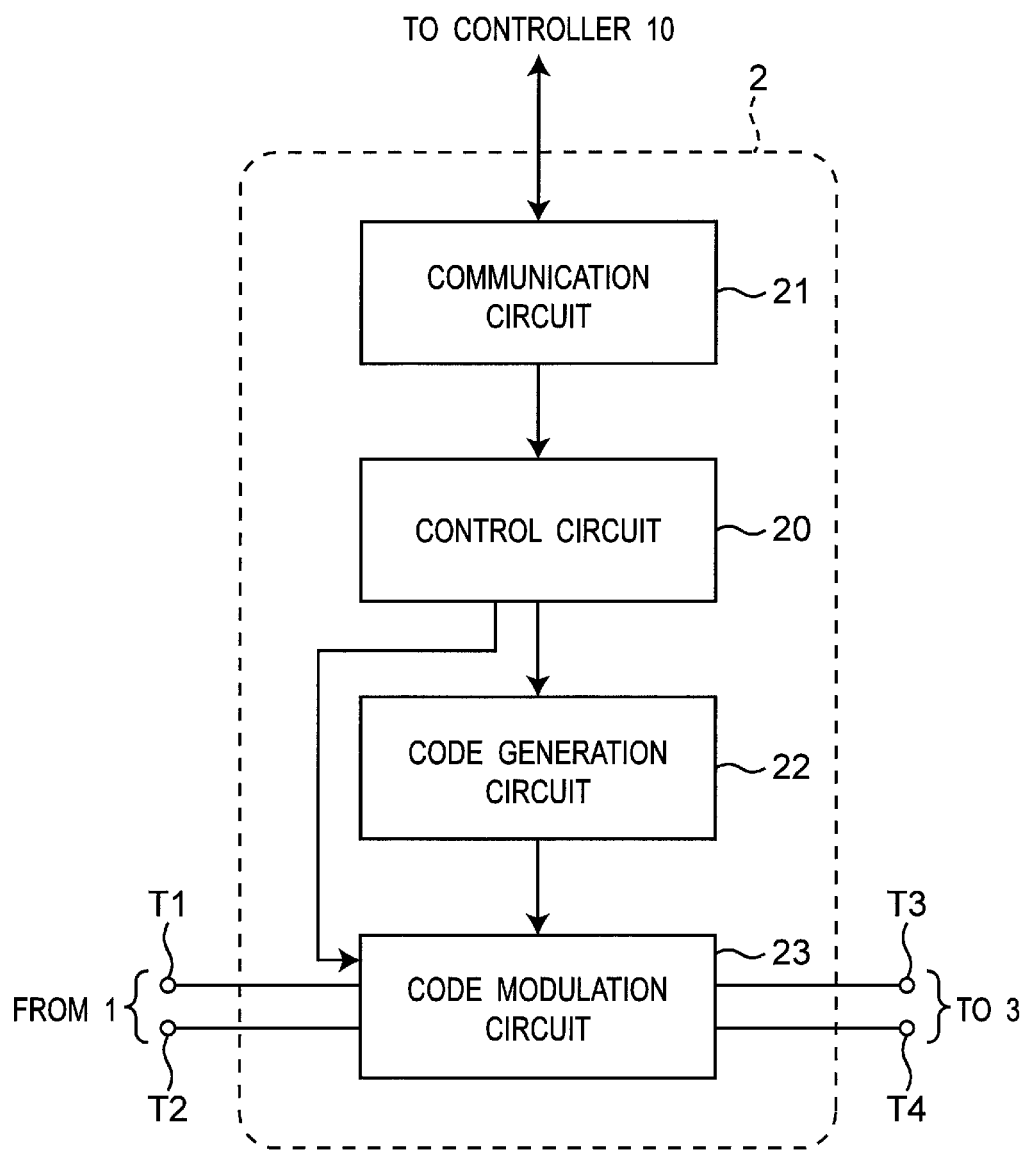
FIG. 5 is a block diagram showing a configuration of a code modulator 2 of FIG. 1.

FIG. 5 is a block diagram showing a configuration of the code modulator 2 of FIG. 1. Referring to FIG. 5, the code modulator 2 is provided with a control circuit 20, a communication circuit 21, a code generation circuit 22, and a code modulation circuit 23. The communication circuit 21 receives a synchronization signal and a control signal from the controller 10, the control signal including a code sequence itself or information specifying the code sequence, and outputs the received signals to the control circuit 20. In this case, the synchronization signal may be, for example, trigger signals to start and end modulation, or time information indicating a start time and an end time of modulation. Based on the control signal, the control circuit 20 controls the code generation circuit 22 so as to generate a modulation code based on a code sequence and output the modulation code to the code modulation circuit 23, and controls start and end of operation of the code modulation circuit 23. The code modulation circuit 23 has input terminals T1 and T2 connected to the power generator 1, and output terminals T3 and T4 connected to the transmission path 3.

Figure 6:
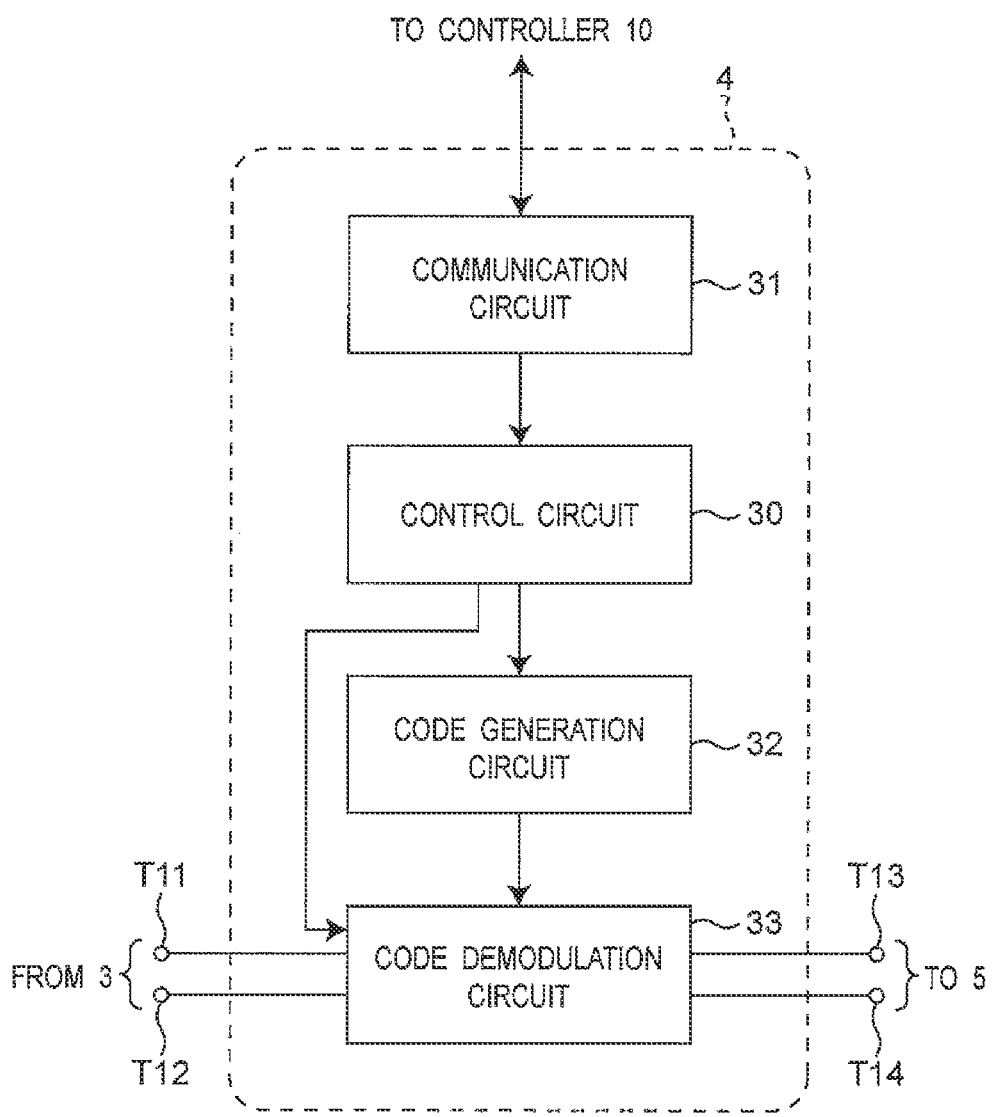
FIG. 6 is a block diagram showing a configuration of a code demodulator 4 of FIG. 1.

FIG. 6 is a block diagram showing a configuration of the code demodulator 4 of FIG. 1. Referring to FIG. 6, The code demodulator 4 is provided with a control circuit 30, a communication circuit 31, a code generation circuit 32, and a code demodulation circuit 33. The communication circuit 31 receives a synchronization signal and a control signal from the controller 10, the control signal including a code sequence itself or information specifying the code sequence, and outputs the received signals to the control circuit 30. In this case, the synchronization signal may be, for example, trigger signals to start and end demodulation, or time information indicating a start time and an end time of demodulation. Based on the control signal, the control circuit 30 controls the code generation circuit 32 so as to generate a demodulation code based on a code sequence and output the demodulation code to the code demodulation circuit 33, and controls start and end of operation of the code demodulation circuit 33. The code demodulation circuit 33 has input terminals T11 and T12 connected to the transmission path 3, and output terminals T13 and T14 connected to the load 5.

Note that in the power transmission system of FIG. 1, the control signals from the controller 10 to the code modulator 2 and the code demodulator 4 may be transmitted via control signal lines different from the transmission path 3, or may be transmitted via the transmission path 3 in a manner multiplexed with the code-modulated wave using some multiplexing scheme. In the latter case, it is possible to omit cables provided for communication from the controller 10 to the code modulator 2 and the code demodulator 4, and reduce cost.

Figure 7:
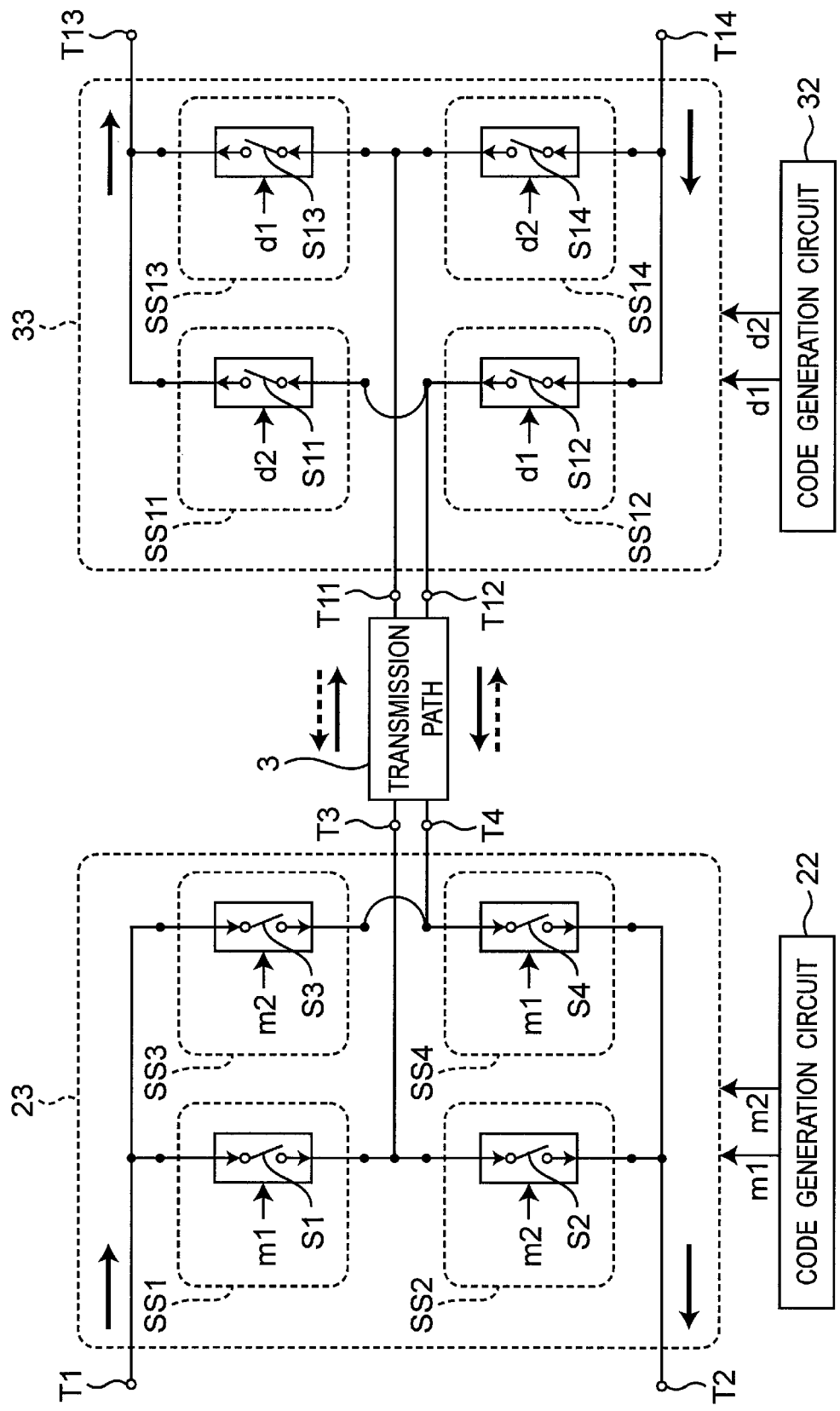
FIG. 7 is a block diagram showing configurations of a code modulation circuit 23 and a code demodulation circuit 33 of FIG. 1.

FIG. 7 is a block diagram showing configurations of the code modulation circuit 23 and the code demodulation circuit 33 of FIG. 1. Referring to FIG. 7, the code modulation circuit 23 is provided with four switch circuits SS1 to SS4 connected in a bridge configuration. The switch circuits SS1 to SS4 include unidirectional switch elements S1 to S4, respectively, each made of, for example, a metal-oxide-semiconductor (MOS) transistor. In addition, the code demodulation circuit 33 is provided with four switch circuits SS11 to SS14 connected in a bridge configuration. The switch circuits SS11 to SS14 include unidirectional switch elements S11 to S14, respectively, each made of, for example, an MOS transistor.

The code generation circuit 22 generates and outputs the modulation codes m1 and m2 to the code modulation circuit 23 under control of the control circuit 20, in order to operate the code modulator 2 according to the modulation code m0 as described above. The switch elements S1 and S4 of the code modulation circuit 23 are controlled according to the modulation code m1, and the switch elements S2 and S3 of the code modulation circuit 23 are controlled according to the modulation code m2. Each of the modulation codes m1 and m2 has code values "1" and "0". For example, when a signal of the code value "1" is inputted to each of the switch elements S1 to S4, each of the switch elements S1 to S4 is turned on. When a signal of the code value "0" is inputted to each of the switch elements S1 to S4, each of the switch elements S1 to S4 is turned off. Note that switch elements other than the switch elements S1 to S4 described in the present description operate in a similar manner. In this case, the switch elements S1 to S4 have directionality as follows. When the switch element S1 is turned on, the switch element S1 outputs a generated current inputted from the terminal T1, to the terminal T3. When the switch element S3 is turned on, the switch element S3 outputs a generated current inputted from the terminal T1, to the terminal T4. When the switch element S2 is turned on, the switch element S2 outputs a modulated current inputted from the terminal T3, to the terminal T2. When the switch element S4 is turned on, the switch element S4 outputs a modulated current inputted from the terminal T4, to the terminal T2.

The code generation circuit 32 generates and outputs the demodulation codes d1 and d2 to the code demodulation circuit 33 under control of the control circuit 30, in order to operate the code demodulator 4 according to the demodulation code d0 as described above. The switch elements S11 and S14 of the code demodulation circuit 33 are controlled according to the demodulation code d2, and the switch elements S12 and S13 of the code demodulation circuit 33 are controlled according to the demodulation code d1. Each of the demodulation codes d1 and d2 has code values "1" and "0". In this case, the switch elements S11 to S14 have directionality as described below. When the switch element S11 is turned on, the switch element S11 outputs a modulated current inputted from the terminal T12, to the terminal T13. When the switch element S13 is turned on, the switch element S13 outputs a modulated current inputted from the terminal T11, to the terminal T13. When the switch element S12 is turned on, the switch element S12 outputs a demodulated current inputted from the terminal T14, to the terminal T12. When the switch element S14 is turned on, the switch element S14 outputs a demodulated current inputted from the terminal T14, to the terminal T11.

In the notation of FIG. 7, directions of current flows in the switch elements S11 to S14 of the code demodulator 4 are opposite to directions of current flows in the switch elements S1 to S4 of the code modulator 2.

Figure 8A:
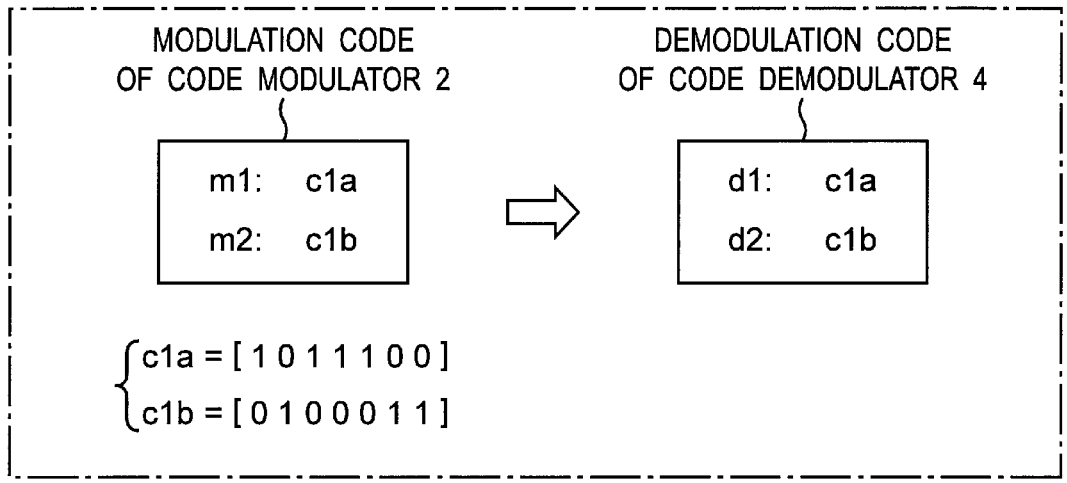
FIG. 8A is a diagram showing an example of a modulation code of the code modulator 2 and a demodulation code of the code demodulator 4 in the power transmission system of FIG. 1, as a first implementation example in which direct-current power is transmitted and received.

FIG. 8A is a diagram showing an example of a modulation code of the code modulator 2 and a demodulation code of the code demodulator 4 in the power transmission system of FIG. 1, as a first implementation example in which direct-current power is transmitted and received. More specifically, FIG. 8A shows an example of the modulation codes m1 and m2 inputted to the switch elements S1 to S4 of the code modulator 2, and the demodulation codes d1 and d2 inputted to the switch elements S11 to S14 of the code demodulator 4.

As shown in FIG. 8A, the modulation code m1 and the demodulation code d1 are identical to each other, and each is made of a code sequence c1a. In addition, the modulation code m2 and the demodulation code d2 are identical to each other, and each is made of a code sequence c1b. In addition, the code sequences c1a and c1b are configured such that when the code value of a certain bit of the code sequence c1a is "1", the code value of a corresponding bit of the code sequence c1b is "0"; and when the code value of a certain bit of the code sequence c1a is "0", the code value of a corresponding bit of the code sequence c1b is "1".

Accordingly, among the switch elements S1 to S4 and S11 to S14 of FIG. 7, when a switch element receiving the code value of a certain bit of the code sequence c1a is turned on, the switch element receiving the code value of a corresponding bit of the code sequence c1b is turned off. In addition, when the switch element receiving the code value of a certain bit of the code sequence c1a is turned off, the switch element receiving the code value of a corresponding bit of the code sequence c1b is turned on.

According to the code modulation circuit 23 of FIG. 7, when the switch elements S1 and S4 are turned on, the switch elements S2 and S3 are turned off; and when the switch elements S1 and S4 are turned off, the switch elements S2 and S3 are turned on. Thus, when the switch elements S1 and S4 are turned on, and the switch elements S2 and S3 are turned off, the modulated current I2 flows in the transmission path 3 in a positive direction, i.e., in a direction of solid arrows. On the other hand, when the switch elements S1 and S4 are turned off, and the switches S2 and S3 are turned on, the modulated current I2 flows in the transmission path 3 in a negative direction, i.e., in a direction of dotted arrows. Accordingly, as shown in FIG. 4, when the direct-current generated current I1 is inputted to the code modulator 2, the alternating-current modulated current I2 can be transmitted to the transmission path 3.

In the code demodulation circuit 33 of FIG. 7, the switch elements S11 to S14 are turned on or off in response to the demodulation codes d1 and d2 in synchronization with the code modulation circuit 23. In this case, the switch elements S12 and S13 are turned on or off in accordance with the demodulation code d1 identical to the modulation code m1, and the switch elements S11 and S14 are turned on or off in accordance with the demodulation code d2 identical to the modulation code m2. Thus, when the code value of the modulation code m1 is "1", and the code value of the modulation code m2 is "0", i.e., when the modulated current I2 flows in the transmission path 3 in the positive direction, the code value of the demodulation code d1 is "1", and the code value of the demodulation code d1 is "0". Accordingly, by turning on the switch elements S13 and S12 and turning off the switch elements S11 and S14, the demodulated current I3 flows at the output terminals T13 and T14 of the code demodulation circuit 33 in the positive direction, i.e., in the direction of the solid arrows. On the other hand, when the code value of the modulation code m1 is "0", and the code value of the modulation code m2 is "1", i.e., when the modulated current I2 flows in the transmission path 3 in the negative direction, the code value of the demodulation code d1 is "0", and the code value of the demodulation code d1 is "1". Accordingly, by turning on the switch elements S11 and S14 and turning off the switch elements S12 and S13, the demodulated current I3 again flows at the output terminals T13 and T14 of the code demodulation circuit 33 in the positive direction, i.e., in the direction of the solid arrows.

As described above, when using the modulation codes m1 and m2 and the demodulation codes d1 and d2 of FIG. 8A, equivalently, the code modulator 2 operates according to the modulation code m0 of Mathematical Expression (1), and the code demodulator 4 operates according to the demodulation code d0 of Mathematical Expression (2).

As described above, according to FIGS. 7 and 8A, when the direct-current generated current I1 is inputted to the code modulator 2, it is possible to extract the demodulated current I3 from the code demodulator 4, the demodulated current I3 being also a direct current similarly to the generated current I1 inputted to the code modulator 2. Therefore, according to the first embodiment, it is possible to modulate the direct-current generated current I1 by code modulation into the alternating-current modulated current I2, and then, transmit the modulated current I2 via the transmission path 3, and then, demodulate the modulated current I2 into the direct-current demodulated current I3.

Figure 8B:
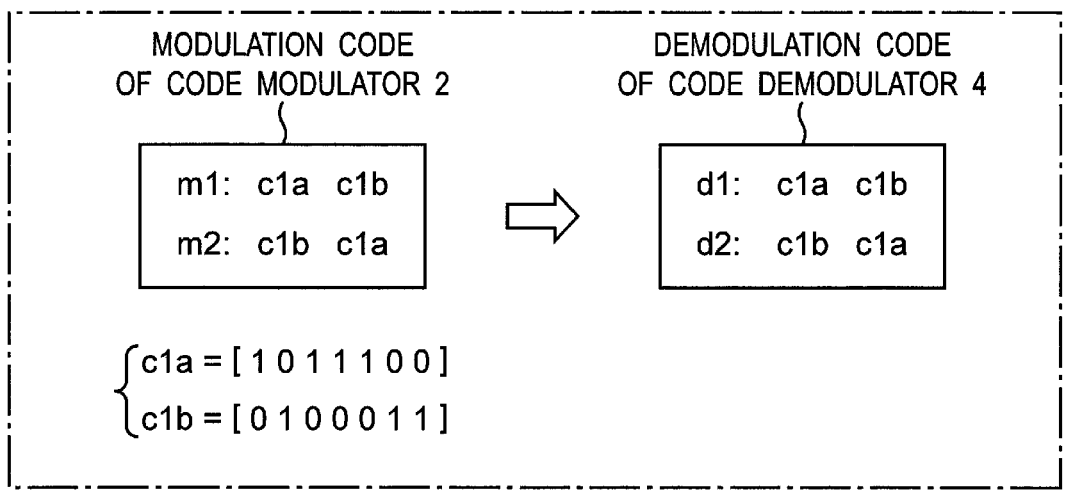
FIG. 8B is a diagram showing an example of a modulation code of the code modulator 2 and a demodulation code of the code demodulator 4 in the power transmission system of FIG. 1, as a second implementation example in which direct-current power is transmitted and received.

FIG. 8B is a diagram showing an example of a modulation code of the code modulator 2 and a demodulation code of the code demodulator 4 in the power transmission system of FIG. 1, as a second implementation example in which direct-current power is transmitted and received. When in each of the code sequences c1a and c1b, the number of bits of the code value "1" is equal to the number of bits of the code value "0", the modulated current I2 being modulated by code modulation and flowing in the transmission path 3 includes, in average, no direct-current component, but includes only an alternating-current component. However, in some code sequence, the number of bits of the code value "1" is different from the number of bits of the code value "0", and thus, a direct-current component occurs. When using such a code sequence, by concatenating the code sequence with a code sequence of bits having code values inverted from those of corresponding bits, respectively, it is possible to generate a modulation code and a demodulation code, in each of which the number of bits of the code value "1" is equal to the number of bits of the code value "0". According to the example of FIG. 8B, each of the modulation code m1 and the demodulation code d1 is a code sequence [c1a c1b] which is a concatenation of the code sequence c1a and the code sequence c1b, and each of the modulation code m2 and the demodulation code d2 is a code sequence [c1b c1a] which is a concatenation of the code sequence c1b and the code sequence c1a. As a result, the average value of the code-modulated current I2 flowing in the transmission path 3 becomes zero, and the modulated current I2 includes only an alternating-current component.

Note that the power generator 1 or the load 5 may be a power storage apparatus, such as a battery and a capacitor. When a power storage apparatus is incorporated in the power transmission system according to the present embodiment, it is possible to effectively utilize power generated during hours of low or no power consumption, and thus, improve overall power efficiency.

Second Embodiment

In the first embodiment, we have described the power transmission system which modulates and transmits a direct-current generated current by code modulation. Meanwhile, in a second embodiment, we describe a power transmission system which modulates and transmits an alternating-current generated current by code modulation.

The power transmission system according to the second embodiment is provided with a code modulator 2A and a code demodulator 4A, which will be described below with reference to FIGS. 10 and 11, in place of the code modulator 2 and the code demodulator 4 of FIG. 1. The other portions of the power transmission system according to the second embodiment are configured in a manner similar to that of the power transmission system according to the first embodiment.

Figure 9:
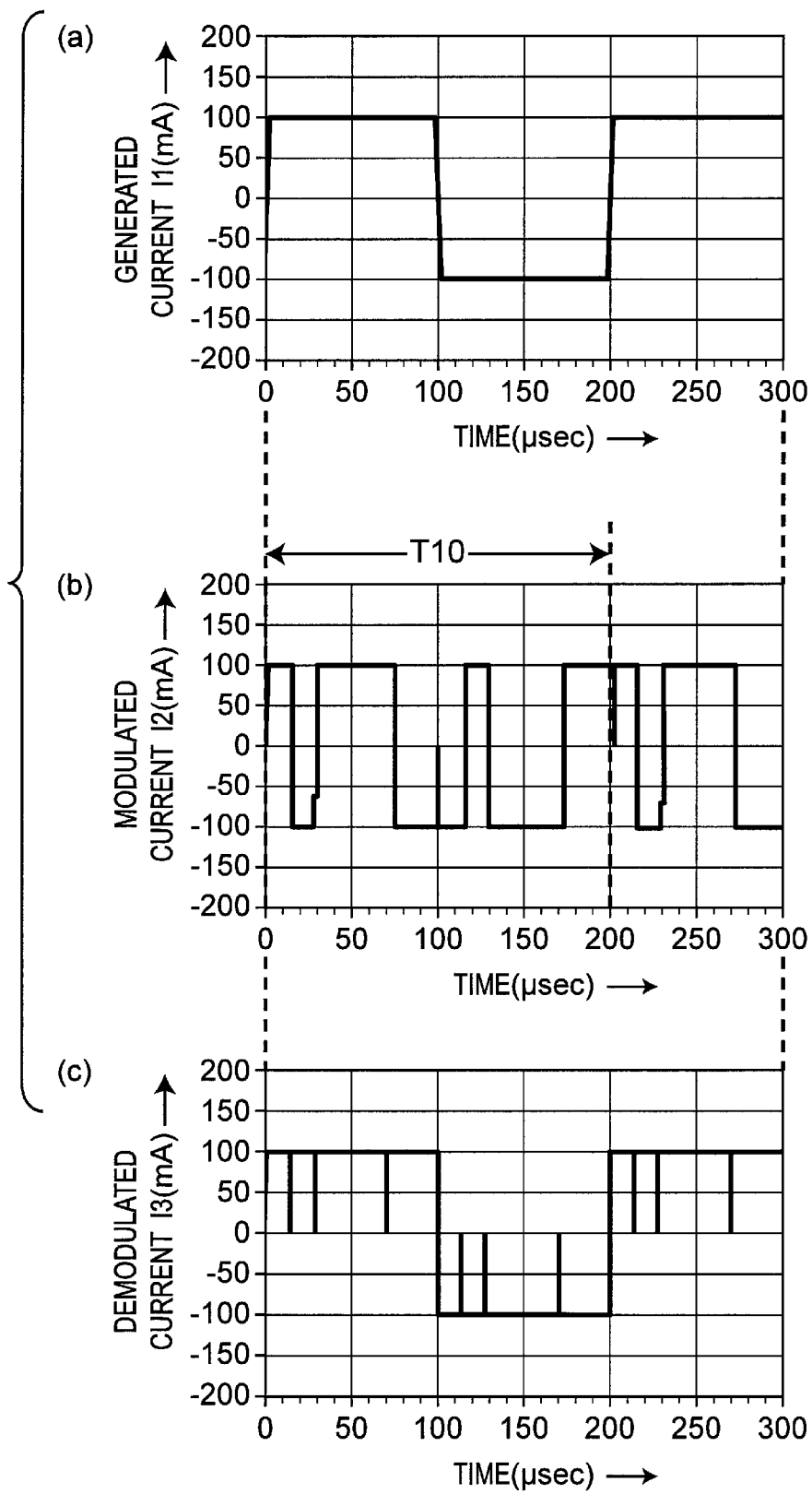
FIG. 9 is a waveform diagram showing exemplary signal waveforms in the power transmission system according to a second embodiment, in which: (a) shows a signal waveform of a generated current I1; (b) shows a signal waveform of a modulated current I2; and (c) shows a signal waveform of a demodulated current I3.

FIG. 9 is a waveform diagram, where (a) to (c) show exemplary signal waveforms in the power transmission system according to the second embodiment. In FIG. 9, (a) shows a signal waveform of a generated current I1; (b) shows a signal waveform of a modulated current I2; and (c) shows a signal waveform of a demodulated current I3. More specifically, FIG. 9 shows exemplary signal waveforms generated as follows: the code modulator 2A modulates the alternating-current generated current I1 by code modulation, and then, the modulated current I2 is transmitted via a transmission path 3, and then, the code demodulator 4A demodulates the modulated current I2 by code demodulation.

The power generator 1 generates the alternating-current generated current I1. For example, the alternating-current generated current I1 has a rectangular waveform at a frequency of 5 kHz, which cyclically repeats positive and negative periods every 200 microseconds. Also in this case, the code modulator 2A multiplies the generated current I1 by a modulation code m0 to generate the alternating modulated current I2, in a manner similar to the code modulation of the direct-current generated current I1 as shown in FIG. 4. The code demodulator 4A multiplies the modulated current I2 by a demodulation code d0 identical to the modulation code m0 to reproduce the alternating-current power generated by the power generator 1, and supply the reproduced alternating-current power to a load 5.

The frequency of the modulation code m0 and the demodulation code d0 is set to frequencies higher than the frequency of the generated current I1 and the frequency of the demodulated current I3. According to the exemplary signal waveform of FIG. 9, the alternating-current generated current I1 (FIG. 9($a$)) is multiplied by the modulation code m0 having a frequency of 35 kHz to generate the modulated current I2 (FIG. 9($b$)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". In case of transmission of the alternating-current generated current I1, the meaning of the code value "1" or "−1" in a period when the generated current I1 is positive (period from 0 to 100 microsecond in FIG. 9($a$)) is different from that of a period when the generated current I1 is negative (period from 100 to 200 microsecond in FIG. 9($a$)). In the period when the generated current I1 is positive, the code value "1" of the modulation code m0 indicates that the code modulator 2A outputs a current in the same direction as the direction of an inputted current, and the code value "−1" of the modulation code m0 indicates that the code modulator 2A outputs a current in the direction opposite to the direction of an inputted current. Similarly, in the period when the generated current I1 is positive, the code value "1" of the demodulation code d0 indicates that the code demodulator 4A outputs a current in the same direction as the direction of an inputted current, and the code value "4" of the demodulation code d0 indicates that the code demodulator 4A outputs a current in the direction opposite to the direction of an inputted current. In the period when the generated current I1 is negative, the code value "1" of the modulation code m0 indicates that the code modulator 2A outputs a current in the direction opposite to the direction of an inputted current, and the code value "−1" of the modulation code m0 indicates that the code modulator 2A outputs a current in the same direction as the direction of an inputted current. Similarly, in the period when the generated current I1 is negative, the code value "1" of the demodulation code d0 indicates that the code demodulator 4A outputs a current in the direction opposite to the direction of an inputted current, and the code value "−1" of the demodulation code d0 indicates that the code demodulator 4A outputs a current in the same direction as the direction of an inputted current.

For example, the modulation code m0 and the demodulation code d0 are given as follows.

$$m0=[1\ -1\ 1\ 1\ 1\ -1\ -1\ -1\ 1\ -1\ -1\ -1\ 1\ 1] \quad (6)$$

$$d0=m0=[1\ -1\ 1\ 1\ 1\ -1\ -1\ -1\ 1\ -1\ -1\ -1\ 1\ 1] \quad (7)$$

Similarly to the code demodulation according to the first embodiment, the modulated current I2 of the code-modulated wave generated by the modulation code m0 is multiplied by the demodulation code d0. This multiplication is denoted as follows.

$$m0 \times d0 = [1\ 1\ 1\ 1\ 1\ 1\ 1\ 1\ 1\ 1\ 1\ 1\ 1\ 1] \quad (8)$$

As apparent from Mathematical Expression (8), the demodulated current I3 (FIG. 8($c$)) is obtained, which is an alternating current similarly to the original generated current I1.

As described above, it is possible to achieve power transmission in an accurately synchronized manner, without power loss, by using the method of code modulation and code demodulation according to the present embodiment. In addition, it is possible to achieve efficient power transmission for a longer period, for example, by repeatedly using the modulation code m0 and demodulation code d0 as described above.

Figure 10:
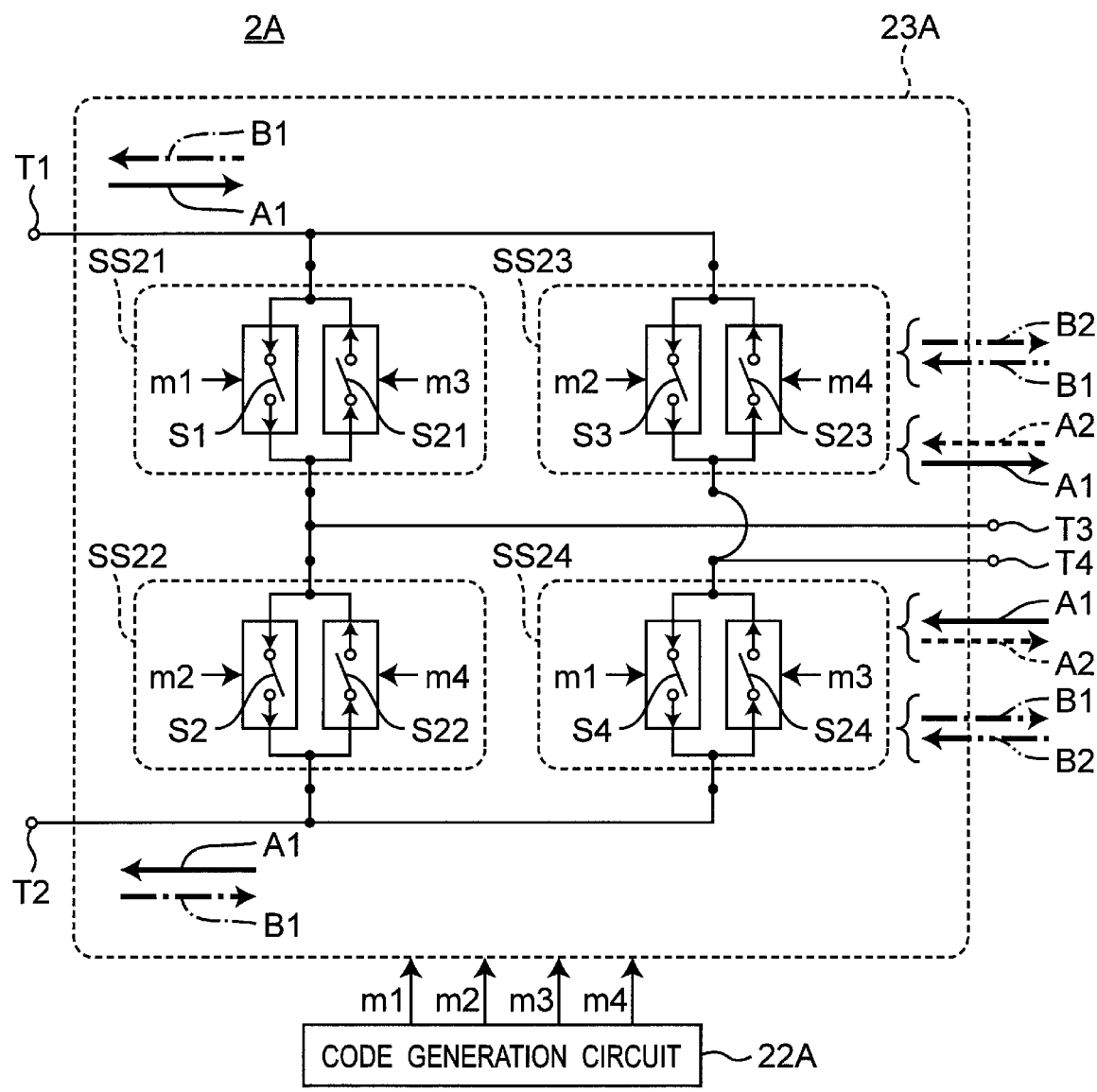
FIG. 10 is a block diagram showing a partial configuration of a code modulator 2A of the power transmission system according to the second embodiment.

FIG. 10 is a block diagram showing a partial configuration of the code modulator 2A of the power transmission system according to the second embodiment. The code modulator 2A of FIG. 10 is provided with a code generation circuit 22A and a code modulation circuit 23A, in place of the code generation circuit 22 and the code modulation circuit 23 of FIG. 5. The code modulator 2A of FIG. 10 is further provided with a control circuit 20 and a communication circuit 21 similarly to the code modulator 2 of FIG. 5, which are omitted in FIG. 10 for ease of illustration.

The code generation circuit 22A and the code modulation circuit 23A of FIG. 10 are different from the code generation circuit 22 and the code modulation circuit 23 of FIG. 7 in following points.

(1) The code generation circuit 22A generates four modulation codes m1 to m4 in place of the two modulation codes m1 and m2, and outputs the generated modulation codes m1 to m4 to the code modulation circuit 23A.

(2) The code modulation circuit 23A is provided with four bidirectional switch circuits SS21 to SS24 connected in a bridge configuration, in place of the unidirectional switch circuits SS1 to SS4.

The code generation circuit 22A generates and outputs the modulation codes m1 to m4 to the code modulation circuit 23A under control of the control circuit 20, in order to operate the code modulator 2A according to the modulation code m0 as described above. Each of the modulation codes m1 to m4 has code values "1" and "0".

In the code modulation circuit 23A, the switch circuit SS21 is provided with the switch element S1 of FIG. 7 to be turned on and off in response to the modulation code m1, and further provided with a switch element S21 having directionality opposite to that of the switch element S1, connected in parallel to the switch element S1, and to be turned on and off in response to the modulation code m3. The switch circuit SS22 is provided with the switch element S2 of FIG. 7 to be turned on and off in response to the modulation code m2, and further provided with a switch element S22 having directionality opposite to that of the switch element S2, connected in parallel to the switch element S2, and to be turned on and off in response to the modulation code m4. The switch circuit SS23 is provided with the switch element S3 of FIG. 7 to be turned on and off in response to the modulation code m2, and further provided with a switch element S23 having directionality opposite to that of the switch element S3, connected in parallel to the switch element S3, and to be turned on and off in response to the modulation code m4. The switch circuit SS24 is provided with the switch element S4 of FIG. 7 to be turned on and off in response to the modulation code m1, and further provided with a switch element S24 having directionality opposite to that of the switch element S4, connected in parallel to the switch element S4, and to be turned on and off in response to the modulation code m3. Each of the switch elements S21 to S24 is made of, for example, an MOS transistor. The code modulation circuit 23A has terminals T1 and T2 connected to a power generator 1, and terminals T3 and T4 connected to the transmission path 3. Alternating-current power is inputted from the power generator 1 to the code modulation circuit 23A. The code modulation circuit 23A modulates the alternating-current power by code modulation, and then, outputs a code-modulated wave to the transmission path 3.

Figure 11:
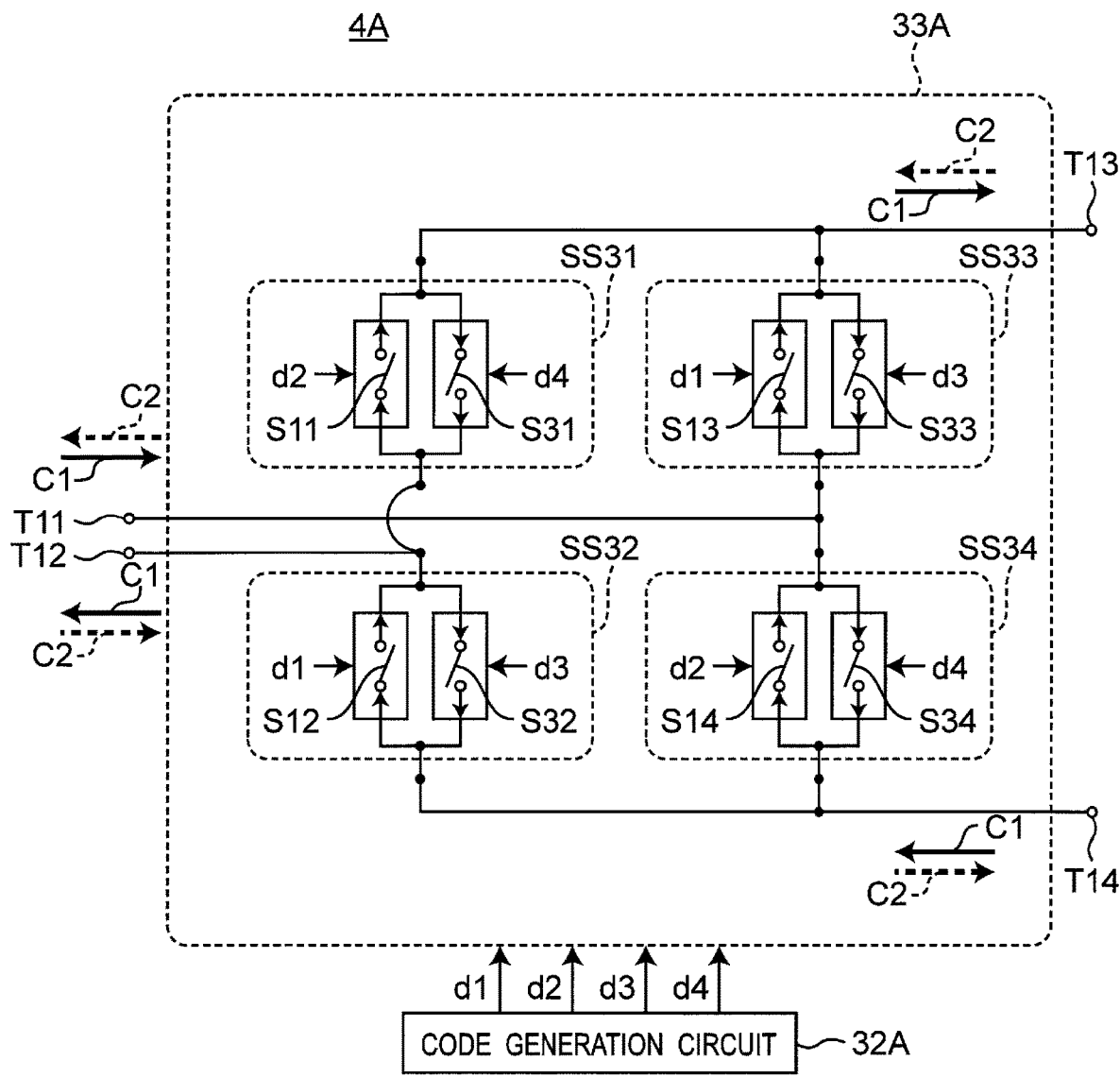
FIG. 11 is a block diagram showing a partial configuration of a code demodulator 4A of the power transmission system according to the second embodiment.

FIG. 11 is a block diagram showing a partial configuration of the code demodulator 4A of the power transmission system according to the second embodiment. The code demodulator 4A of FIG. 11 is provided with a code generation circuit 32A and a code demodulation circuit 33A, in place of the code generation circuit 32 and the code demodulation circuit 33 of FIG. 6. The code demodulator 4A of FIG. 11 is further provided with a control circuit 30 and a communication circuit 31 similarly to the code demodulator 4 of FIG. 5, which are omitted in FIG. 11 for ease of illustration.

The code generation circuit 32A and the code demodulation circuit 33A of FIG. 11 are different from the code generation circuit 32 and the code demodulation circuit 33 of FIG. 7 in following points.

(1) The code generation circuit 32A generates four demodulation codes d1 to d4 in place of the two modulation codes d1 and d2, and outputs the generated demodulation codes d1 to d4 to the code demodulation circuit 33A.

(2) The code demodulation circuit 33A is provided with four bidirectional switch circuits SS31 to SS34 connected in a bridge configuration, in place of the unidirectional switch circuits SS11 to SS14.

The code generation circuit 32A generates and outputs the demodulation codes d1 to d4 to the code demodulation circuit 33A under control of the control circuit 30, in order to operate the code demodulator 4A according to the demodulation code d0 as described above. Each of the demodulation codes d1 and d4 has code values "1" and "0".

In the code demodulation circuit 33A, the switch circuit SS31 is provided with the switch element S11 of FIG. 7 to be turned on and off in response to the demodulation code d2, and further provided with a switch element S31 having directionality opposite to that of the switch element S11, connected in parallel to the switch element S11, and to be turned on and off in response to the demodulation code d4. The switch circuit SS32 is provided with the switch element S12 of FIG. 7 to be turned on and off in response to the demodulation code d1, and further provided with a switch element S32 having directionality opposite to that of the switch element S12, connected in parallel to the switch element S12, and to be turned on and off in response to the demodulation code d3. The switch circuit SS33 is provided with the switch element S13 of FIG. 7 to be turned on and off in response to the demodulation code d1, and further provided with a switch element S33 having directionality opposite to the switch element S13, connected in parallel to the switch element S13, and to be turned on and off in response to the demodulation code d3. The switch circuit SS34 is provided with the switch element S14 of FIG. 7 to be turned on and off in response to the demodulation code d2, and further provided with a switch element S34 having directionality opposite to that of the switch element S14, connected in parallel to the switch element S14, and to be turned on and off in response to the demodulation code d4. Each of the switch elements S31 to S34 is made of, for example, an MOS transistor. The code demodulation circuit 33A has terminals T11 and T12 connected to the transmission path 3, and terminals T13 and T14 connected to the load 5. An alternating-current code-modulated wave is inputted from the transmission path 3 to the code demodulation circuit 33A. The code demodulation circuit 33A demodulates the code-modulated wave by code demodulation into alternating-current demodulated power, and then outputs the demodulated power to the load 5.

Figure 12A:
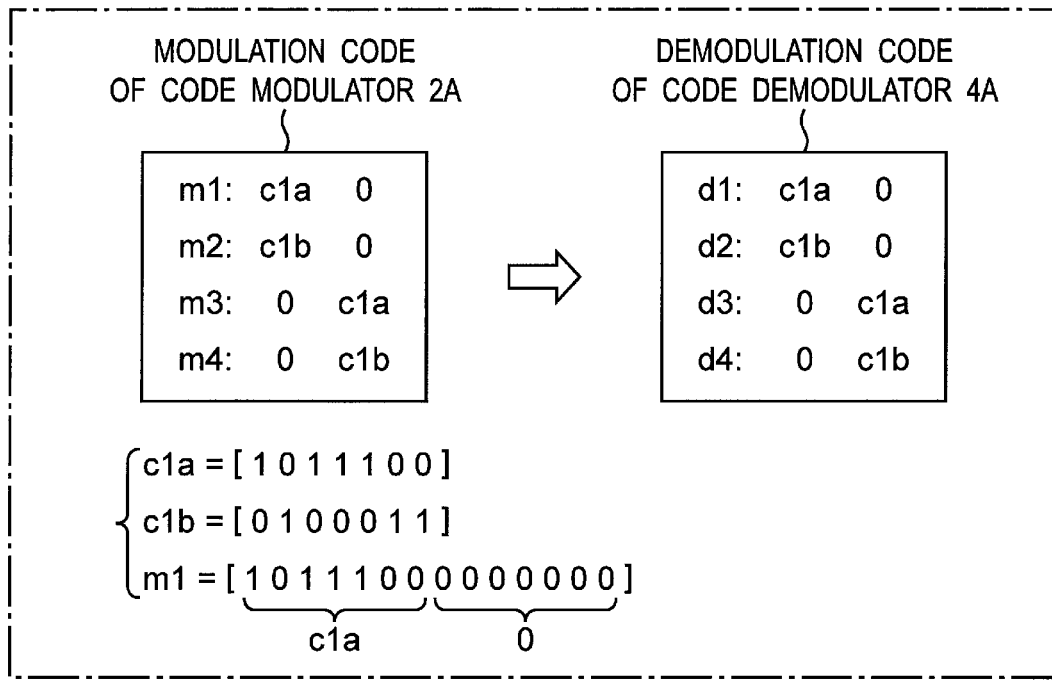
FIG. 12A is a diagram showing an example of a modulation code of the code modulator 2A and a demodulation code of the code demodulator 4A in the power transmission system according to the second embodiment, as a third implementation example in which alternating-current power is transmitted and received.

FIG. 12A is a diagram showing an example of a modulation code of the code modulator 2A and a demodulation code of the code demodulator 4A in the power transmission system according to the second embodiment, as a third implementation example in which alternating-current power is transmitted and received. More specifically, FIG. 12A shows an example of the modulation codes m1 to m4 inputted to the bidirectional switch circuits SS21 to SS24 of the code modulation circuit 23A, and the demodulation codes d1 to d4 inputted to the bidirectional switch circuits SS31 to SS34 of the code demodulation circuit 33A.

As shown in FIG. 12A, the modulation code m1 and the demodulation code d1 are identical to each other, and the modulation code m2 and the demodulation code d2 are identical to each other. Similarly, the modulation code m3 and the demodulation code d3 are identical to each other, and the modulation code m4 and the demodulation code d4 are identical to each other. In addition, similarly to the case of direct-current power transmission, code sequences c1$a$ and c1$b$ are configured such that when the code value of a certain bit of the code sequence c1$a$ is "1", the code value of a corresponding bit of the code sequence c1$b$ is "0"; and when the code value of a certain bit of the code sequence c1$a$ is "0", the code value of a corresponding bit of the code sequence c1$b$ is "1".

FIG. 12A shows a case in which the duration of the code sequence c1$a$ and the code sequence c1$b$ is set to be equal to a half of the cycle of the alternating-current generated current I1. In a period when the alternating-current generated current I1 flows in the positive direction (in example of FIG. 12A, former half period of each cycle), the modulation codes m1 and m2 are the code sequences c1$a$ and c1$b$, respectively, and on the other hand, all code values of the modulation codes m3 and m4 are "0". In a period when the alternating-current generated current I1 flows in the negative direction (in example of FIG. 12A, latter half period of each cycle), all the code values of the modulation codes m1 and m2 are "0", and on the other hand, the modulation codes m3 and m4 are the code sequences c1$a$ and c1$b$, respectively. Each of the modulation codes m1 to m4 for one cycle is generated by concatenating bits for a former half of each cycle with bits for a latter half of each cycle. Accordingly, in the former half of each cycle, the switch elements S1 to S4 are turned on and off according to the modulation codes m1 and m2, and on the other hand, the switch elements S21 to S24 are disconnected and no current flows. In addition, in the latter half of each cycle, the switch elements S1 to S4 are disconnected and no current flows, and on the other hand, the switch elements S21 to S24 are turned on and off according to the modulation codes m3 and m4. Similarly to the modulation codes m1 to m4, each of the demodulation codes d1 to d4 for one cycle is generated by concatenating bits for the former half of each cycle with bits for the latter half of each cycle.

Now, operation of the code modulation circuit 23A is described.

At first, operation is described for a case in which the generated current I1 flows at the input terminals T1 and T2 in the positive direction, i.e., in a direction of solid arrows A1. In this case, when the switch elements S1 and S4 receiving the code value "1" of the modulation code m1 are turned on, the switch elements S2 and S3 receiving the code value "0" of the modulation code m2 are turned off. In addition, when the switch elements S1 and S4 receiving the code value "0" of the modulation code m1 are turned off, the switch elements S2 and S3 receiving the code value "1" of the modulation code m2 are turned on. Thus, when the switch elements S1 and S4 are turned on, and the switch elements S2 and S3 are turned off, the modulated current I2 flows in the transmission path 3 in a positive direction, i.e., in a direction of the solid arrows A1. On the other hand, when the switch elements S1 and S4 are turned off, and the switch elements S2 and S3 are turned on, the modulated current I2 flows in the transmission path 3 in a negative direction, i.e., in a direction of dotted arrows A2. Accordingly, when the current of positive period of the alternating-current generated current I1 is inputted to the code modulation circuit 23A, it is possible to transmit the alternating-current modulated current I2 to the transmission path 3, as shown in FIG. 9(b).

Next, operation is described for a case in which the generated current I1 flows at the input terminals T1 and T2 in a negative direction, i.e., in a direction of chain arrows B1. In this case, when the switch elements S21 and S24 receiving the code value "1" of the modulation code m3 are turned on, the switch elements S22 and S23 receiving the code value "0" of the modulation code m4 are turned off. In addition, when the switch elements S21 and S24 receiving the code value "0" of the modulation code m3 are turned off, the switch elements S22 and S23 receiving the code value "1" of the modulation code m4 are turned on. Thus, when the switch elements S21 and S24 are turned on, and the switch elements S22 and S23 are turned off, the modulated current I2 flows in the transmission path 3 in a negative direction, i.e., in a direction of the chain arrows B1. On the other hand, when the switch elements S21 and S24 are turned off, and the switch elements S22 and S23 are turned on, the modulated current I2 flows in the transmission path 3 in a positive direction, i.e., in a direction of two-dot chain arrows B2. Accordingly, when the current of negative period of the alternating-current generated current I1 is inputted to the code modulation circuit 23A, it is possible to transmit the alternating-current modulated current I2 to the transmission path 3, as shown in FIG. 9(b).

As described with reference to FIG. 10, the code modulation circuit 23A can generate the alternating-current modulated current I2, as shown in FIG. 9(b), in both the positive and negative periods of the alternating-current generated current I1.

Next, operation of the code demodulation circuit 33A of FIG. 11 is described.

At first, we consider a case in which the generated current I1 flows at the input terminals T1 and T2 of the code modulation circuit 23A in the positive direction, i.e., in the direction of the solid arrows A1. In this case, the alternating-current modulated current I2 flowing in the positive and negative directions is inputted to the input terminals T11 and T12 of the code demodulation circuit 33A via the transmission path 3. When the code demodulation circuit 33A correctly performs demodulation operation, the demodulated current I3 flows at the output terminals T13 and T14 of the code demodulation circuit 33A in a positive direction, i.e., in a direction of solid arrows C1. These operations are described below. In this case, all code values of the demodulation code d3 and the demodulation code d4 are "0", and all the switch elements S31 to S34 are turned off.

At first, operation of the code demodulation circuit 33A is described for a case in which the generated current I1 flows at the input terminals T1 and T2 of the code modulation circuit 23A in the positive direction, and the modulated current I2 flows at the input terminals T11 and T12 of the code demodulation circuit 33A in the positive direction, i.e., in the direction of the solid arrows C1. In this case, the code value of the code sequence c1a is "1", and the code value of the code sequence c1b is "0". Accordingly, the switch elements S12 and S13 receiving the code value "1" of the demodulation code d1 are turned on, and the switch elements S11 and S14 receiving the code value "0" of the demodulation code d2 are turned off. Therefore, the demodulated current I3 flows at the output terminals T13 and T14 in the positive direction, i.e., in the direction of the solid arrows C1.

Next, operation of the code demodulation circuit 33A is described for a case in which the generated current I1 flows at the input terminals T1 and T2 of the code modulation circuit 23A in the positive direction, and the modulated current I2 flows at the input terminals T11 and T12 of the code demodulation circuit 33A in the negative direction, i.e., in the direction of dotted arrows C2. In this case, the code value of the code sequence c1a is "0", and the code value of the code sequence c1b is "1". Accordingly, the switch elements S12 and S13 receiving the code value "0" of the demodulation code d1 are turned off, and the switch elements S11 and S14 receiving the code value "1" of the demodulation code d2 are turned on. Therefore, the demodulated current I3 flows at the output terminals T13 and T14 in the positive direction, i.e., in the direction of the solid arrows C1. Accordingly, when the current of positive period of the alternating-current generated current I1 is inputted to the code modulation circuit 23A, the code demodulation circuit 33A can output the demodulated current I3 which is correctly demodulated with positive polarity, to the load 5, as shown in FIG. 9(c).

Next, we consider a case in which the generated current I1 flows at the input terminals T1 and T2 of the code modulation circuit 23A in the negative direction, i.e., in the direction of the chain arrows B1. Similarly to the above case, the alternating-current modulated current I2 flowing in the positive and negative directions is inputted to the input terminals T11 and T12 of the code demodulation circuit 33A via the transmission path 3. When the code demodulation circuit 33A correctly performs demodulation operation, the demodulated current I3 flows at the output terminals T13 and T14 of the code demodulation circuit 33A in the negative direction, i.e., in a direction of the dotted arrows C2. These operations are described below. In this case, all code values of the demodulation codes d1 and d2 are "0", and all the switch elements S11 to S14 are turned off.

At first, described is operation of the code demodulation circuit 33A for a case in which the generated current I1 flows at the input terminals T1 and T2 of the code modulation circuit 23A in the negative direction, and the modulated current I2 flows at the input terminals T11 and T12 of the code demodulation circuit 33A in the negative direction, i.e., in the direction of dotted arrows C2. In this case, the code value of the code sequence c1a is "1", and the code value of the code sequence c1b is "0". Accordingly, the switch elements S32 and S33 receiving the code value "1" of the demodulation code d3 are turned on, and the switch elements S31 and S34 receiving the code value "0" of the demodulation code d4 are turned off. Therefore, the demodulated current I3 flows at the output terminals T13 and T14 in the negative direction, i.e., in the direction of the dotted arrows C2.

Next, operation of the code demodulation circuit 33A is described for a case in which the generated current I1 flows at the input terminals T1 and T2 of the code modulation circuit 23A in the negative direction, and the modulated current I2 flows at the input terminals T11 and T12 of the code demodulation circuit 33A in the positive direction, i.e., in the direction of the solid arrows C1. In this case, the code value of the code sequence c1$a$ is "0", and the code value of the code sequence c1$b$ is "1". Accordingly, the switch elements S32 and S33 receiving the code value "0" of the demodulation code d3 are turned off, and the switch elements S31 and S34 receiving the code value "1" of the demodulation code d4 are turned on. Therefore, the demodulated current I3 flows at the output terminals T13 and T14 in the negative direction, i.e., in the direction of the dotted arrows C2. Accordingly, when the current of negative period of the alternating-current generated current I1 is inputted to the code modulation circuit 23A, the code demodulation circuit 33A can output the demodulated current I3 which is correctly demodulated with negative polarity, to the load 5, as shown in FIG. 9(c).

As described above, when using the modulation codes m1 to m4 and the demodulation codes d1 to d4 of FIG. 12A, equivalently, the code modulator 2A operates according to the modulation code m0 of Mathematical Expression (6), and the code demodulator 4A operates according to the demodulation code d0 of Mathematical Expression (7).

As described above, according to FIGS. 10, 11, and 12A, when the alternating-current generated current I1 is inputted to the code modulator 2A, it is possible to extract the demodulated current I3 from the code demodulator 4A, the demodulated current I3 being also an alternating current similarly to the generated current I1 inputted to the code modulator 2A. Therefore, according to the second embodiment, it is possible to modulate the alternating-current generated current I1 by code modulation into the alternating-current modulated current I2, and then, transmit the modulated current I2 via the transmission path 3, and then, demodulate the modulated current I2 into the alternating-current demodulated current I3.

Figure 12B:
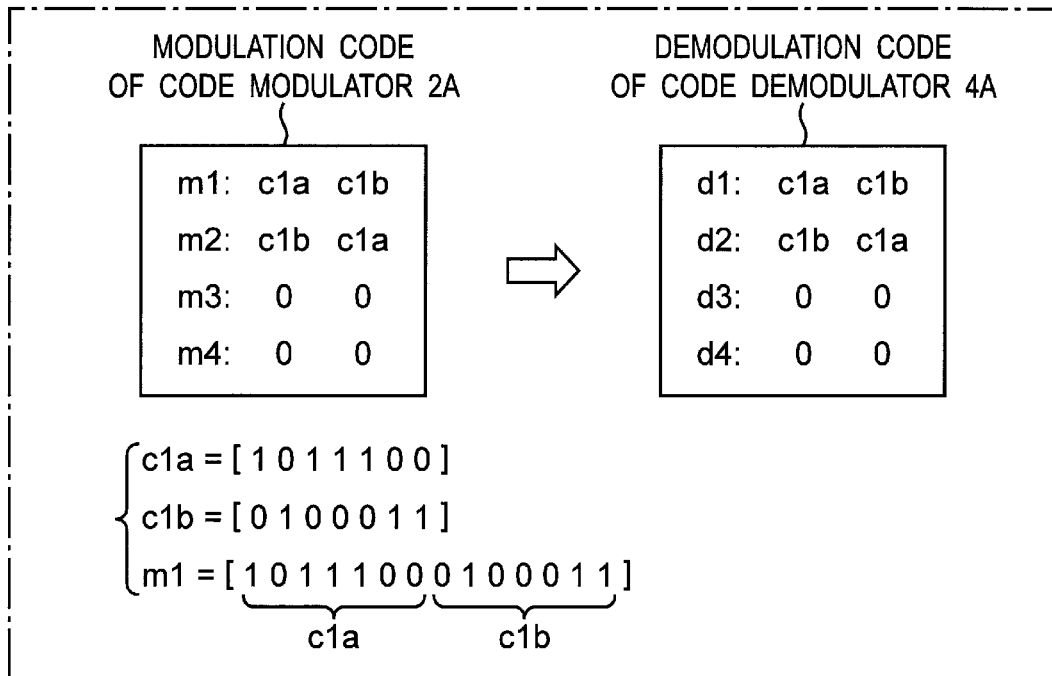
FIG. 12B is a diagram showing an example of a modulation code of the code modulator 2A and a demodulation code of the code demodulator 4A in the power transmission system according to the second embodiment, as a fourth implementation example in which direct-current power is transmitted and received.

FIG. 12B is a diagram showing an example of a modulation code of the code modulator 2A and a demodulation code of the code demodulator 4A in the power transmission system according to the second embodiment, as a fourth implementation example in which direct-current power is transmitted and received. In this case, in the code modulation circuit 23A of FIG. 10 and the code demodulation circuit 33A of FIG. 11, all code values of the modulation codes m3 and m4 and the demodulation codes d3 and d4 are set to "0" as shown in FIG. 12B, and thus, the switch elements S21 to S24 and S31 to S34 are turned off. Thus, the code modulation circuit 23A of FIG. 10 and the code demodulation circuit 33A of FIG. 11 operate as the code modulation circuit 23 and the code demodulation circuit 33 of FIG. 7, respectively. Accordingly, it is possible to achieve direct-current power transmission of FIG. 4 by generating the modulation codes m1 and m2 and the demodulation codes d1 and d2 from the code sequences c1$a$ and c1$b$ as shown in FIG. 12B. Thus, by changing the modulation codes m1 to m4 and the demodulation codes d1 to d4, it is possible to achieve a favorable power transmission system capable of supporting both direct-current power transmission and alternating-current power transmission using the code modulation circuit 23A of FIG. 10 and the code demodulation circuit 33A of FIG. 11.

The direct-current power generator 1 may be, for example, a photovoltaic power generator. The alternating-current power generator 1 may be, for example, a power generator provided with a turbine rotated by thermal power, hydraulic power, wind power, nuclear power, tidal power, or the like.

As described above, by using the modulation code and the demodulation code identical to each other, the power transmission system according to the second embodiment is capable of modulating and transmitting the direct-current generated current I1 and demodulating the modulated current into the direct-current demodulated current I3, and is also capable of modulating and transmitting the alternating-current generated current I1 and demodulating the modulated current into the alternating-current demodulated current I3. In addition, by using the demodulation code different from the modulation code, the power transmission system according to the second embodiment is capable of modulating and transmitting the direct-current generated current I1 and demodulating the modulated current into the alternating-current demodulated current I3, and is also capable of modulating and transmitting the alternating-current generated current I1 and demodulating the modulated current into the direct-current demodulated current I3.

Since the code modulation circuit 23A of FIG. 10 and the code demodulation circuit 33A of FIG. 11 are provided with the bidirectional switch circuits SS21 to SS24 and SS31 to SS34, these circuits are reversible. More specifically, the code modulation circuit 23A is also operable as a code demodulation circuit to demodulate a modulated current inputted from the terminals T3 and T4 and output the demodulated current from the terminals T1 and T2. The code demodulation circuit 33A is also operable as a code modulation circuit to modulate a generated current inputted from the terminals T13 and T14 and output the modulated current from the terminals T11 and T12. Thus, it is possible to transmit power from the code demodulator provided with the code demodulation circuit 33A, to the code modulator provided with the code modulation circuit 23A.

FIGS. 10 to 11 show the example in which each of the bidirectional switch circuits SS21 to SS34 is made of a pair of switch elements connected in parallel such that currents flow in opposite directions (S1, S21; S2, S22; S3, S23; S4, S24; S11, S31; S12, S32; S13, S33; S14, S34). Alternatively, each of the bidirectional switch circuits SS21 to SS34 may be made of a pair of switch elements connected in series, as shown in FIGS. 13A to 14D (S41, S51; S42, S52; S43, S53; S44, S54). In each of FIGS. 13A to 14D, the direction from top to bottom is referred to as a "positive direction", and the direction from bottom to top is referred to as a "negative direction".

Figure 13A:
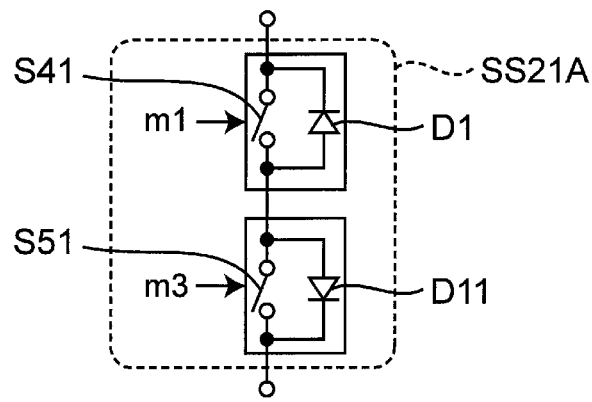
FIG. 13A is a circuit diagram showing a configuration of a bidirectional switch circuit SS21A for a code modulation circuit 23A used in a power transmission system according to a modified embodiment of the second embodiment.

FIG. 13A is a circuit diagram showing a configuration of a bidirectional switch circuit SS21A for a code modulation circuit 23A used in a power transmission system according to a modified embodiment of the second embodiment. The switch circuit SS21A of FIG. 13A corresponds to the switch circuit SS21 of FIG. 10, and is made of series connection of: (1) a switch element S41 connected in parallel with a diode D1 allowing a current to flow in the negative direction, and turned on and off in accordance with the modulation code m1; and (2) a switch element S51 connected in parallel with a diode D11 allowing a current to flow in the positive direction, and turned on and off in accordance with the modulation code m3.

Figure 13B:
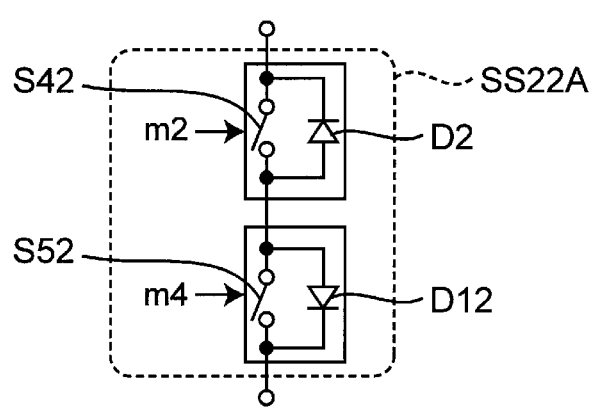
FIG. 13B is a circuit diagram showing a configuration of a bidirectional switch circuit SS22A for the code modulation circuit 23A used in the power transmission system according to the modified embodiment of the second embodiment.

FIG. 13B is a circuit diagram showing a configuration of a bidirectional switch circuit SS22A for the code modulation circuit 23A used in the power transmission system according to the modified embodiment of the second embodiment. The switch circuit SS22A of FIG. 13B corresponds to the switch circuit SS22 of FIG. 10, and is made of series connection of: (1) a switch element S42 connected in parallel with a diode D2 allowing a current to flow in the negative direction, and turned on and off in accordance with the modulation code m2; and (2) a switch element S52 connected in parallel with a diode D12 allowing a current to flow in the positive direction, and turned on and off in accordance with the modulation code m4.

Figure 13C:
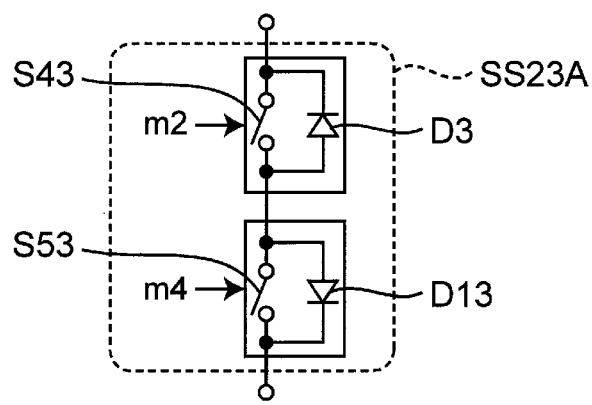
FIG. 13C is a circuit diagram showing a configuration of a bidirectional switch circuit SS23A for the code modulation circuit 23A used in the power transmission system according to the modified embodiment of the second embodiment.

FIG. 13C is a circuit diagram showing a configuration of a bidirectional switch circuit SS23A for the code modulation circuit 23A used in the power transmission system according to the modified embodiment of the second embodiment. The switch circuit SS23A of FIG. 13C corresponds to the switch circuit SS23 of FIG. 10, and is made of series connection of: (1) a switch element S43 connected in parallel with a diode D3 allowing a current to flow in the negative direction, and turned on and off in accordance with the modulation code m2; and (2) a switch element S53 connected in parallel with a diode D13 allowing a current to flow in the positive direction, and turned on and off in accordance with the modulation code m4.

Figure 13D:
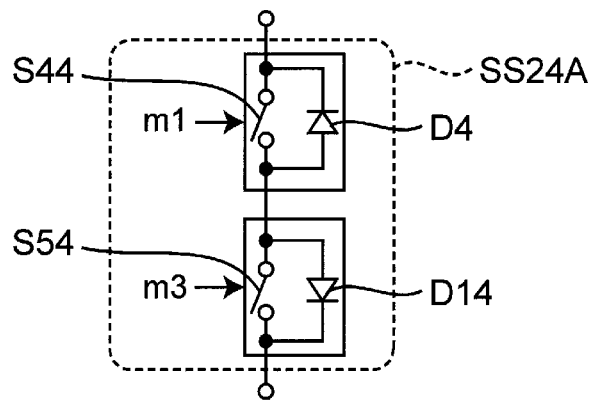
FIG. 13D is a circuit diagram showing a configuration of a bidirectional switch circuit SS24A for the code modulation circuit 23A used in the power transmission system according to the modified embodiment of the second embodiment.

FIG. 13D is a circuit diagram showing a configuration of a bidirectional switch circuit SS24A for the code modulation circuit 23A used in the power transmission system according to the modified embodiment of the second embodiment. The switch circuit SS24A of FIG. 13D corresponds to the switch circuit SS24 of FIG. 10, and is made of series connection of: (1) a switch element S44 connected in parallel with a diode D4 allowing a current to flow in the negative direction, and turned on and off in accordance with the modulation code m1; and (2) a switch element S54 connected in parallel with a diode D14 allowing a current to flow in the positive direction, and turned on and off in accordance with the modulation code m3.

Figure 14A:
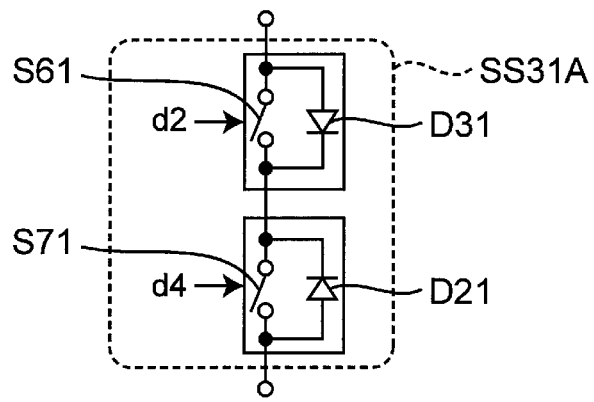
FIG. 14A is a circuit diagram showing a configuration of a bidirectional switch circuit SS31A for a code demodulation circuit 33A used in the power transmission system according to the modified embodiment of the second embodiment.

FIG. 14A is a circuit diagram showing a configuration of a bidirectional switch circuit SS31A for a code demodulation circuit 33A used in the power transmission system according to the modified embodiment of the second embodiment. The switch circuit SS31A of FIG. 14A corresponds to the switch circuit SS31 of FIG. 11, and is made of series connection of: (1) a switch element S61 connected in parallel with a diode D31 allowing a current to flow in the positive direction, and turned on and off in accordance with the demodulation code d2; and (2) a switch element S71 connected in parallel with a diode D21 allowing a current to flow in the negative direction, and turned on and off in accordance with the demodulation code d4.

Figure 14B:
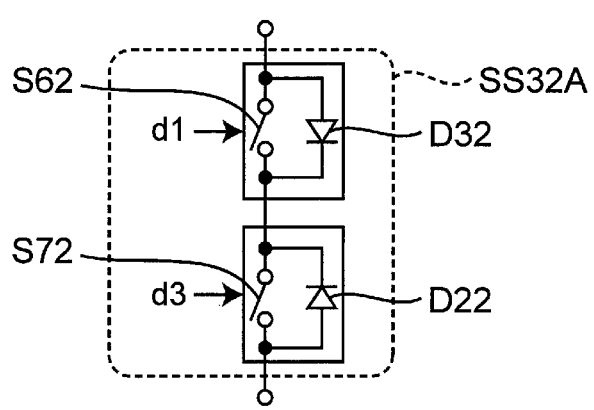
FIG. 14B is a circuit diagram showing a configuration of a bidirectional switch circuit SS32A for the code demodulation circuit 33A used in the power transmission system according to the modified embodiment of the second embodiment.

FIG. 14B is a circuit diagram showing a configuration of a bidirectional switch circuit SS32A for the code demodulation circuit 33A used in the power transmission system according to the modified embodiment of the second embodiment. The switch circuit SS32A of FIG. 14B corresponds to the switch circuit SS32 of FIG. 11, and is made of series connection of: (1) a switch element S62 connected in parallel with a diode D32 allowing a current to flow in the positive direction, and turned on and off in accordance with the demodulation code d1; and (2) a switch element S72 connected in parallel with a diode D22 allowing a current to flow in the negative direction, and turned on and off in accordance with the demodulation code d3.

Figure 14C:
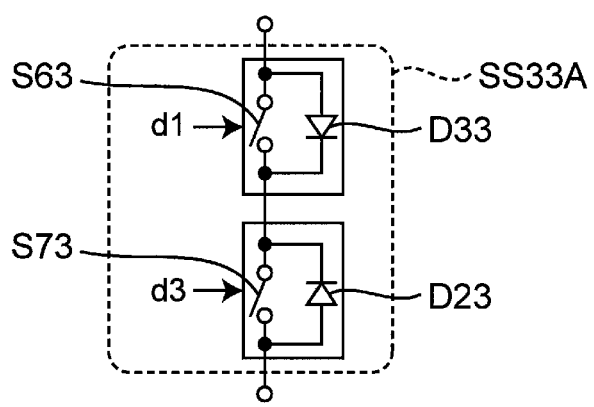
FIG. 14C is a circuit diagram showing a configuration of a bidirectional switch circuit SS33A for the code demodulation circuit 33A used in the power transmission system according to the modified embodiment of the second embodiment.

FIG. 14C is a circuit diagram showing a configuration of a bidirectional switch circuit SS33A for the code demodulation circuit 33A used in the power transmission system according to the modified embodiment of the second embodiment. The switch circuit SS33A of FIG. 14C corresponds to the switch circuit SS33 of FIG. 11, and is made of series connection of: (1) a switch element S63 connected in parallel with a diode D33 allowing a current to flow in the positive direction, and turned on and off in accordance with the demodulation code d1; and (2) a switch element S73 connected in parallel with a diode D23 allowing a current to flow in the negative direction, and turned on and off in accordance with the demodulation code d3.

Figure 14D:
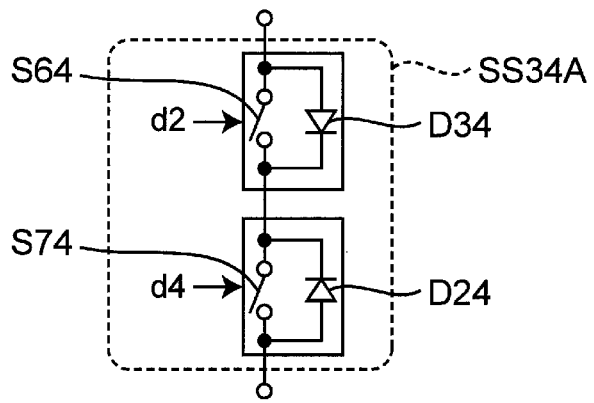
FIG. 14D is a circuit diagram showing a configuration of a bidirectional switch circuit SS34A for the code demodulation circuit 33A used in the power transmission system according to the modified embodiment of the second embodiment.

FIG. 14D is a circuit diagram showing a configuration of a bidirectional switch circuit SS34A for the code demodulation circuit 33A used in the power transmission system according to the modified embodiment of the second embodiment. The switch circuit SS34A of FIG. 14D corresponds to the switch circuit SS34 of FIG. 11, and is made of series connection of: (1) a switch element S64 connected in parallel with a diode D34 allowing a current to flow in the positive direction, and turned on and off in accordance with the demodulation code d2; and (2) a switch element S74 connected in parallel with a diode D24 allowing a current to flow in the negative direction, and turned on and off in accordance with the demodulation code d4.

Referring to FIG. 13A to FIG. 14D, each of the switch elements S41 to S74 may be made of, for example, an MOS transistor. Parallel parasitic (body) diodes D1 to D34 of MOS transistors may be used. For example, when each of the switch circuits SS21A to SS34A of FIGS. 13A to 14D is implemented by a switch element of an MOS transistor and one diode, two MOS transistors and two diodes are required for each one of the bidirectional switch circuit SS21A to SS34A. Meanwhile, packaged MOS transistors are widely available, including a built-in diode having good reverse characteristics. When using such packaged MOS transistors, each of the bidirectional switch circuits SS21A to SS34A can be made of two switch elements, and thus, size can be reduced.

Third Embodiment

In the first and second embodiments, we have described the power transmission systems which transmit power from the one power generator 1 to the one load 5. Meanwhile, in a third embodiment, we describe a power transmission system which transmits powers from a plurality of power generators to a plurality of loads.

Figure 15:
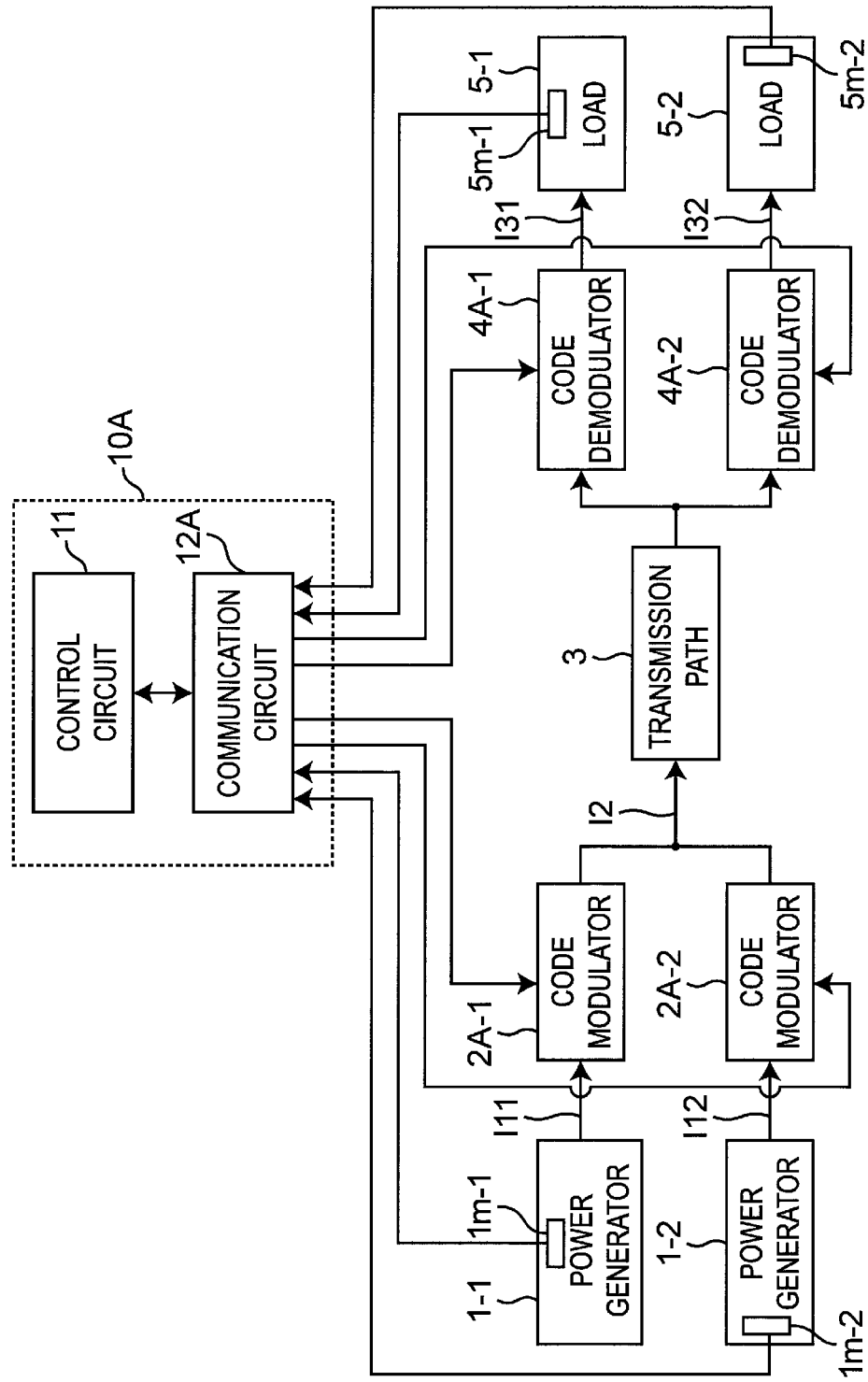
FIG. 15 is a block diagram showing a configuration of a power transmission system according to a third embodiment.

FIG. 15 is a block diagram showing a configuration of a power transmission system according to the third embodiment. Referring to FIG. 15, the power transmission system according to the third embodiment is provided with a plurality of power generators 1-1 and 1-2, a plurality of code modulators 2A-1 and 2A-2, a transmission path 3, a plurality of code demodulators 4A-1 and 4A-2, a plurality of loads 5-1 and 5-2, and a controller 10A.

The controller 10A is provided with a control circuit 11 and a communication circuit 12A. The control circuit 11 communicates with the code modulators 2A-1 and 2A-2 and the code demodulators 4A-1 and 4A-2 via the communication circuit 12A, and controls operations of the code modulators 2A-1 and 2A-2 and the code demodulators 4A-1 and 4A-2.

In the power transmission system of FIG. 15, each of the code modulators 2A-1 and 2A-2 operates as a power transmitter apparatus, and each of the code demodulators 4A-1 and 4A-2 operates as a power receiver apparatus. Each of a plurality of power transmitter apparatuses included in the code modulators 2A-1 and 2A-2 modulates first power to generate a code-modulated wave by code modulation using a modulation code based on a code sequence, and transmits the code-modulated wave to one of the code demodulators 4A-1 and 4A-2 via the transmission path 3. Each one of the code demodulators 4A-1 and 4A-2 receives the code-modulated wave from one of the code modulators 2A-1 and 2A-2 via the transmission path 3, and demodulates the received code-modulated wave to generate second power by code demodulation using a demodulation code based on a code sequence identical to the code sequence of the modulation code used for the code modulation. The first powers are, for example, powers generated by the power generators 1-1 and 1-2, and are shown as generated currents I11 and I12 in FIG. 15. The code-modulated wave is alternating-current power modulated by code modulation, and is shown as a modulated current I2 in FIG. 15. The second power are, for example, powers to be supplied to the loads 5-1 and 5-2, and are shown as demodulated currents I31 and I32 in FIG. 1.

In this case, the code modulators 2A-1 and 2A-2 and the code demodulators 4A-1 and 4A-2 of FIG. 15 are configured and operated similarly to the code modulator 2A and the code demodulator 4A according to the second embodiment.

The power transmission system of FIG. 15 is further provided with power meters 1m-1, 1m-2, 5m-1, and 5m-2. Each of the power meters 1m-1 and 1m-2 is first power measuring means which measures an amount of the first power. More specifically, each of the power meters 1m-1 and 1m-2 measures an amount of power generated by the power generators 1-1 and 1-2 and transmitted from the power generators 1-1 and 1-2 to the code modulators 2A-1 and 2A-2. Each of the power meters 5m-1 and 5m-2 is second power measuring means which measures an amount of the second power. More specifically, each of the power meters 5m-1 and 5m-2 measures an amount of power transmitted from the code demodulators 4A-1 and 4A-2 to the loads 5-1 and 5-2, and used by the loads 5-1 and 5-2. The amounts of powers measured by the power meters 1m-1, 1m-2, 5m-1, and 5m-2 are transmitted to the controller 10A.

The controller 10A controls operations of the code modulators 2A-1 and 2A-2 and the code demodulators 4A-1 and 4A-2 based on the amounts of powers received from the power meters 1m-1, 1m-2, 5m-1, and 5m-2. For example, the controller 10A transmits control signals to the code modulators 2A-1 and 2A-2 and the code demodulators 4A-1 and 4A-2, the control signals including synchronization signals for synchronizing the code modulators 2A-1 and 2A-2 and the code demodulators 4A-1 and 4A-2 to each other, thus achieving code modulation and code demodulation of power in an accurately synchronized manner.

The controller 10A transmits the code sequences of the modulation codes, or information specifying the code sequences, to at least one of the code modulators 2A-1 and 2A-2, which is to transmit power, and transmits the code sequences of the demodulation codes, or information specifying the code sequences, to at least one of the code demodulators 4A-1 and 4A-2, which is to receive power. For example, when transmitting power from the code modulator 2A-1 to the code demodulator 4A-1, the controller 10A sets a modulation code to the code modulator 2A-1, and a demodulation code to the code demodulator 4A-1, based on one code sequence. When simultaneously transmitting power from the code modulator 2A-2 to the code demodulator 4A-2, the controller 10A sets a modulation code to the code modulator 2A-2, and a demodulation code to the code demodulator 4A-2, based on another different code sequence. When simultaneously transmitting powers from the plurality of code modulators 2A-1 and 2A-2 to the plurality of code demodulators 4A-1 and 4A-2, a plurality of low-correlated (e.g., orthogonal) code sequences may be used.

Thus, it is possible to transmit powers from the plurality of power generators 1-1 and 1-2 to the plurality of loads 5-1 and 5-2.

Now, we describe exemplary operations of the code modulators 2A-1 and 2A-2 and the code demodulators 4A-1 and 4A-2 for transmitting powers generated by the power generators 1-1 and 1-2 to the loads 5-1 and 5-2.

In the third embodiment, we describe a case in which the power generators 1-1 and 1-2 output direct-current powers, direct-current power is inputted to the load 5-1, and alternating-current power is inputted to the load 5-2. That is, when transmitting power from the power generator 1-2 to the load 5-2, direct-current power is converted into alternating-current power.

Figure 16A:
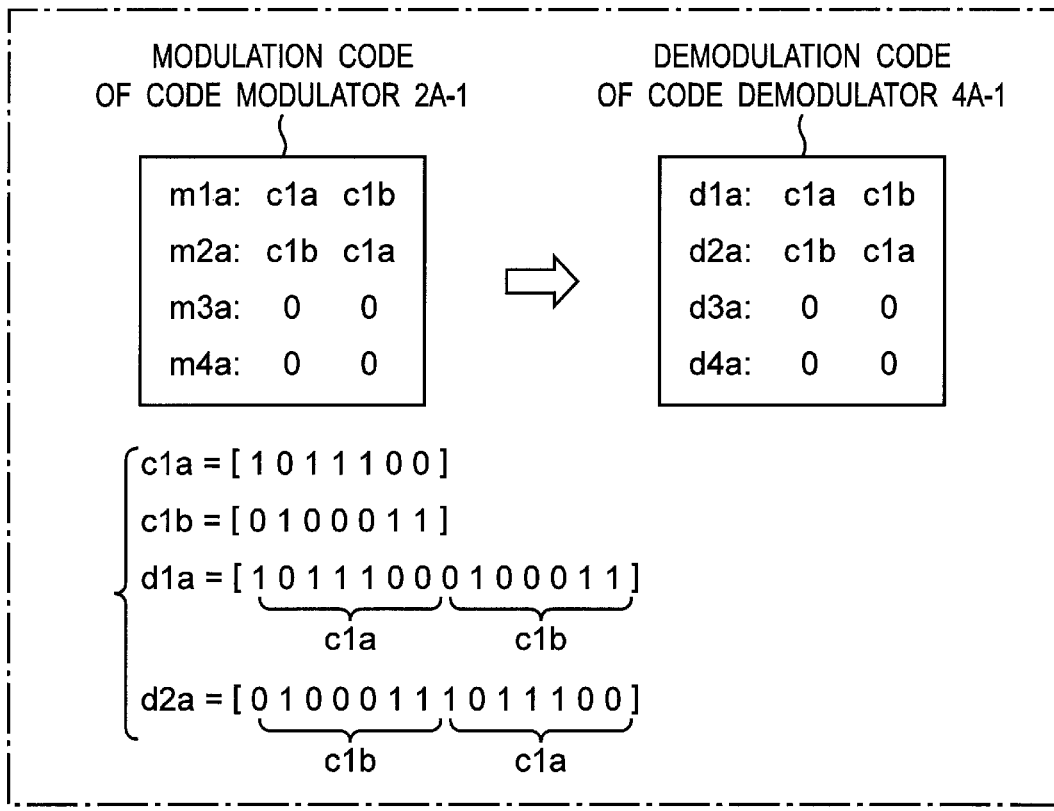
FIG. 16A is a diagram showing an example of a modulation code of a code modulator 2A-1 and a demodulation code of a code demodulator 4A-1 in the power transmission system of FIG. 15 according to the third embodiment, in which direct-current power is transmitted and received.

FIG. 16A is a diagram showing an example of a modulation code of the code modulator 2A-1 and a demodulation code of the code demodulator 4A-1 in the power transmission system of FIG. 15 according to the third embodiment, in which direct-current power is transmitted and received. In addition, FIG. 16B is a diagram showing an example of a modulation code of the code modulator 2A-2 and a demodulation code of the code demodulator 4A-2 in the power transmission system of FIG. 15 according to the third embodiment, in which direct-current power is transmitted and alternating-current power is received.

FIG. 16A shows modulation codes and demodulation codes inputted to the switch elements S1 to S44 of the code modulator 2A-1 and the code demodulator 4A-1. In this case, modulation codes m1a to m4a correspond to the modulation codes m1 to m4 of the code modulation circuit 23A as shown in FIG. 10, respectively, and demodulation codes d1a to d4a correspond to the demodulation codes d1 to d4 of the code demodulation circuit 33A as shown in FIG. 11, respectively. In this case, as described with reference to FIG. 12B, by setting all the code values of the modulation codes m3a and m4a and the demodulation codes d3a and d4a to "0", the switch elements S21 to S24 and S31 to S34 are turned off. In addition, the modulation codes m1a and m2a and the demodulation codes d1a and d2a are generated from the code sequence c1a and the code sequence c1b, as described with reference to FIG. 12B.

Figure 16B:
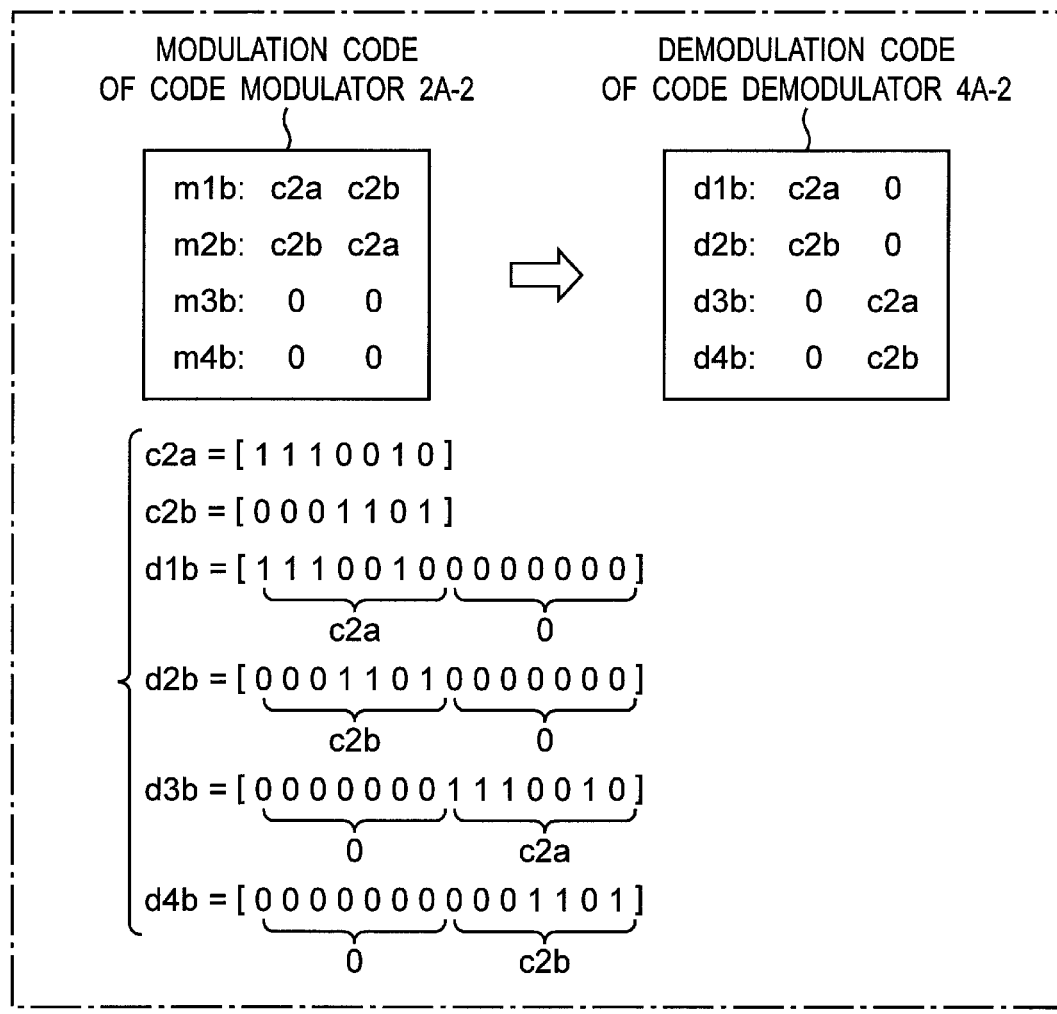
FIG. 16B is a diagram showing an example of a modulation code of the code modulator 2A-2 and a demodulation code of the code demodulator 4A-2 in the power transmission system of FIG. 15 according to the third embodiment, in which direct-current power is transmitted and alternating-current power is received.

Further, FIG. 16B shows modulation codes and demodulation codes inputted to the switch elements S1 to S44 of the code modulator 2A-2 and the code demodulator 4A-2. In this case, modulation codes m1b to m4b correspond to the modulation codes m1 to m4 of the code modulation circuit 23A as shown in FIG. 10, respectively, and demodulation codes d1b to d4b correspond to the demodulation codes d1 to d4 of the code demodulation circuit 33A as shown in FIG. 11, respectively. In this case, by setting all the code values of the modulation codes m3b and m4b to "0", the switch elements S21 to S24 are turned off. In addition, the modulation codes m1b and m2b and the demodulation codes d1b to d4b are generated from the code sequence c2a and the code sequence c2b. The principle of code modulation and code demodulation of currents is similar to that of the first and second embodiments, and therefore, its explanation is omitted here.

Figure 17:
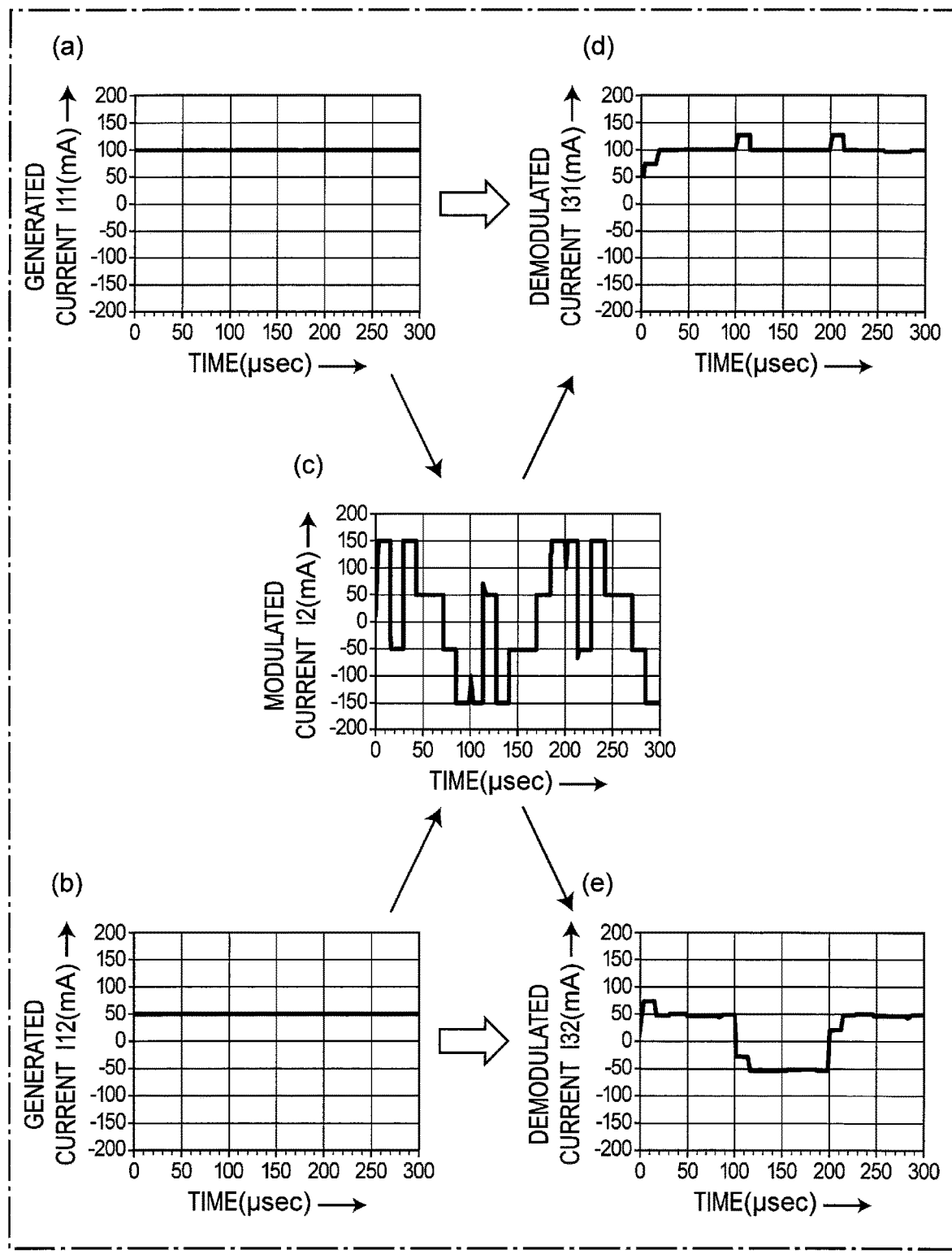
FIG. 17 is a waveform diagram showing exemplary signal waveforms in the power transmission system according to the third embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

Now, with reference to FIG. 17, we describe an operation of transmitting powers from the plurality of power generators 1-1 and 1-2 to the plurality of loads 5-1 and 5-2.

FIG. 17 are waveform diagrams, where (a) to (e) show exemplary signal waveforms of the power transmission system according to the third embodiment. In FIG. 17, (a) shows a signal waveform of a generated current I11, (b) shows a signal waveform of a generated current I12, (c) shows a signal waveform of a modulated current I2, (d) shows a signal waveform of a demodulated current I31, and (e) shows a signal waveform of a demodulated current I32.

The code modulator 2A-1 modulates the direct-current generated current I11 by code modulation into an alternating-current code-modulated wave. Similarly, the code modulator 2A-2 modulates the direct-current generated current I12 by code modulation into an alternating-current code-modulated wave. As shown in FIG. 17(c), the code-modulated wave generated by the code modulator 2A-1 and the code-modulated wave generated by the code modulator 2A-2 are transmitted as the combined modulated current I2 via the transmission path 3.

As described above, the code modulators 2A-1 and 2A-2 have an identical configuration, and are configured in a manner similar to that of the code modulator 2A of FIG. 10. In addition, the code demodulators 4A-1 and 4A-2 also have an identical configuration, and are configured in a manner similar to that of the code demodulator 4A of FIG. 11. The difference between the code modulators 2A-1 and 2A-2, and the difference between the code demodulators 4A-1 and 4A-2 reside in the use of different sets of the code sequences c1a and c1b, and the code sequences c2a and c2b. The code modulator 2A-1 and the code demodulator 4A-1 use the code sequences c1a and c1b, and the code modulator 2A-2 and the code demodulator 4A-2 use the code sequences c2a and c2b. In this case, the code sequences c1a and c2a are orthogonal to each other, and therefore, the code sequences c1b and c2b are also orthogonal to each other. In this case, Gold sequences of seven stages are adopted, and different Gold sequences are set to the code sequences c1a and c2a.

The code demodulators 4A-1 and 4A-2 can demodulate the modulated current I2 to extract powers generated by the corresponding code modulators 2A-1 and 2A-2, respectively, by using the orthogonal code sequences c1a and c2a. Accordingly, as shown in FIGS. 17(d) and (e), the generated currents I11 and I12 are inputted to the code modulators 2A-1 and 2A-2, and then, the currents are transmitted as code-modulated waves, and then, the corresponding code demodulators 4A-1 and 4A-2 correctly demodulate and output the demodulated currents I31 and I32. As a result, the demodulated currents I31 and I32 having desired waveforms (direct current or alternating current) and desired magnitudes are supplied to the loads 5-1 and 5-2, respectively.

As described above, according to the present embodiment, it is possible to simultaneously perform two power transmissions in a multiplexed manner in the one transmission path 3, and separate the transmitted powers from each other, by using the code modulators 2A-1 and 2A-2 and the code demodulators 4A-1 and 4A-2. Accordingly, it is possible to achieve a favorable power transmission system capable of simultaneously transmitting currents of desired magnitudes from the two power generators 1-1 and 1-2 to the two loads 5-1 and 5-2.

By measuring instantaneous powers at the code modulators 2A-1 and 2A-2 or the code demodulators 4A-1 and 4A-2 and comparing the instantaneous powers with the code sequences, it is possible to know which of the power generators 1-1 and 1-2 transmits power, which of the loads receives power, and what amount of power is transmitted. Accordingly, when a plurality of the different power generators 1-1 and 1-2 requiring different generation costs are connected, it is possible to conduct power business with electricity charges dependent on which of the power generators 1-1 and 1-2 transmits power. Alternatively, in case of a system having variable power transmission efficiency depending on which of the power generators 1-1 and 1-2 transmits power and which of the loads 5-1 and 5-2 receives the power, it is possible to achieve optimum power supply by managing and analyzing information on power transmission.

As described above, according to the present embodiment, it is possible to provide the power transmission system capable of efficiently supplying power from the one or more power generators 1-1 and 1-2 to the one or more loads 5-1 and 5-2, by using the code modulators 2A-1 and 2A-2 and the code demodulators 4A-1 and 4A-2.

In the above described embodiment, we indicated the example of the power transmission system including the two power generators 1-1 and 1-2 and the two loads 5-1 and 5-2, but the present disclosure is not limited thereto. It is possible to provide power transmission systems including the one power generator 1-2 and the two or more loads 5-1 and 5-2, or including two or more power generators 1-1 and 1-2 and the two or more loads 5-1 and 5-2. In this case, it is possible to simultaneously perform a number of power transmissions using one transmission path 3. Accordingly, it is possible to reduce costs for installation of the transmission path 3, and reduce costs by reducing the number of transmission paths 3, etc.

In the above described embodiment, we indicated the example in which each of the code modulators 2A-1 and 2A-2 of FIG. 15 is configured as the code modulation circuit 23A of FIG. 10, but the present disclosure is not limited thereto. For example, when the output powers from the power generators 1-1 and 1-2 are direct-current powers, each of the code modulators 2A-1 and 2A-2 may be configured as the code modulation circuit 23 of FIG. 7. In addition, when the input powers to the loads 5-1 and 5-2 are direct-current powers, each of the code demodulators 4A-1 and 4A-2 may be configured as the code demodulation circuit 33 of FIG. 7. In these cases, it is possible to simplify the circuit configurations of the code modulators 2A-1 and 2A-2 and the code demodulators 4A-1 and 4A-2, and accordingly, there are advantageous effects of reducing the number of parts, reducing costs, and reducing size of the apparatuses.

In the third embodiment, we indicated the example of the power transmission system which transmits powers from two power generators each having direct-current output power, to one load having direct-current input power, and to one load having alternating-current input power, but the present disclosure is not limited thereto. The power transmission system may receive powers from any number of power generators each having direct-current output power, and from any number of power generators each having alternating-current output power. In addition, the power transmission system may supply powers to any number of loads each having direct-current input power, and to any number of loads each having alternating-current input power.

Photovoltaic power generation, which generates most of natural energy, generates direct-current power. On the other hand, wind power generation and geothermal power generation generate alternating-current power. In this case, since it is not desirable that both direct-current power supplies and alternating-current power supplies are connected to the same power network, according to conventional power transmission systems, all power generators (power supplies) and loads should be of only direct current or only alternating current.

On the other hand, according to the power transmission system according to the present embodiment, by using code modulation and code demodulation, it is possible simultaneously transmit powers from a direct-current power supply to a direct-current load, from a direct-current power supply to an alternating-current load, from an alternating-current power supply to a direct-current load, and from an alternating-current power supply to an alternating-current load, via one transmission path.

Thus, according to the first to third embodiments, it is possible to provide a favorable power transmission system capable of correctly perform code modulation and code demodulation of power, and further, capable of simultaneously performing a plurality of power transmissions in a multiplexed manner via one transmission path.

Fourth Embodiment

Figure 18:
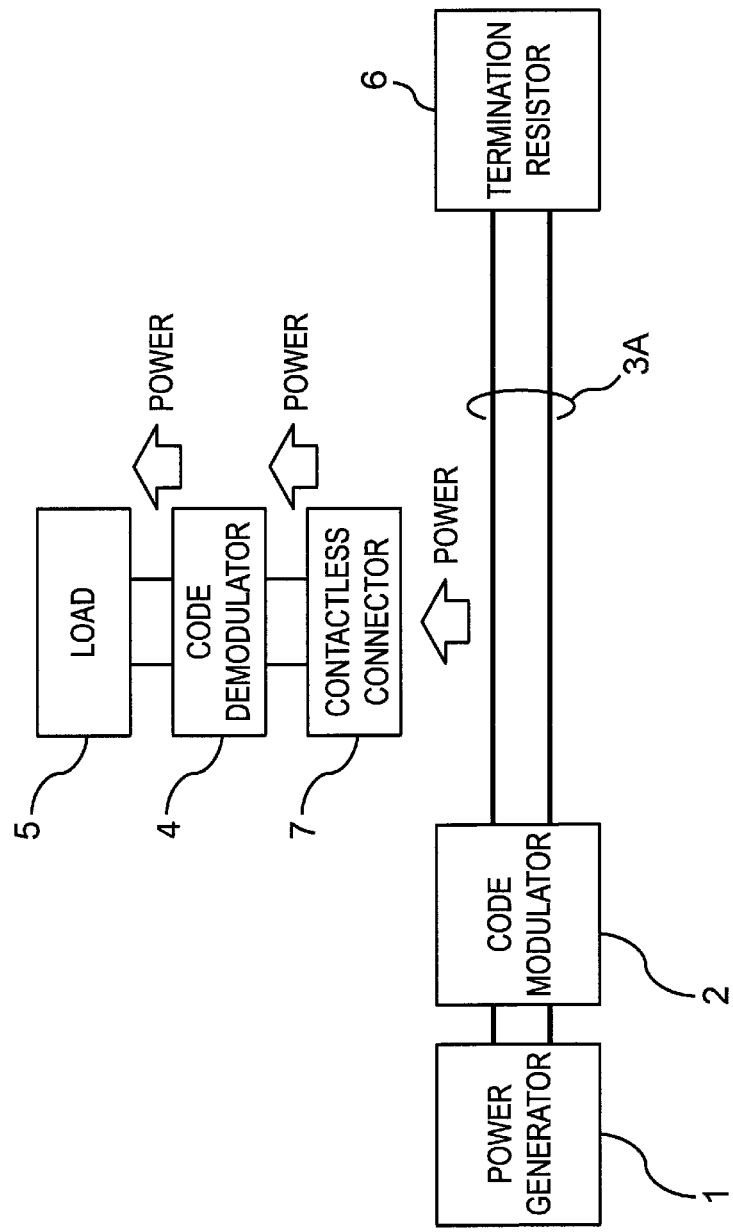
FIG. 18 is a block diagram showing a configuration of a power transmission system according to a fourth embodiment.

FIG. 18 is a block diagram showing a configuration of a power transmission system according to a fourth embodiment. Referring to FIG. 18, the power transmission system according to the fourth embodiment is provided with a power generator 1, a code modulator 2, a transmission path 3A, a code demodulator 4, a load 5, and a contactless connector 7.

The power generator 1, the code modulator 2, the code demodulator 4, and the load 5 of FIG. 18 are configured in a manner similar to that of the corresponding constituent elements of FIG. 1. For ease of illustration, the power meters 1m and 5m and the controller 10 of FIG. 1 are not shown in FIG. 18.

The contactless connector 7 is connected to the code demodulator 4, and also is electromagnetically coupled to the transmission path 3A without electrical contact. An electrically insulating material or a gap is provided between the transmission path 3A and the contactless connector 7. In addition, the transmission path 3A and the contactless connector 7 are not mechanically joined to each other by soldering, screwing, or the like. The contactless connector 7 receives power from the transmission path 3A via an electric field or a magnetic field between the transmission path 3A and the contactless connector 7, without electrical contact.

In the power transmission system of FIG. 18, the code modulator 2 operates as a power transmitter apparatus, and the contactless connector 7 and the code demodulator 4 operate as a power receiver apparatus. The code modulator 2 modulates first power to generate a code-modulated wave by code modulation using a modulation code based on a code sequence, and transmits the code-modulated wave to the transmission path 3A. The contactless connector 7 receives the code-modulated wave from the code modulator 2 via the transmission path 3A, and passes the code-modulated wave to the code demodulator 4. The code demodulator 4 receives the code-modulated wave via the contactless connector 7, and demodulates the received code-modulated wave to generate second power by code demodulation using a demodulation code based on a code sequence identical to the code sequence of the modulation code used for code-modulation. The first power is direct-current or alternating-current power generated by the power generator 1. The code-modulated wave is alternating current power modulated by code modulation. The second power is direct-current or alternating-current power to be supplied to the load 5.

Figure 19:
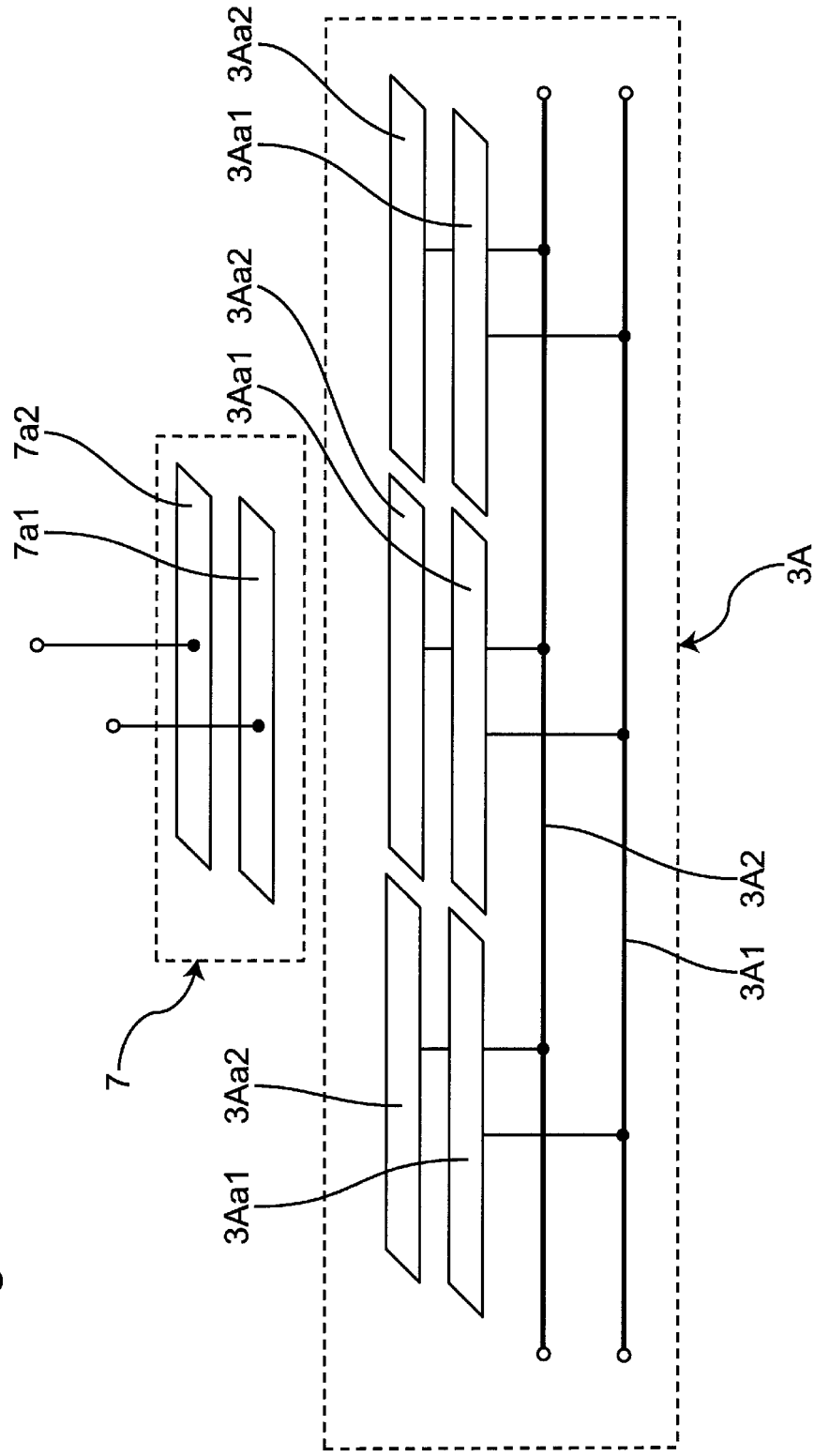
FIG. 19 is a diagram showing a first implementation example of a transmission path 3A and a contactless connector 7 of FIG. 18.

FIG. 19 is a diagram showing a first implementation example of the transmission path 3A and the contactless connector 7 of FIG. 18. The contactless connector 7 may be coupled to the transmission path 3A via an electric field. The transmission path 3A of FIG. 19 is provided with power lines 3A1 and 3A2, a conductor plate 3Aa1 connected to the power line 3A1, and a conductor plate 3Aa2 connected to the power line 3A2. The contactless connector 7 of FIG. 19 is provided with conductor plates 7a1 and 7a2 opposing to the conductor plates 3Aa1 and 3Aa2, respectively. The conductor plate 3Aa1 and the conductor plate 7a1 are capacitively coupled to each other, and the conductor plate 3Aa2 and the conductor plate 7a2 are capacitively coupled to each other. Power is transmitted via the electric field generated between the conductor plates 3Aa1 and 3Aa2 and the conductor plates 7a1 and 7a2.

In order to transmit power at various positions, a plurality of pairs of the conductor plates 3Aa1 and 3Aa2 may be provided along the longitudinal direction of the transmission path 3A, as shown in FIG. 19, or alternatively, lengths of the conductor plates 3Aa1 and 3Aa2 may be extended along the longitudinal direction longer than the conductor plates 7a1 and 7a2. Thus, it is possible to uniformly transmit power at any positions of the transmission path 3A. However, in the latter case, the longitudinal length of the conductor plates 3Aa1 and 3Aa2 is set to be shorter than a wavelength of the code-modulated wave transmitted over the transmission path 3A, in order to prevent generation of undesirable electromagnetic radiation.

According to the transmission path 3A and the contactless connector 7 of FIG. 19, power is transmitted via the electric field. Accordingly, even when a metal is located between the transmission path 3A and the contactless connector 7, there is an advantageous effect of being capable of reducing heat generated from the metal as compared to that of the case that power is transmitted via a magnetic field.

In the case that the contactless connector 7 is coupled to the transmission path 3A via an electric field, terminations of the transmission path 3A may be either closed (termination resistor 6) or open.

Figure 20:
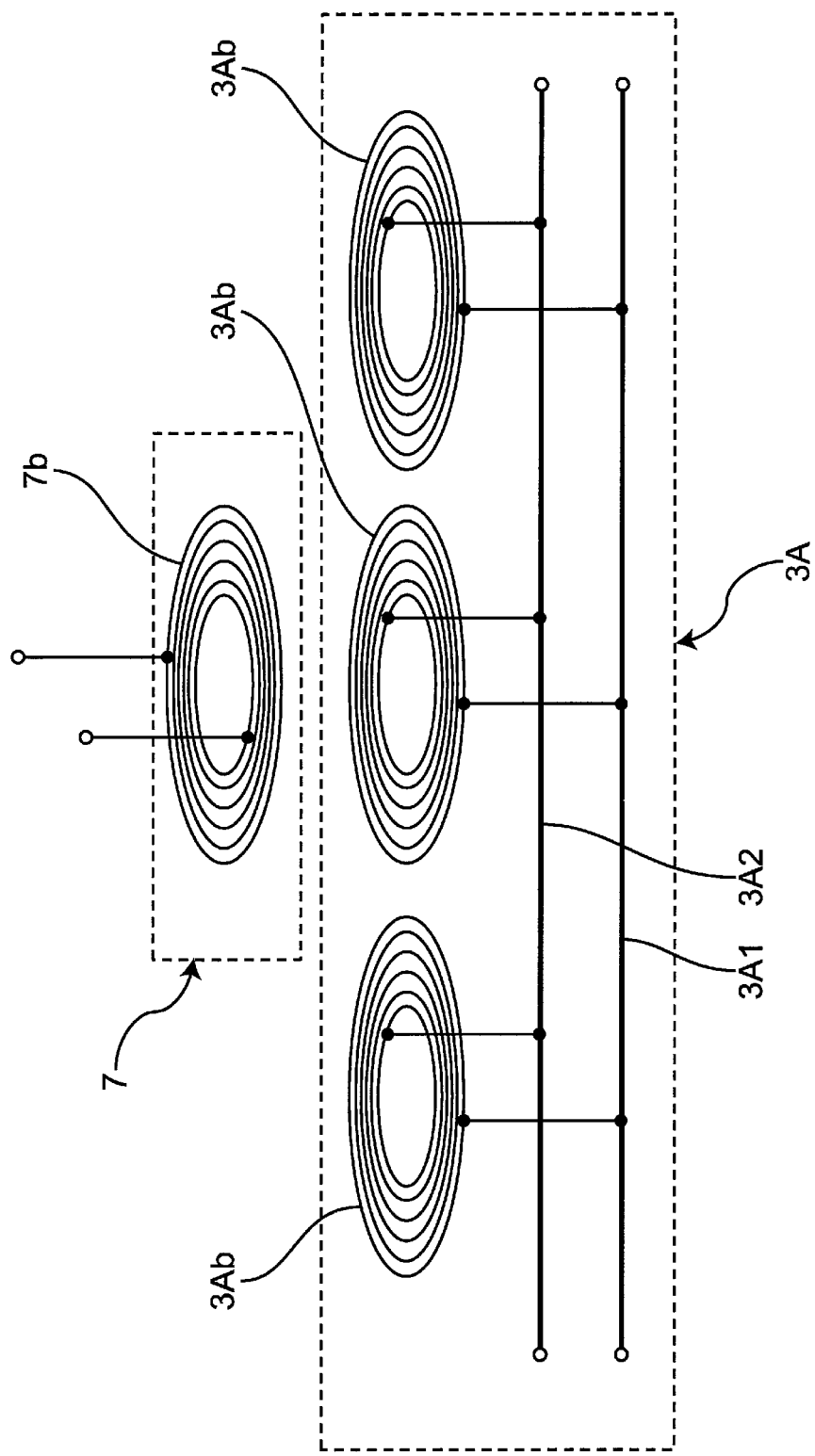
FIG. 20 is a diagram showing a second implementation example of the transmission path 3A and the contactless connector 7 of FIG. 18.

FIG. 20 is a diagram showing a second implementation example of the transmission path 3A and the contactless connector 7 of FIG. 18. The contactless connector 7 may be magnetically coupled to the transmission path 3A. The transmission path 3A of FIG. 20 is provided with the power lines 3A1 and 3A2, and a coil 3Ab connected across the power lines 3A1 and 3A2. The contactless connector 7 of FIG. 20 is provided with a coil 7b opposing to the coil 3Ab. The coils 3Ab and 7b include, for example, windings each circularly wound on a plane, and are disposed in parallel to each other. The coils 3Ab and 7b are magnetically coupled to each other. Power is transmitted via the magnetic field between the coils 3Ab and 7b.

In order to transmit power at various positions, a plurality of the coils 3Ab may be provided along the longitudinal direction of the transmission path 3A, as shown in FIG. 20, or alternatively, the coil 3Ab may be made larger than the coil 7b. Thus, it is possible to uniformly transmit power at any positions of the transmission path 3A.

Figure 21:
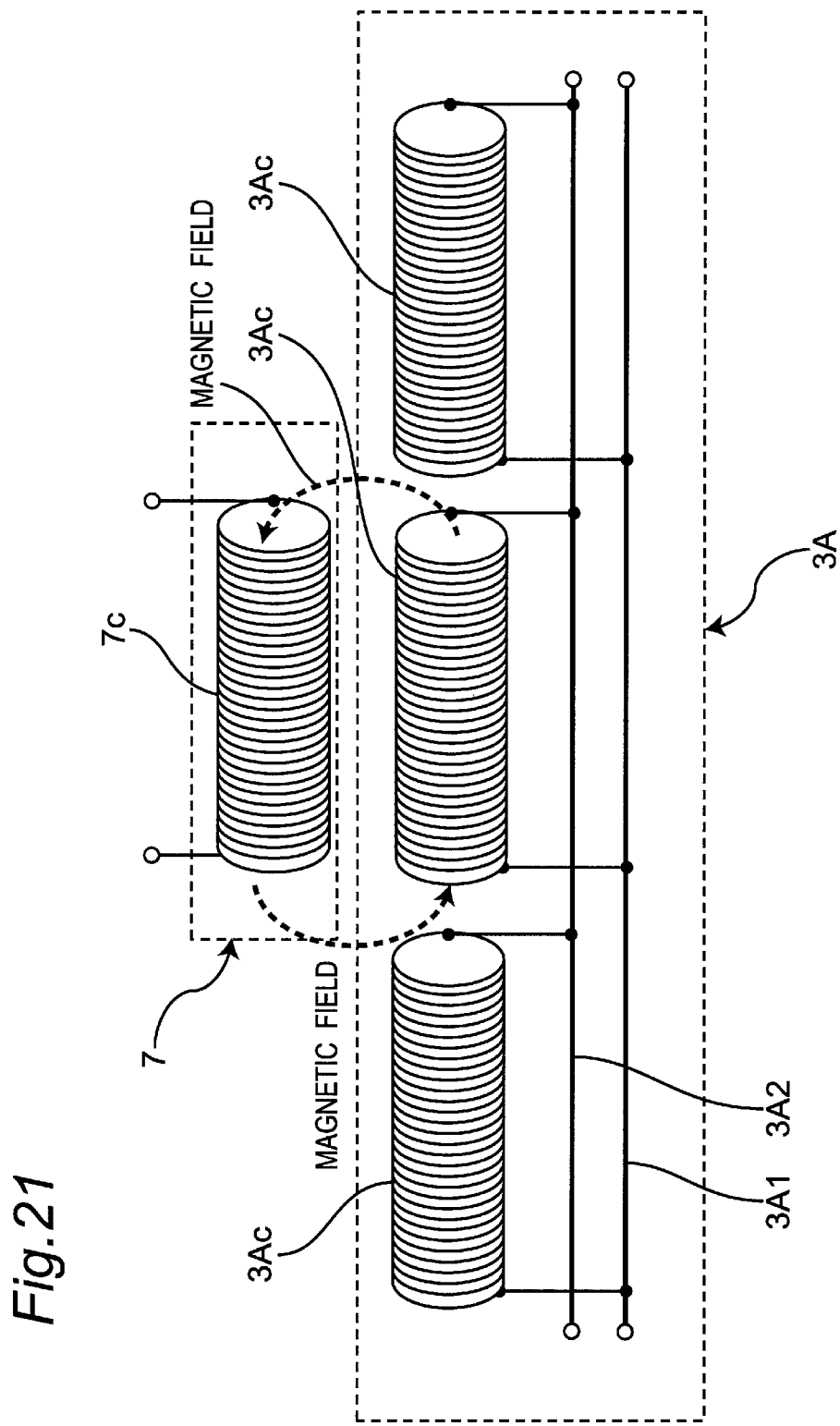
FIG. 21 is a diagram showing a third implementation example of the transmission path 3A and the contactless connector 7 of FIG. 18.

FIG. 21 is a diagram showing a third implementation example of the transmission path 3A and the contactless connector 7 of FIG. 18. Also in the implementation example of FIG. 21, the contactless connector 7 is coupled to the transmission path 3A via a magnetic field. The transmission path 3A of FIG. 21 is provided with the power lines 3A1 and 3A2, and a coil 3Ac wound solenoidally and connected across the power lines 3A1 and 3A2. The contactless connector 7 of FIG. 21 is provided with a coil 7c wound solenoidally. The coils 3Ac and 7c are magnetically coupled to each other. Power is transmitted via the magnetic field between the coils 3Ac and 7c.

In order to transmit power at various positions, a plurality of the coils 3Ac may be provided along the longitudinal direction of the transmission path 3A, as shown in FIG. 21. Thus, it is possible to uniformly transmit power at any positions of the transmission path 3A.

Figure 22:
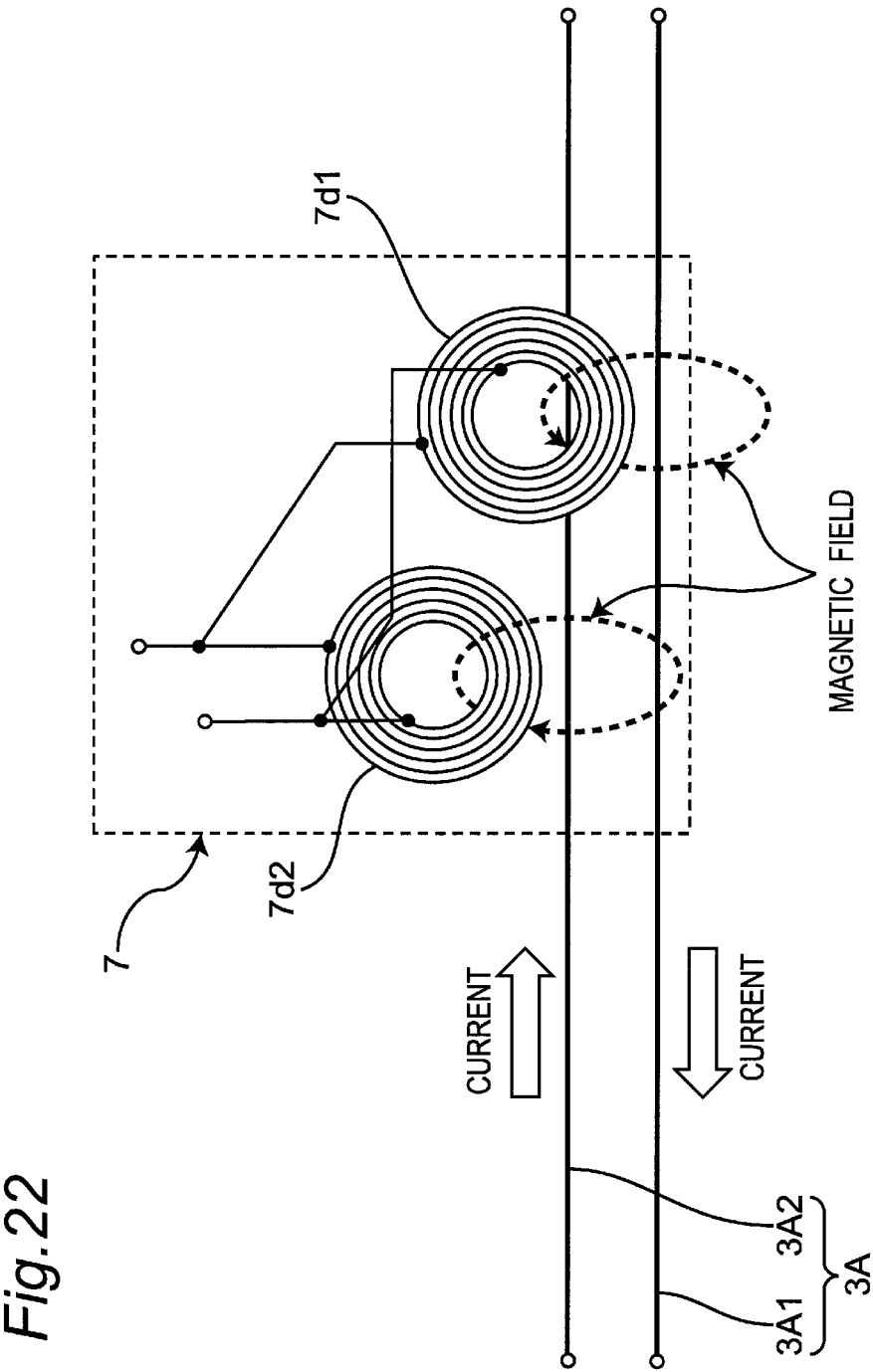
FIG. 22 is a diagram showing a fourth implementation example of the transmission path 3A and the contactless connector 7 of FIG. 18.

FIG. 22 is a diagram showing a fourth implementation example of the transmission path 3A and the contactless connector 7 of FIG. 18. Also in the implementation example of FIG. 22, the contactless connector 7 is coupled to the transmission path 3A via a magnetic field. The transmission path 3A of FIG. 22 is provided with the power lines 3A1 and 3A2. The contactless connector 7 of FIG. 22 is provided with a coil 7d1 coupled with a magnetic field around the power line 3A1, and a coil 7d2 coupled with a magnetic field around the power line 3A2. The coil 7d1 includes, for example, a winding circularly wound on a plane including the power line 3A1, and is provided at a distance from the power line 3A1. The coil 7d2 includes, for example, a winding circularly wound on a plane including the power line 3A2, and is provided at a distance from the power line 3A2. As shown in FIG. 22, when the coils 7d1 and 7d2 are disposed in parallel to each other, the coils 7d1 and 7d2 are wound in directions opposite to each other. Thus, the power lines 3A1 and 3A2 and the coils 7d1 and 7d2 are magnetically coupled to each other. Power is transmitted via magnetic fields therebetween. According to the transmission path 3A and the contactless connector 7 of FIG. 22, it is possible to uniformly transmit power at any positions of the transmission path 3A.

In addition, according to the transmission path 3A and the contactless connector 7 of FIG. 22, no coil is provided to the transmission path 3A. Therefore, a foreign object between or near the coils is less likely to heat up, and accordingly, the transmission path 3A and the contactless connector 7 of FIG. 22 are safer than the transmission path 3A and the contactless connector 7 of FIGS. 20 and 21.

Figure 23:
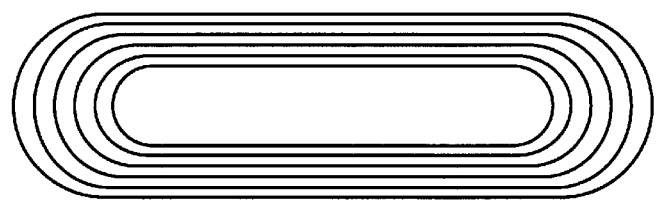
FIG. 23 is a diagram showing a first modification of coils 7d1 and 7d2 of FIG. 22.
Figure 24:
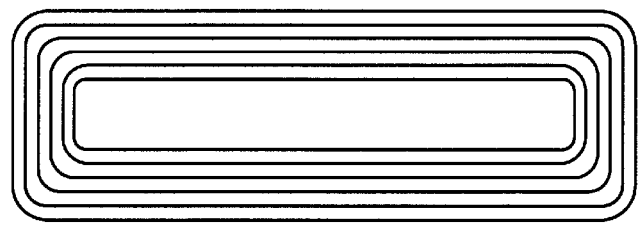
FIG. 24 is a diagram showing a second modification of the coils 7d1 and 7d2 of FIG. 22.
Figure 25:
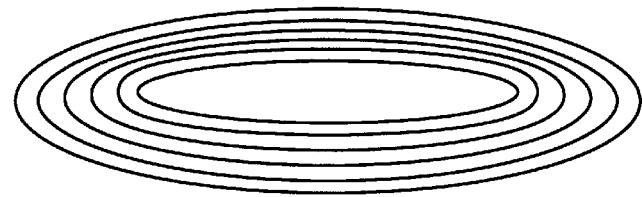
FIG. 25 is a diagram showing a third modification of the coils 7d1 and 7d2 of FIG. 22.

FIG. 23 is a diagram showing a first modification of the coils 7d1 and 7d2 of FIG. 22. FIG. 24 is a diagram showing a second modification of the coils 7d1 and 7d2 of FIG. 22. FIG. 25 is a diagram showing a third modification of the coils 7d1 and 7d2 of FIG. 22. The coils of the contactless connector 7 of FIG. 22 may include windings not limited to being wound circularly, but being wound elongately, rectangularly, elliptically, etc. By using coils shaped in such a manner, it is possible more strongly couple the contactless connector 7 and the transmission path 3A with each other via the magnetic field as compared to the case of FIG. 22, thus improving efficiency of power transmission.

Figure 26:
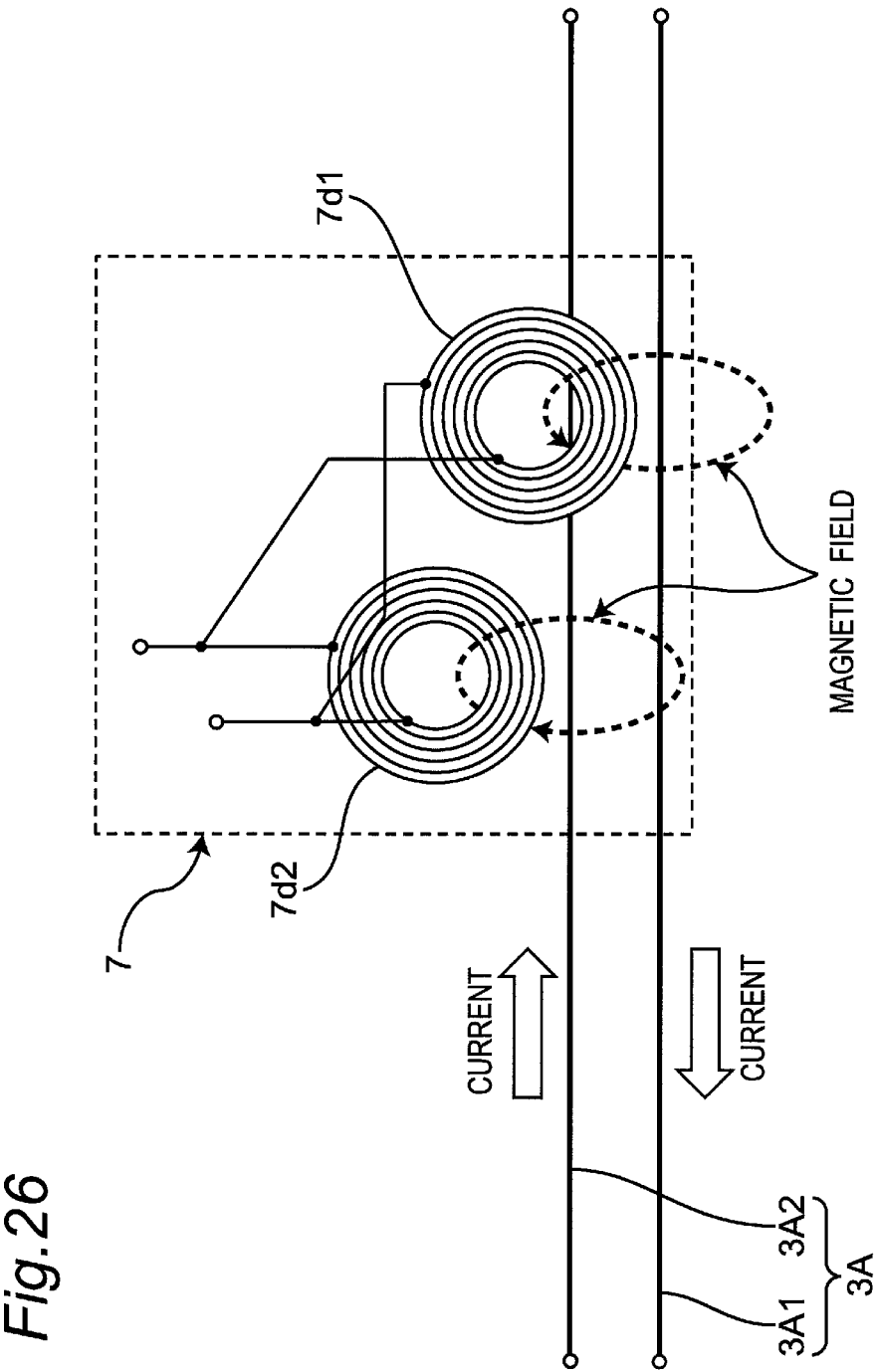
FIG. 26 is a diagram showing a fifth implementation example of the transmission path 3A and the contactless connector 7 of FIG. 18.

FIG. 26 is a diagram showing a fifth implementation example of the transmission path 3A and the contactless connector 7 of FIG. 18. While the coils 7d1 and 7d2 of the contactless connector 7 of FIG. 22 are wound in directions opposite to each other, the coils 7d1 and 7d2 may be wound in the same direction, as shown in FIG. 26. The contactless connector 7 of FIG. 26 includes only one type of coil, and therefore, it is possible to reduce costs.

According to the transmission path 3A and the contactless connector 7 of FIGS. 19 to 26, it is possible to transmit power using the electric field coupling or the magnetic field coupling, without electrical contact. In addition, it is possible to efficiently transmit power by electromagnetically disposing the contactless connector 7 at any position of the transmission path 3A.

As described above, the power transmission system of FIG. 18 modulates power generated by the power generator 1, by code modulation; transmits the power modulated by code modulation, via the transmission path 3A and the contactless connector 7; demodulates the transmitted power by code demodulation; and supplies the demodulated power to the load 5, in a manner similar to that of the power transmission system of the first to third embodiments. Power can be transmitted between the transmission path 3A and the contactless connector 7, without electrical contact. Thus, there is an advantageous effect of being capable of easily attaching and detaching the code demodulator 4 and the load 5 to/from the transmission path 3A, and increasing and decreasing the number of the loads 5 receiving power in the power transmission system. Furthermore, the code demodulator 4 and the load 5 can be disposed at any positions of the transmission path 3A. Therefore, there is an advantageous effect of being capable of transmitting power even when the load 5 moves over time.

Figure 27:
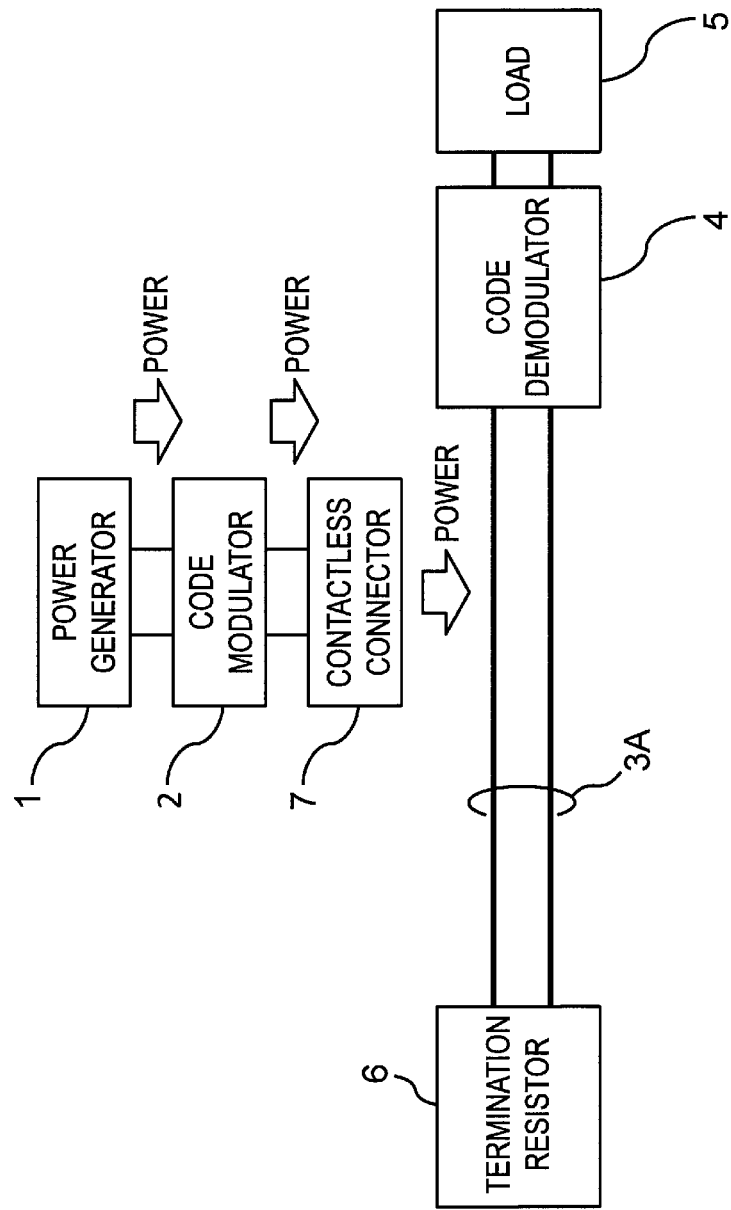
FIG. 27 is a block diagram showing a configuration of a power transmission system according to a first modification of the fourth embodiment.

FIG. 27 is a block diagram showing a configuration of a power transmission system according to a first modification of the fourth embodiment. The power transmission system of FIG. 27 is provided with the power generator 1, the code modulator 2, the transmission path 3A, the code demodulator 4, the load 5, and the contactless connector 7.

The power generator 1, the code modulator 2, the code demodulator 4, and the load 5 of FIG. 27 are configured in a manner similar to that of the corresponding constituent elements of FIG. 1. For ease of illustration, the power meters 1m and 5m and the controller 10 of FIG. 1 are not shown in FIG. 27.

The contactless connector 7 is connected to the code modulator 2, and also is electromagnetically coupled to the transmission path 3A without electrical contact. The contactless connector 7 of FIG. 27 is configured in a manner similar to that of the contactless connector 7 of FIG. 18 (see FIGS. 19 to 26).

According to the power transmission system of FIG. 27, the code modulator 2 and the contactless connector 7 operate as a power transmitter apparatus, and the code demodulator 4 operates as a power receiver apparatus. The code modulator 2 modulates first power to generate a code-modulated wave by code modulation using a modulation code based on a code sequence, and transmits the code-modulated wave to the transmission path 3A. The contactless connector 7 transmits the code-modulated wave to the power receiver apparatus via the transmission path 3A. The code demodulator 4 receives the code-modulated wave from the transmission path 3A, and demodulates the received code-modulated wave to generate second power by code demodulation using a demodulation code based on a code sequence identical to the code sequence of the modulation code used for code-modulation. The first power is direct-current or alternating-current power generated by the power generator 1. The code-modulated wave is alternating current power modulated by code modulation. The second power is direct-current or alternating-current power to be supplied to the load 5.

The power transmission system of FIG. 27 modulates power generated by the power generator 1, by code modulation; transmits the power modulated by code modulation, via the transmission path 3A and the contactless connector 7; demodulates the transmitted power by code demodulation; and supplies the demodulated power to the load 5, in a manner similar to that of the power transmission system of the first to third embodiments. Power can be transmitted between the contactless connector 7 and the transmission path 3A, without electrical contact. Thus, it is possible to easily attach and detach the power generator 1 and the code modulator 2 to/from the transmission path 3A, and increasing and decreasing the number of the power generators 1 operable as power sources in the power transmission system. Furthermore, the power generator 1 and the code modulator 2 can be disposed at any positions of the transmission path 3A. Therefore, it is possible to transmit power even when the power generator 1 moves over time.

Figure 28:
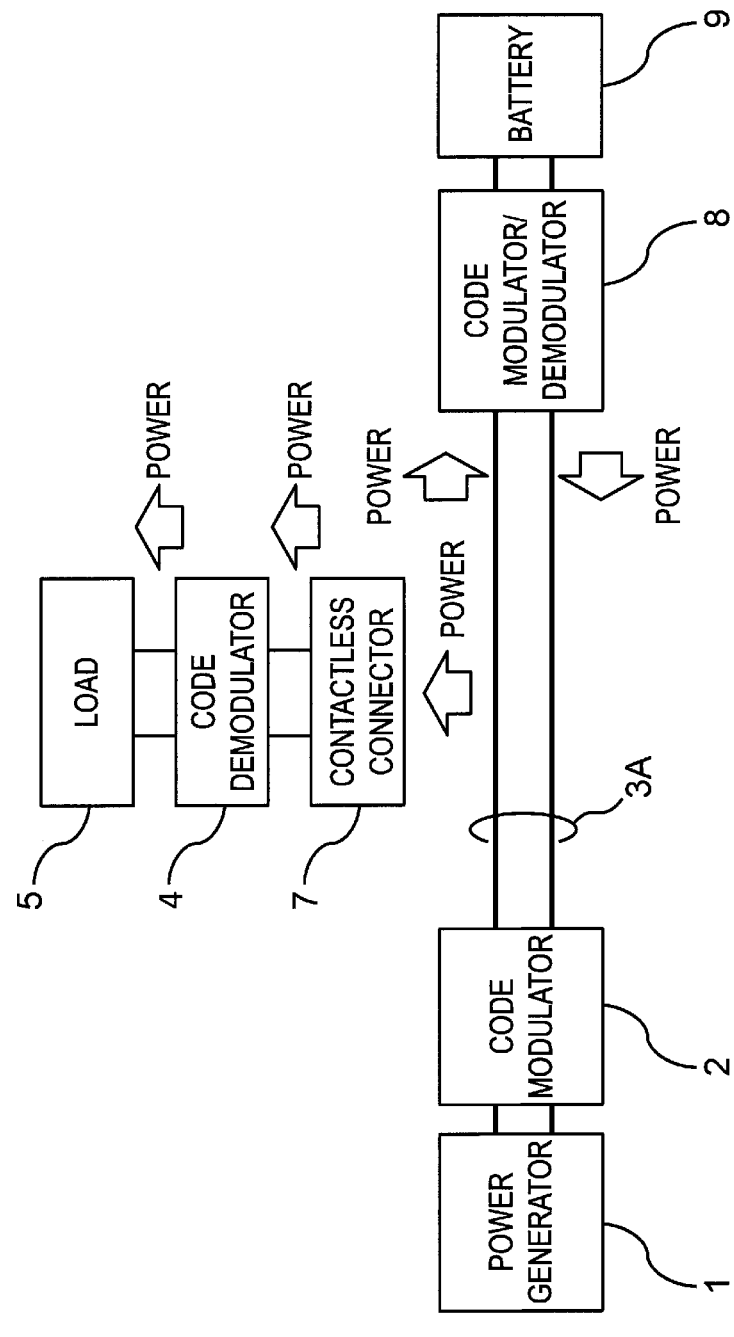
FIG. 28 is a block diagram showing a configuration of a power transmission system according to a second modification of the fourth embodiment.

FIG. 28 is a block diagram showing a configuration of a power transmission system according to a second modification of the fourth embodiment. The power transmission system in FIG. 28 is provided with the power generator 1, the code modulator 2, the transmission path 3A, the code demodulator 4, the load 5, the contactless connector 7, a code modulator/demodulator 8, and a battery 9.

The power generator 1, the code modulator 2, the transmission path 3A, the code demodulator 4, the load 5, and the contactless connector 7 of FIG. 28 are configured in a manner similar to that of the corresponding constituent elements of FIG. 18. For ease of illustration, the power meters 1m and 5m and the controller 10 of FIG. 1 are not shown in FIG. 28.

The transmission path 3A of FIG. 28 is connected with the battery 9 via the code modulator/demodulator 8. As described above, the code modulation circuit 23A of FIG. 10 and the code demodulation circuit 33A of FIG. 11 are reversible. The code modulator/demodulator 8 includes circuits similar to the code modulation circuit 23A of FIG. 10 and the code demodulation circuit 33A of FIG. 11. Accordingly, the code modulator/demodulator 8 can operate as a code modulator, and also operate as a code demodulator.

When power consumption of the load 5 is smaller than generated power of the power generator 1, a modulation code and a demodulation code based on one code sequence are set to the code modulator 2 and the code demodulator 4, respectively, such that a part of the generated power is transmitted to the load 5, and at the same time, a modulation code and a demodulation code based on another code sequence are set to the code modulator 2 and the code modulator/demodulator 8, respectively, such that the rest of the generated power is transmitted to the battery 9. In this case, the code modulator 2 is provided with a plurality of code modulation circuits for simultaneously transmitting power to a plurality of destinations. In addition, in this case, the code modulator/demodulator 8 operates as a code demodulator. When simultaneously transmitting power from the code modulator 2 to the code demodulator 4 and the code modulator/demodulator 8, two low-correlated (e.g., orthogonal) code sequences may be used. Thus, in the transmission path 3A, it is possible to distinguish the code-modulated wave transmitted to the load 5, and the code-modulated wave transmitted to the battery 9, from each other, and therefore, it is possible to supply power from the power generator 1 to the load 5 and the battery 9 at a desired distribution ratio.

On the other hand, when power consumption of the load 5 is larger than generated power of the power generator 1, the generated power is transmitted to the load 5, and simultaneously, discharged power of the battery 9 is supplied to the load 5. In this case, the code modulator/demodulator 8 operates as a code modulator. The code modulator/demodulator 8 is synchronized with the code modulator 2, and modulates the discharged power by code modulation using the same modulation code as that used by the code modulator 2. Thus, the code demodulator 4 can simultaneously demodulates the code-modulated wave transmitted from the code modulator 2, and the code-modulated wave transmitted from the code modulator/demodulator 8, by code demodulation, and transmit the demodulated power to the load 5.

In addition to the advantageous effects of the power transmission system of FIG. 18, the power transmission system of FIG. 28, which is provided with the code modulator/demodulator 8 and the battery 9, has an advantageous effect of being capable of transmitting power to the load 5 in a more flexible manner by charging and discharging the battery 9. Thus, it is not necessary to promptly control generated power of the power generator 1 in response to variations of power consumption due to operating conditions of the load 5. In other words, there is an advantageous effect of being capable of generating power at an efficient operation point in a more stable manner.

Figure 29:
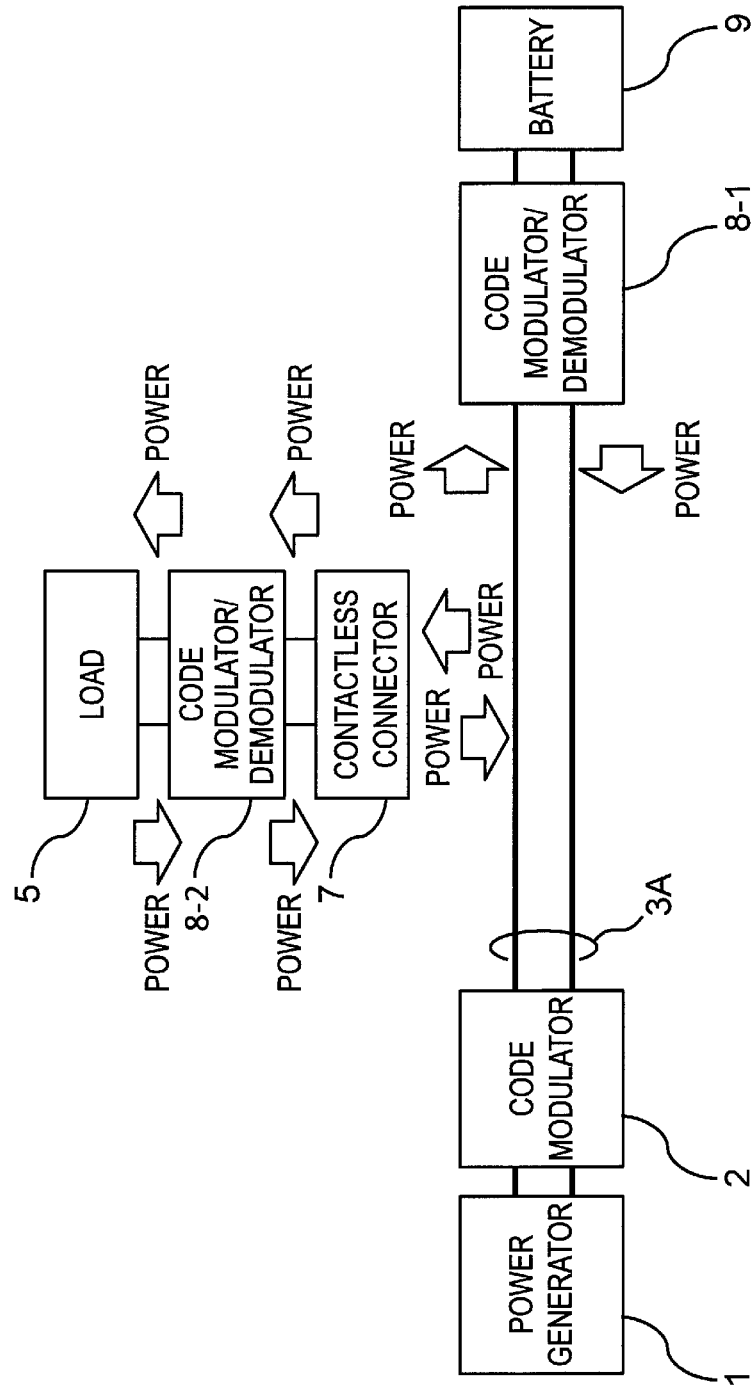
FIG. 29 is a block diagram showing a configuration of a power transmission system according to a third modification of the fourth embodiment.

FIG. 29 is a block diagram showing a configuration of a power transmission system according to a third modification of the fourth embodiment. The power transmission system of FIG. 29 is provided with the power generator 1, the code modulator 2, the transmission path 3A, the load 5, the contactless connector 7, code modulator/demodulators 8-1 and 8-2, and the battery 9.

The power generator 1, the code modulator 2, the transmission path 3A, the load 5, the contactless connector 7, and the battery 9 of FIG. 29 are configured in a manner similar to that of the corresponding constituent elements of FIG. 28. The code modulator/demodulators 8-1 and 8-2 of FIG. 29 are configured in a manner similar to that of the code modulator/demodulator 8 of FIG. 28. For ease of illustration, the power meters 1m and 5m and the controller 10 of FIG. 1 are not shown in FIG. 29.

In the power transmission system of FIG. 29, the code modulator 2 operates as a power transmitter apparatus, the code modulator/demodulator 8-1 operates as a power transmitter and receiver apparatus, and the contactless connector 7 and the code modulator/demodulator 8-2 operate as a power transmitter and receiver apparatus. The power transmission system of FIG. 29 is provided with the code modulator/demodulator 8-2, in place of the code demodulator 4 connected to the load 5 of FIG. 28. Here, we describe a case in which the load 5 is an electric facility which consumes and generates (regenerates) power, such as a motor, and power is transmitted via the contactless connector 7 in both directions. When the load 5 consumes power, the code modulator/demodulator 8-2 operates as a code demodulator. In this case, a modulation code and a demodulation code based on one code sequence are set to the code modulator 2 and the code modulator/demodulator 8-2, respectively, such that a part or all of generated power of the power generator 1 is transmitted to the load 5. On the other hand, when the load 5 generates power, the code modulator/demodulator 8-2 operates as a code modulator. In this case, the code modulator/demodulator 8-2 is synchronized with the code modulator 2, and modulates the generated power (regenerated power) by code modulation using the same modulation code as the code used by the code modulator 2. Thus, the code modulator/demodulator 8-1 can simultaneously demodulates the code-modulated wave transmitted from the code modulator 2, and the code-modulated wave transmitted from the code modulator/demodulator 8-2, by code demodulation, and transmit the demodulated power to the battery 9.

In addition to the advantageous effects of the power transmission system of FIG. 18, the power transmission system of FIG. 29, which is provided with the code modulator/demodulator 8-2 connected to the load 5 which consumes and generates power, has an advantageous effect of achieving power transmission of the load 5 in a more flexible manner Therefore, it is also possible to charge the battery 9 with generated power of the load 5, and thus, there is an advantageous effect of achieving more efficient power utilization.

Figure 30:
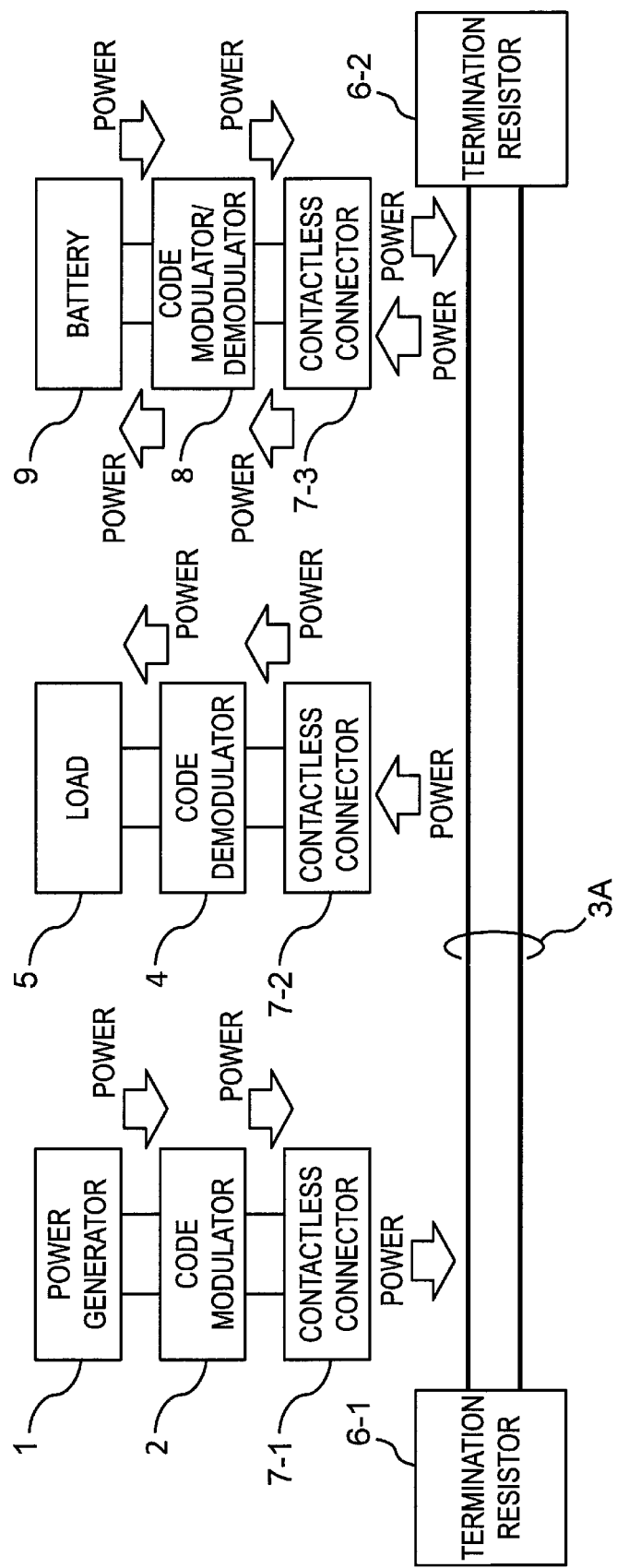
FIG. 30 is a block diagram showing a configuration of a power transmission system according to a fourth modification of the fourth embodiment.

FIG. 30 is a block diagram showing a configuration of a power transmission system according to a fourth modification of the fourth embodiment. The power transmission system of FIG. 30 is provided with the power generator 1, the code modulator 2, the transmission path 3A, the code demodulator 4, the load 5, termination resistors 6-1 and 6-2, contactless connectors 7-1 to 7-3, the code modulator/demodulator 8, and the battery 9.

The power generator 1, the code modulator 2, the transmission path 3A, the code demodulator 4, the load 5, the code modulator/demodulator 8, and the battery 9 of FIG. 30 are configured in a manner similar to that of the corresponding constituent elements of FIGS. 27 and 28. The contactless connectors 7-1 to 7-3 of FIG. 30 are configured in a manner similar to that of the contactless connector 7 of FIG. 18. The termination resistors 6-1 and 6-2 of FIG. 30 are configured in a manner similar to that of the termination resistor 6 of FIG. 18. For ease of illustration, the power meters 1m and 5m and the controller 10 of FIG. 1 are not shown in FIG. 30.

As shown in FIG. 30, a plurality of apparatuses may be combined, the plurality of apparatuses being selected from: a power receiver apparatus similar to that of FIG. 18 (contactless connector 7 and code demodulator 4), a power transmitter apparatus similar to that of FIG. 27 (code modulator 2 and contactless connector 7), and a power transmitter and receiver apparatus similar to that of FIG. 29 (contactless connector 7 and code modulator/demodulator 8). Thus, there is an advantageous effect of being capable of easily attaching and detaching the power generator 1, the load 5, and the battery 9 to/from the transmission path 3A, and easily increasing and decreasing the numbers of the power generator 1, the numbers of the load 5, and the numbers of the battery 9 in the power transmission system. Furthermore, there is an advantageous effect of being capable of disposing the power generator 1, the load 5, and the battery 9 at any positions of the transmission path 3A, and transmitting power even when the power generator 1, the load 5, and the battery 9 move over time. Thus, there is an advantageous effect of easily moving and disposing electric facilities connected via the contactless connectors, thus building a more flexible power transmission system.

FIG. 30 shows the example of the power transmission system including the one power generator 1, the one load 5, and the one battery 9, but not limited thereto. The power transmission system may include a plurality of power generators, a plurality of loads, and a plurality of storage batteries. Thus, in addition to the aforementioned advantageous effects, there is an advantageous effect of being capable of transmitting power among a large number of pairs of power transmitter apparatus and power receiver apparatus over the one transmission path 3A.

FIG. 30 shows the example in which the code demodulator 4 is connected to the load 5, but not limited thereto. The code modulator/demodulator 8 may be provided, instead of the code demodulator 4. Thus, in addition to the aforementioned advantageous effects, there is an advantageous effect of being capable of transmitting and receiving power to/from the load 5 in a more flexible manner, the load 5 consuming and generating power.

Fifth Embodiment

Figure 31:
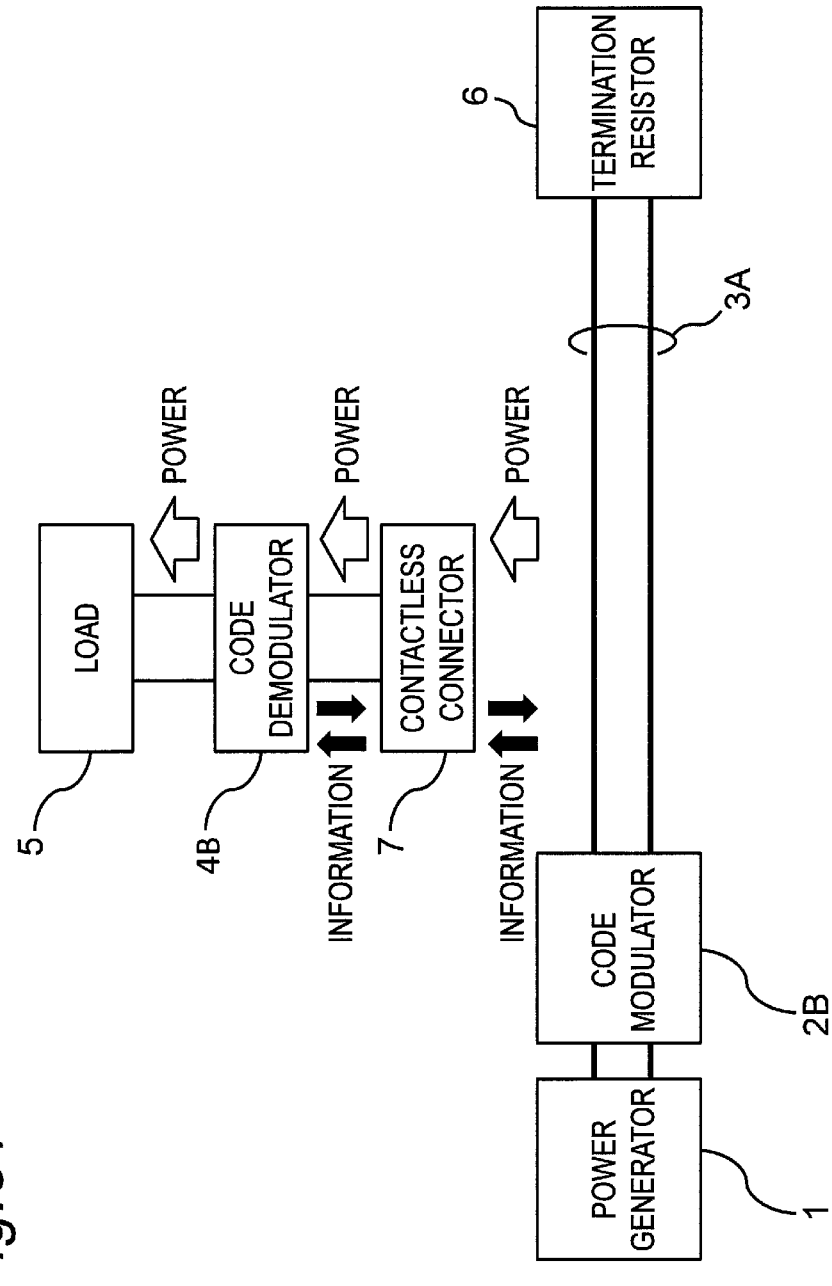
FIG. 31 is a block diagram showing a configuration of a power transmission system according to a fifth embodiment.

FIG. 31 is a block diagram showing a configuration of a power transmission system according to a fifth embodiment. Referring to FIG. 31, The power transmission system according to the fifth embodiment is provided with a power generator 1, a code modulator 2B, a transmission path 3A, a code demodulator 4B, a load 5, and a contactless connector 7.

The power generator 1, the transmission path 3A, the load 5, a termination resistor 6, and the contactless connector 7 of FIG. 31 are configured in a manner similar to that of the corresponding constituent elements of FIG. 18. For ease of illustration, the power meters 1m and 5m and the controller 10 of FIG. 1 are not shown in FIG. 18.

The power transmission system of FIG. 31 is provided with the code modulator 2B in place of the code modulator 2 of FIG. 18, and provided with the code demodulator 4B in place of the code demodulator 4 of FIG. 18. The power transmission system of FIG. 31 transmits power via the transmission path 3A, and further transmit information signals superimposed on the power.

Figure 32:
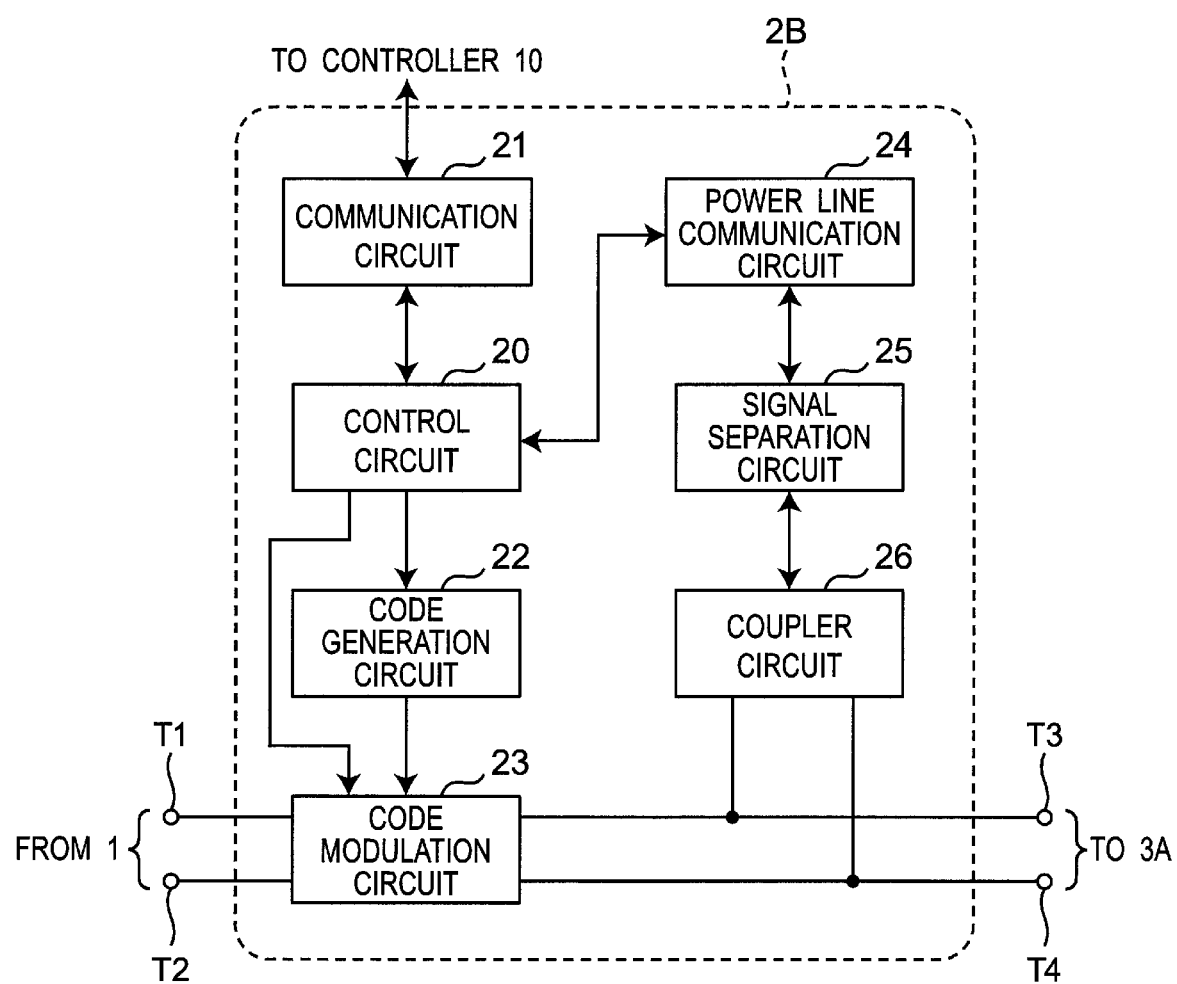
FIG. 32 is a block diagram showing a configuration of a code modulator 2B of FIG. 31.

FIG. 32 is a block diagram showing a configuration of the code modulator 2B of FIG. 31. The code modulator 2B of FIG. 32 is provided with a power line communication circuit 24, a signal separation circuit 25, and a coupler circuit 26, in addition to the constituent elements of the code modulator 2 of FIG. 5.

A control circuit 20 transmits and receives information signals to/from the code demodulator 4B, using the power line communication circuit 24, the signal separation circuit 25, and the coupler circuit 26. The information signals are used for setting up power transmission. The power line communication circuit 24 is connected to the transmission path 3A via the signal separation circuit 25 and the coupler circuit 26. The signal separation circuit 25 is, for example, a high-frequency filter for separating the information signals from the transmitted power of power transmission. The signal separation circuit 25 is provided in order to prevent the transmitted power of power transmission from being inputted into the power line communication circuit 24. In addition, the coupler circuit 26 is, for example, a circuit for dividing and mixing a part of the high-frequency power, such as a coupling transformer. In this case, the coupler circuit 26 is used to mix the power of the information signals and the transmitted power of power transmission. For example, when the code modulator 2B transmits an information signal to the code demodulator 4B, an information signal outputted from the control circuit 20 is converted into a communication signal by the power line communication circuit 24, and the communication signal is transmitted to the transmission path 3A via the signal separation circuit 25 and the coupler circuit 26. On the other hand, when the code modulator 2B receives an information signal from the code demodulator 4B, the coupler circuit 26 and the signal separation circuit 25 separate power of a communication signal from the transmitted power of power transmission at a predetermined ratio, the power line communication circuit 24 converts the communication signal into an information signal, and passes the information signal to the control circuit 20. The control circuit 20 performs predetermined controls and operations in accordance with this information signal.

Thus, according to the code modulator 2B of FIG. 32, it is possible to transmit and receive the information signals over the transmission path of power transmission in a superposed manner. The transmission path can be shared between information transmission and power transmission. Therefore, there is an advantageous effect of being capable of reducing material costs of the transmission path, and reducing installation costs of the transmission path.

Figure 33:
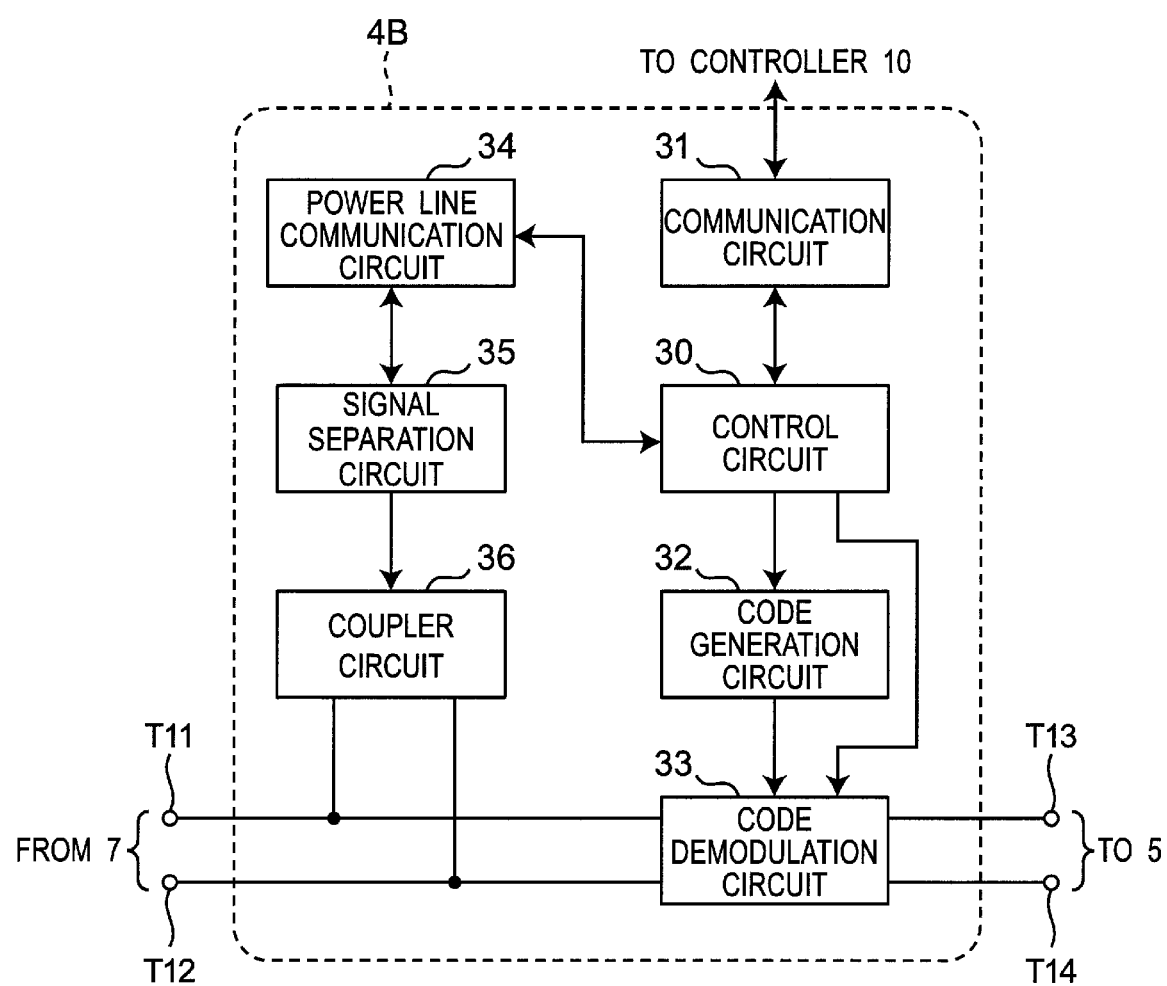
FIG. 33 is a block diagram showing a configuration of a code demodulator 4B of FIG. 31.

FIG. 33 is a block diagram showing a configuration of the code demodulator 4B of FIG. 31. The code demodulator 4B of FIG. 33 is provided with a power line communication circuit 34, a signal separation circuit 35, and a coupler circuit 36, in addition to the constituent elements of the code demodulator 4B of FIG. 6.

A control circuit 30 transmits and receives information signals to/from the code modulator 2B, using the power line communication circuit 34, the signal separation circuit 35, and the coupler circuit 36. The information signals are used for setting up power transmission. The power line communication circuit 34 is connected to the transmission path 3A via the signal separation circuit 35 and the coupler circuit 36. The coupler circuit 36 is, for example, a circuit for dividing and mixing a part of the high-frequency power, such as a coupling transformer. In this case, the coupler circuit 36 is used to divide the power of the communication signals from the transmitted power of power transmission at a predetermined ratio. In addition, the signal separation circuit 35 is, for example, a high-frequency filter for separating the information signals from the transmitted power of power transmission. The signal separation circuit 35 is provided in order to prevent the transmitted power of power transmission from being inputted into the power line communication circuit 34. For example, when the code demodulator 4B receives an information signal from the code modulator 2B, the coupler circuit 36 and the signal separation circuit 35 separate power of a communication signal from the transmitted power of power transmission at a predetermined ratio, the power line communication circuit 34 converts the communication signal into an information signal, and passes the information signal to the control circuit 30. The control circuit 30 performs predetermined controls and operations in accordance with this information signal. On the other hand, when the code demodulator 4B transmits an information signal to the code modulator 2B, an information signal outputted from the control circuit 30 is converted into a communication signal by the power line communication circuit 34, and the communication signal is transmitted to the transmission path 3A via the signal separation circuit 35 and the coupler circuit 36.

According to the code demodulator 4B of FIG. 33, it is possible to transmit and receive the information signals over the transmission path of power transmission in a superposed manner. The transmission path can be shared between information transmission and power transmission. Therefore, there is an advantageous effect of being capable of reducing material costs of the transmission path, and reducing installation costs of the transmission path.

Here, we describe a case in which the information signals are used, for example, as control signals of the code modulator 2B and the code demodulator 4B. The code modulator 2B of FIG. 32 performs communicates required for controlling power transmission, with the controller 10, or with another code modulator or code demodulator, using the power line communication circuit 24. Based on control information received from the controller 10, the control circuit 20 generates a code sequence used for code modulation, and controls the code modulation circuit 23 to modulate power by code modulation from a designated start time to a designated end time of modulation, and output the modulated power to the transmission path 3A. The code demodulator 4B of FIG. 33 also performs communicates required for controlling power transmission, using the power line communication circuit 34, in a manner similar to that of the code modulator 2B of FIG. 32. Based on control information received from the controller 10, the control circuit 30 generates a code sequence used for code demodulation, and controls the code demodulation circuit 33 to demodulate power by code demodulation from a designated start time to a designated end time od demodulation.

The control signals may include synchronization signals. Thus, there is an advantageous effect of being capable of establishing synchronization between the code modulator 2B and the code demodulator 4B, performing accurate code modulation and code demodulation of power, and achieving efficient power transmission.

The control signals may further include an emergency stop signal. Thus, there is an advantageous effect of being capable of immediately stop power transmission when detecting disconnection or abnormality of the transmission path, and preventing failure of the code modulator, the code demodulator, electrical facilities and equipment connected thereto, etc.

In addition, the code modulator 2B may transmit and receive, via the transmission path 3A, information signals to be transmitted and received to/from the controller 10. Similarly, the code demodulator 4B may also transmit and receive, via the transmission path 3A, information signals to be transmitted and received to/from the controller 10.

Thus, according to the power transmission system of the fifth embodiment, it is possible to achieve communications between the controller 10 and the control circuit 20, between the controller 10 and the control circuit 30, and between the control circuit 20 and the control circuit 30, via the transmission path 3A. Therefore, there is an advantageous effect of being capable of transmitting and receiving the information signals over the transmission path 3A of power transmission in a superposed manner, so that the transmission path can be shared between information transmission and power transmission, and thus, reducing material costs of the transmission path, and reducing installation costs of the transmission path. Although the case of the code modulator 2B and the code demodulator 4B has been described, but not limited thereto, it is possible to obtain similar advantageous effects by a code modulator/demodulator provided with a similar power line communication circuit, a similar signal separation circuit, and a similar coupler circuit.

Sixth Embodiment

Figure 34:
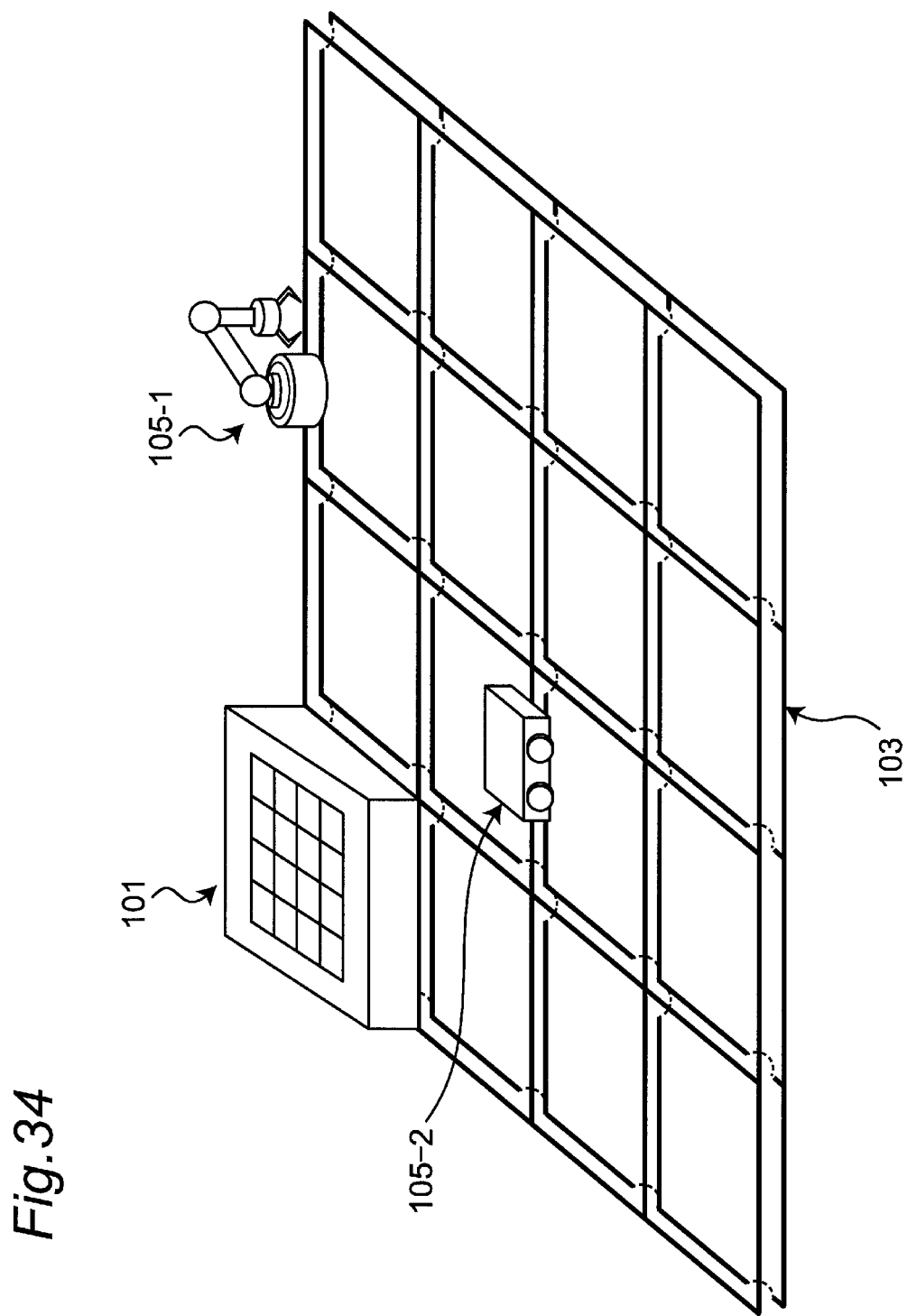
FIG. 34 is a block diagram showing a configuration of a power transmission system according to a sixth embodiment.

FIG. 34 is a block diagram showing a configuration of a power transmission system according to a sixth embodiment. The power transmission system of FIG. 6 is provided with a power generator 101, a transmission path 103, and loads 105-1 and 105-2.

FIG. 34 shows an exemplary system configuration of the transmission path 103 with grid arrangement. The power generator 101 is, for example, a renewable energy power generator, such as a solar cell. For example, the load 105-1 is a robot, and the load 105-2 is an automated guided vehicle (AGV). The power generator 101 and the loads 105-1 and 105-2 have contactless connectors, and transmit and receive power via the contactless connectors without electrical contact.

According to the power transmission system of FIG. 34, there is an advantageous effect of being capable of transmitting and receiving power at any position within a two-dimensional (or three-dimensional) range of the transmission path 103, in addition to the advantageous effects described in the fourth to fifth embodiments.

OTHER EMBODIMENTS

In the second to sixth embodiments, when the power generator generates alternating-current power, the frequency of the generated power may be measured and notified to the controller.

In the third to sixth embodiments, a plurality of code modulators may use the same code sequence, and a plurality of code demodulators may use the same code sequence. Thus, one code modulator may transmit powers to a plurality of code demodulators, a plurality of code modulators may transmit powers to one code demodulator, and a plurality of code modulators may transmit powers to a plurality of code demodulators.

In the first to sixth embodiments, we have indicated the example in which power is transmitted using code modulation and code demodulation of current, but the power transmission is not limited thereto. Power may be transmitted using code modulation and code demodulation of direct-current or alternating-current voltage. In this case, similar advantageous effects can be achieved.

REFERENCE SIGNS LIST 1, 1-1, 1-2: POWER GENERATOR,
1m, 1m-1, 1m-2: POWER METER,
2, 2-1, 2-2, 2A, 2A-1, 2A-2, 2B: CODE MODULATOR,
3, 3A: TRANSMISSION PATH,
3A1, 3A2: POWER LINE,
3Aa1, 3Aa2: CONDUCTOR PLATE,
3Ab, 3Ac: COIL,
4, 4-1, 4-2, 4A, 4A-1, 4A-2, 4B: CODE DEMODULATOR,
5, 5-1, 5-2: LOAD,
5m, 5m-1 to 5m-2: POWER METER,
6, 6-1, 6-2: TERMINATION RESISTOR,
7, 7-1 to 7-3: CONTACTLESS CONNECTOR,
7a1, 7a2: CONDUCTOR PLATE,
7b, 7c, 7d1, 7d2: COIL,
8, 8-1, 8-2: CODE MODULATOR/DEMODULATOR,
9: BATTERY,
10, 10A: CONTROLLER,
11: CONTROL CIRCUIT,
12, 12A: COMMUNICATION CIRCUIT,
20: CONTROL CIRCUIT,
21: COMMUNICATION CIRCUIT,
22, 22A: CODE GENERATION CIRCUIT,
23, 23A: CODE MODULATION CIRCUIT,
24: POWER LINE COMMUNICATION CIRCUIT,
25: SIGNAL SEPARATION CIRCUIT,
26: COUPLER CIRCUIT,
30: CONTROL CIRCUIT,
31: COMMUNICATION CIRCUIT,
32, 32A: CODE GENERATION CIRCUIT,
33, 33A: CODE DEMODULATION CIRCUIT,
34: POWER LINE COMMUNICATION CIRCUIT,
35: SIGNAL SEPARATION CIRCUIT,
36: COUPLER CIRCUIT,
101: POWER GENERATOR,
103: TRANSMISSION PATH,
105-1, 105-2: LOAD,
D1 to D34: DIODE,
S1 to S74: SWITCH ELEMENT,
SS1 to SS34, SS21A to SS34A: SWITCH CIRCUIT, and
T1 to T14: TERMINAL.

The invention claimed is:

1. A power receiver apparatus that receives a code-modulated wave from a power transmitter apparatus via a transmission path, the code-modulated wave including first power modulated by code modulation using a modulation code based on a code sequence, the power receiver apparatus comprising:
a contactless connector that is coupled to the transmission path without electrical contact with the transmission path, and receives the code-modulated wave from the power transmitter apparatus via the transmission path; and
a code demodulator device that demodulates the received code-modulated wave to generate second power by code demodulation using a demodulation code based on a code sequence identical to the code sequence of the modulation code used for the code modulation,
wherein the power transmitted between the transmission path and the contactless connector without electrical contact is modulated by the code modulation using the modulation code.

2. The power receiver apparatus as claimed in claim 1, wherein the contactless connector is coupled to the transmission path via an electric field.

3. The power receiver apparatus as claimed in claim 1, wherein the contactless connector is coupled to the transmission path via a magnetic field.

4. The power receiver apparatus as claimed in claim 1, wherein the modulation code is an orthogonal code.

5. The power receiver apparatus as claimed in claim 1, further comprising a power line communication circuit that transmits or receives an information signal via the contactless connector and the transmission path.

6. A power transmitter apparatus that transmits power to a power receiver apparatus via a transmission path, the power transmitter apparatus comprising:
a code modulator device that modulates first power to generate a code-modulated wave by code modulation using a modulation code based on a code sequence identical to another code sequence of a demodulation code used for code demodulation to be performed by the power receiver apparatus; and
a contactless connector that is coupled to the transmission path without electrical contact with the transmission path, and transmits the code-modulated wave to the power receiver apparatus via the transmission path,
wherein the power transmitted between the contactless connector and the transmission path without electrical contact is modulated by the code modulation using the modulation code.

7. The power transmitter apparatus as claimed in claim 6, wherein the contactless connector is coupled to the transmission path via an electric field.

8. The power transmitter apparatus as claimed in claim 6, wherein the contactless connector is coupled to the transmission path via a magnetic field.

9. The power transmitter apparatus as claimed in claim 6, wherein the modulation code is an orthogonal code.

10. The power transmitter apparatus as claimed in claim 6, further comprising a power line communication circuit that transmits or receives an information signal via the contactless connector and the transmission path.

11. A power transmitter and receiver apparatus that transmits power to a power receiver apparatus external to the power transmitter and receiver apparatus via a transmission path and receives power from a power transmitter apparatus external to the power transmitter and receiver apparatus via the transmission path, the power transmitter and receiver apparatus comprising:
- a code modulator and demodulator device that modulates first power to generate a first code-modulated wave by code modulation using a first modulation code based on a first code sequence; and
- a contactless connector that is coupled to the transmission path without electrical contact with the transmission path, and transmits the first code-modulated wave to the power receiver apparatus via the transmission path,
- wherein the contactless connector further receives a second code-modulated wave from the power transmitter apparatus via the transmission path, the second code-modulated wave including power modulated by code modulation using a second modulation code based on a second code sequence,
- wherein the code modulator and demodulator device further demodulates the received second code-modulated wave to generate second power by code demodulation using a demodulation code based on the second code sequence, and
- wherein the power transmitted between the contactless connector and the transmission path without electrical contact is modulated by the code modulation using the first or second modulation code.

12. The power transmitter and receiver apparatus as claimed in claim 11, wherein the contactless connector is coupled to the transmission path via an electric field.

13. The power transmitter and receiver apparatus as claimed in claim 11, wherein the contactless connector is coupled to the transmission path via a magnetic field.

14. The power transmitter and receiver apparatus as claimed in claim 11, wherein each of the modulation code and the demodulation code is an orthogonal code.

15. The power transmitter and receiver apparatus as claimed in claim 11, further comprising a power line communication circuit that transmits or receives an information signal via the contactless connector and the transmission path.

16. A power transmission system comprising:
- a transmission path;
- a power transmitter apparatus comprising a code modulator device that modulates first power to generate a code-modulated wave by code modulation using a modulation code based on a code sequence, and transmits the code-modulated wave via the transmission path; and
- a power receiver apparatus that receives the code-modulated wave from the power transmitter apparatus via a transmission path,
- wherein the power receiver apparatus comprises:
- a contactless connector that is coupled to the transmission path without electrical contact with the transmission path, and receives the code-modulated wave from the power transmitter apparatus via the transmission path; and
- a code demodulator device that demodulates the received code-modulated wave to generate second power by code demodulation using a demodulation code based on a code sequence identical to the code sequence of the modulation code used for the code modulation,
- wherein the power transmitted between the transmission path and the contactless connector without electrical contact is modulated by the code modulation using the modulation code.

17. A power transmission system comprising:
- a transmission path;
- a power transmitter apparatus; and
- a power receiver apparatus comprising a code demodulator that receives a code-modulated wave from the power transmitter apparatus via the transmission path, the code-modulated wave including first power modulated by code modulation using a modulation code based on a code sequence, and demodulates the received code-modulated wave to generate second power by code demodulation using a demodulation code based on a code sequence identical to the code sequence of the modulation code used for the code modulation,
- wherein the power transmitter apparatus comprises:
- a code modulator device that modulates the first power to generate the code-modulated wave by the code modulation using the modulation code based on the code sequence; and
- a contactless connector that is coupled to the transmission path without electrical contact with the transmission path, and transmits the code-modulated wave to the power receiver apparatus via the transmission path,
- wherein the power transmitted between the contactless connector and the transmission path without electrical contact is modulated by the code modulation using the modulation code.

18. A power transmission system comprising:
- a transmission path;
- a power transmitter and receiver apparatus;
- a power receiver apparatus external to the power transmitter and receiver apparatus, the power receiver apparatus comprising a code demodulator device that receives a first code-modulated wave via the transmission path, the first code-modulated wave including first power modulated by code modulation using a first modulation code based on a first code sequence, and demodulates the received first code-modulated wave to generate third power by code demodulation using a demodulation code based on the first code sequence; and
- a power transmitter apparatus external to the power transmitter and receiver apparatus, the power transmitter apparatus comprising a code modulator device that modulates fourth power to generate a second code-modulated wave by code modulation using a second modulation code based on a second code sequence, and transmits the second code-modulated wave via the transmission path,
- wherein the power transmitter and receiver apparatus comprises:
- a code modulator and demodulator device that modulates the first power to generate the first code-modulated wave by the code modulation using the first modulation code; and
- a contactless connector that is coupled to the transmission path without electrical contact with the transmission path, and transmits the first code-modulated wave to the power receiver apparatus via the transmission path,
- wherein the contactless connector further receives the second code-modulated wave from the power transmitter apparatus via the transmission path, the second code-modulated wave including the fourth power modulated by the code modulation using the second modulation code, wherein the code modulator and demodulator device further demodulates the received second code-modulated wave to generate second power by code demodulation using a demodulation code based on the second code sequence, and wherein the power transmitted between the contactless connector and the transmission path without electrical contact is modulated by the code modulation using the first or second modulation code.

19. A power transmission system comprising:

a transmission path; and a plurality of apparatuses external to each other and selected from a power receiver apparatus, a power transmitter apparatus, and a power transmitter and receiver apparatus, wherein the power transmitter apparatus comprises:

a code modulator device that modulates first power to generate a first code-modulated wave by code modulation using a first modulation code based on a first code sequence; and a first contactless connector that is coupled to the transmission path without electrical contact with the transmission path, and transmits the first code-modulated wave to the power receiver apparatus or the power transmitter and receiver apparatus via the transmission path, wherein the power transmitted between the first contactless connector and the transmission path without electrical contact is modulated by the code modulation using the first modulation code, wherein the power receiver apparatus comprises:

a second contactless connector that is coupled to the transmission path without electrical contact with the transmission path, and receives a second code-modulated wave from the power transmitter apparatus or the power transmitter and receiver apparatus via the transmission path, the second code-modulated wave including power modulated by code modulation using a second modulation code based on a second code sequence; and a code demodulator device that demodulates the received second code-modulated wave to generate second power by code demodulation using a first demodulation code based on the second code sequence, wherein the power transmitted between the transmission path and the second contactless connector without electrical contact is modulated by the code modulation using the second modulation code, wherein the power transmitter and receiver apparatus comprises:

a code modulator and demodulator device that modulates third power to generate a third code-modulated wave by code modulation using a third modulation code based on a third code sequence; and a third contactless connector that is coupled to the transmission path without electrical contact with the transmission path, and transmits the third code-modulated wave to the power receiver apparatus or the power transmitter and receiver apparatus via the transmission path, wherein the third contactless connector further receives a fourth code-modulated wave from the power transmitter apparatus or the power transmitter and receiver apparatus via the transmission path, the fourth code-modulated wave including power modulated by code modulation using a fourth modulation code based on a fourth code sequence, wherein the code modulator and demodulator device further demodulates the received fourth code-modulated wave to generate fourth power by code demodulation using a second demodulation code based on the fourth code sequence, wherein the power transmitted between the third contactless connector and the transmission path without electrical contact is modulated by the code modulation using the third or fourth modulation code, and wherein the second code sequence is identical to the first or third code sequence, and the fourth code sequence is identical to the first code sequence.

\* \* \* \* \*